(12) United States Patent
Moore et al.

(10) Patent No.: US 10,325,389 B2
(45) Date of Patent: *Jun. 18, 2019

(54) EDITING DIGITAL NOTES REPRESENTING PHYSICAL NOTES

(71) Applicant: 3M INNOVATIVE PROPERTIES COMPANY, St. Paul, MN (US)

(72) Inventors: Richard J. Moore, Maplewood, MN (US); Michael C. Leighton, Excelsior, MN (US); Guruprasad Somasundaram, Minneapolis, MN (US); Linus Åkerlund, Johanneshov (SE); Olof Roland Persson, Stockholm (SE); Héctor M. Aybar López, Cottage Grove, MN (US); Diane R. Wolk, Woodbury, MN (US); Pontus Axelsson, Stockholm (SE); Staffan H. Kjellberg, Stockholm (SE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 333 days.

This patent is subject to a terminal disclaimer.

(21) Appl. No.: 15/008,033

(22) Filed: Jan. 27, 2016

(65) Prior Publication Data
US 2016/0180565 A1 Jun. 23, 2016

Related U.S. Application Data

(63) Continuation of application No. 14/514,766, filed on Oct. 15, 2014, now Pat. No. 9,274,693.
(Continued)

(51) Int. Cl.
G06F 3/0484 (2013.01)
G06T 11/60 (2006.01)
(Continued)

(52) U.S. Cl.
CPC .......... G06T 11/60 (2013.01); G06F 3/0484 (2013.01); G06F 3/04842 (2013.01);
(Continued)

(58) Field of Classification Search
CPC .... G06T 11/60; G06F 3/0484; G06F 3/04842; G06F 3/1454; H04N 21/4122;
(Continued)

(56) References Cited

U.S. PATENT DOCUMENTS

| 5,319,745 A | 6/1994 | Vinsonneau |
| 5,465,165 A | 11/1995 | Tanio |

(Continued)

FOREIGN PATENT DOCUMENTS

| EP | 1182861 | 2/2002 |
| JP | 2009-20813 | 1/2009 |

(Continued)

OTHER PUBLICATIONS

"Skitch for iPad is Here! Evernote Blog Evernote Blog", Sinkov, XP055367176, Sep. 9, 2013 [retrieved from the Internet on Apr. 25, 2017]. URL <http://web.archive.org/web/20130909170154/https://blog.evernote.com/blog/2011/12/21/skitch-for-ipad-is-here>, pp. 5.
(Continued)

*Primary Examiner* — Anil K Bhargava

(57) ABSTRACT

In one example, a method includes receiving a digital note of a plurality of digital notes generated based on image data comprising a visual representation of a scene that includes a plurality of physical notes such that each of the plurality of digital notes respectively corresponds to a particular physical note of the plurality of physical notes, wherein each of the physical notes includes respective recognizable content. In this example, the method also includes receiving user input indicating a modification to one or more visual characteristics of the digital note. In this example, the method
(Continued)

also includes editing, in response to the user input, the one or more visual characteristics of the digital note. In this example, the method also includes outputting, for display, a modified version of the digital note that includes the one or more visual characteristics.

19 Claims, 45 Drawing Sheets

Related U.S. Application Data

(60) Provisional application No. 61/891,647, filed on Oct. 16, 2013, provisional application No. 61/891,444, filed on Oct. 16, 2013, provisional application No. 61/891,442, filed on Oct. 16, 2013.

(51) Int. Cl.
  *G06F 3/0488* (2013.01)
  *G06F 17/21* (2006.01)
  *G06F 17/24* (2006.01)
  *G06T 11/00* (2006.01)

(52) U.S. Cl.
  CPC ........ *G06F 3/04883* (2013.01); *G06F 17/212* (2013.01); *G06F 17/24* (2013.01); *G06T 11/001* (2013.01)

(58) Field of Classification Search
  CPC ......... H04N 21/4126; H04N 21/43615; H04N 21/472; H04N 21/8173
  See application file for complete search history.

(56) References Cited

U.S. PATENT DOCUMENTS

| | | | |
|---|---|---|---|
| 5,590,219 A | 12/1996 | Gourdol | |
| 5,608,853 A * | 3/1997 | Dujari | G06T 3/40 345/668 |
| 5,898,434 A | 4/1999 | Small | |
| 6,351,559 B1 | 2/2002 | Zhou | |
| 6,486,894 B1 * | 11/2002 | Abdelhadi | G06F 3/04812 345/161 |
| 6,721,733 B2 | 4/2004 | Lipson | |
| 7,072,512 B2 | 7/2006 | Mehrotra | |
| 7,343,415 B2 | 3/2008 | Kenner | |
| 7,561,310 B2 | 7/2009 | Joyce | |
| 7,573,598 B2 | 8/2009 | Cragun | |
| 7,774,479 B2 | 8/2010 | Kenner | |
| 7,837,094 B2 | 11/2010 | Rhoads | |
| 8,069,173 B2 | 11/2011 | Munekuni | |
| 8,113,432 B2 | 2/2012 | Kimura | |
| 8,139,852 B2 | 3/2012 | Shinjo | |
| 8,238,666 B2 | 8/2012 | Besley et al. | |
| 8,256,665 B2 | 9/2012 | Rhoads | |
| 8,264,499 B1 * | 9/2012 | Landry | H04N 5/57 345/581 |
| 8,345,061 B1 | 1/2013 | Landry | |
| 8,380,040 B2 | 2/2013 | Carter | |
| 8,416,466 B2 | 4/2013 | Takata | |
| 8,429,174 B2 | 4/2013 | Ramani | |
| 8,457,449 B2 | 6/2013 | Rhoads | |
| 8,503,791 B2 * | 8/2013 | Conwell | G06F 17/30265 382/190 |
| 8,542,889 B2 | 9/2013 | Sarnoff | |
| 8,543,926 B2 | 9/2013 | Giles | |
| 8,558,913 B2 | 10/2013 | Pillman | |
| 8,600,167 B2 | 12/2013 | Showering | |
| 8,655,068 B1 | 2/2014 | Li | |
| 2003/0125055 A1 * | 7/2003 | Kim | H04M 1/72552 455/466 |
| 2004/0017400 A1 | 1/2004 | Ly | |
| 2005/0091578 A1 | 4/2005 | Madan | |
| 2006/0039045 A1 | 2/2006 | Sato | |
| 2006/0077468 A1 | 4/2006 | Loce | |
| 2006/0221357 A1 | 10/2006 | Uzawa | |
| 2007/0089049 A1 | 4/2007 | Gormish | |
| 2007/0110277 A1 | 5/2007 | Hayduchok | |
| 2007/0176780 A1 | 8/2007 | Hart | |
| 2008/0021701 A1 | 1/2008 | Bobick | |
| 2008/0075364 A1 | 3/2008 | Speigle | |
| 2008/0143739 A1 * | 6/2008 | Harris | G09G 5/02 345/604 |
| 2009/0307607 A1 * | 12/2009 | Schauls | G06F 3/0483 715/752 |
| 2010/0023878 A1 | 1/2010 | Douris | |
| 2010/0096452 A1 | 4/2010 | Habraken | |
| 2010/0191772 A1 | 7/2010 | Brown | |
| 2010/0202680 A1 | 8/2010 | Hamasaki | |
| 2011/0066658 A1 | 5/2011 | Rhoads | |
| 2011/0164815 A1 | 7/2011 | Sharma | |
| 2011/0187731 A1 * | 8/2011 | Tsuchida | H04N 21/4318 345/581 |
| 2011/0285123 A1 | 11/2011 | Wittke | |
| 2011/0293179 A1 * | 12/2011 | Dikmen | G06T 5/008 382/167 |
| 2012/0014456 A1 | 1/2012 | Martinez Bauza | |
| 2012/0151577 A1 | 6/2012 | King | |
| 2012/0320410 A1 | 12/2012 | Kakegawa | |
| 2012/0324372 A1 | 12/2012 | Kowalkiewicz | |
| 2013/0022330 A1 * | 1/2013 | Carter | H04N 21/41407 386/224 |
| 2013/0054636 A1 * | 2/2013 | Tang | G06F 17/30722 707/769 |
| 2013/0129206 A1 * | 5/2013 | Worthington | H04N 9/76 382/164 |
| 2013/0163047 A1 | 6/2013 | Miyamoto | |
| 2013/0217440 A1 | 8/2013 | Lord | |
| 2013/0227476 A1 | 8/2013 | Frey | |
| 2013/0258117 A1 | 10/2013 | Penov | |
| 2013/0258122 A1 | 10/2013 | Keane | |
| 2013/0271784 A1 | 10/2013 | Nakajima | |
| 2014/0024411 A1 | 1/2014 | Rao | |
| 2014/0056512 A1 | 2/2014 | Lerios | |
| 2014/0164852 A1 * | 6/2014 | Sumiyoshi | H04N 7/155 714/57 |
| 2014/0282077 A1 | 9/2014 | Wilson | |
| 2014/0294236 A1 | 10/2014 | Biller | |
| 2014/0297646 A1 | 10/2014 | Bastiaens | |
| 2014/0358613 A1 * | 12/2014 | Libin | G06Q 10/1095 705/7.19 |

FOREIGN PATENT DOCUMENTS

| | | |
|---|---|---|
| JP | 2011-090486 | 5/2011 |
| WO | WO 2012-070935 | 5/2012 |
| WO | WO 2013-085512 | 6/2013 |
| WO | WO 2013-184767 | 12/2013 |
| WO | WO 2014-165438 | 10/2014 |

OTHER PUBLICATIONS

"ProofRite: A Paper-Augmented Word Processor", Conroy, XP055343827, Feb. 2, 2004, [retrieved from the Internet on Feb. 8, 2017]. <URLhttps://pdfs.semanticscholar.org/21a1/5580d44b557b2534505c08fc944ccba9f933.pdf>, pp. 34.

"Going Paperless: How Penultimate and Evernote Have Replaced My Pocket Notebook", Rubin, XP055367152, Aug. 14, 2013, [retrieved from the Internet on Jul. 26, 2017] <http://www.jamierubin.net/2013/01/15/going-paperless-how-penultimate-and-evernote-have-replaced-my-pocket-notebook>, pp. 12.

Boykov, "Graph Cuts and Efficient N-D Image Segmentation", International Journal of Computer Vision, 2006, vol. 70, No. 2, pp. 109-131.

Davidson, "Calculation of Color Differences From Visual Sensitivity Ellipsoids", Journal of the Optical Society of America, Dec. 1951, vol. 41, No. 12, pp. 1052-1055.

(56) References Cited

OTHER PUBLICATIONS

Everitt, "Two Worlds Apart: Bridging the Gap Between Physical and Virtual Media for Distributed Design Collaboration", CHI 2003, Apr. 5-10, 2003, 8 pages.

Felzenszwalb, "Efficient Graph-Based Image Segmentation", International Journal of Computer Vision, 2004, vol. 59, No. 2, pp. 167-181.

Fisher, "Change Detection in Color images", Proceedings of 7th IEEE Conference on Computer Vision and Pattern, 1999, 6 pages.

Frome, "Visibility of Borders: Separate and Combined Effects of Color Differences, Luminance Contrast, and Luminance Level", J. Opt. Soc. Am., Feb., 1981, vol. 71, No. 2, pp. 145-150.

Geyer, "Experiences From Employing Evernote as a Tool for Documenting Collaborative Design Processes", Conference on Designing Interactive System DIS 2012, Workshop on Supporting Reflection in and on Design Processes, Jun. 12, 2012, 2 pages.

Gur, "Isoluminant Stimuli May Not Expose the Full Contribution of Color to Visual Functioning: Spatial Contrast Sensitivity Measurements Indicate Interaction Between Color and Luminance Processing", Vision Research, Jul. 7, 1992, vol. 32, No. 7, pp. 1253-1262.

Hsieh, "Peripheral Display of Digital handwritten notes", CHI Proceedings of the SIGCHI Conference on Human Factors in Computing Systems, Apr. 22-27, 2006, pp. 285-288.

"King jim Shot Note", [Online], [retrieved from internet on Sep. 17, 2014], URL :<http://www.kingjim.co.jp/english/products/shotnote/>, 2 pages.

Klemmer, "The Designers Outpost: A Tangible Interface for Collaborative Web Site Design", In Proceedings of UIST, 2001, 10 pages.

K-SVD, "An Algorithm for Designing Overcomplete Dictionaries for Sparse Representation", IEEE Transactions on Signal Processing, Nov. 2006, vol. 54, No. 11, pp. 4311-4322.

Masaoka, "Fast and Accurate Model for Optimal Color Computation", Optics Letters, Jun. 15, 2010, vol. 35, No. 12, pp, 2031-2033.

Mika, "Fisher Discriminant Analysis With Kernels", Neural Networks for Signal Processing IX, 1999. Proceedings of the 1999 IEEE Signal Processing Society Workshop In Neural Networks for Signal Processing IX, 1999. Proceedings of the 1999 IEEE Signal Processing Society Workshop, Aug. 1999, pp. 41-48.

Rajala, "Visual Sensitivity to Color-Varying Stimuli", Human Vision, Visual Processing and Digital Display III, Proc, SPIE. Aug. 27, 1992, vol. 1666, pp. 375-386.

Sharma, "The CIEDE2000 ColorL Difference Formula: Implementation Notes, Supplementary Test Data, and Mathematical Observations", Color Research & Application, Feb. 2005, vol. 30, No. 1, pp. 21-30.

Yang, "Photonic Crystal Changes Color When Exposed to an Explosion", Nanotechnology, SPIE Inetrnational Year of Light 2015, Apr. 25, 2011, [online]. [retrieved from internet on Sep. 18, 2014], URL:<http://spie.org/x47872.xml?pf=true&ArticleID=x47872>, 3 pages.

Imaging With QuickDraw, Apple Computer, Inc., Inside Macintosh, 1994, [retrieved from the internet on Dec. 14, 2014], <URL https//developer.apple.com/legacy/library/documentation/mac/pdf/ImagingWithQuickDraw.pdf>, Chapters 1, 3 and 4, pp. 1-17 through 1-20, 3-4 through 3-14 and 4-4 through 4-17, 51 pages.

QuickDraw, Wikipedia, Oct. 3, 2013, [retrieved from the internet on Dec. 14, 2014], <URL http/en.wikipedia.org/wiki/QuickDraw> See "Graphics primitives" section, 4 pages.

\* cited by examiner

| Device | Phases in the approach | Data exchanged |
|---|---|---|
| Camera on Phone /Hand-held device | Image Acquisition (102) | Input: Physical media/note in the presence of other objects<br>Output: Image or Video |
| Processor on the phone | Media / Note Detection (104) | Input: Image or Video frame<br>Output: Localization of note features using color, shape and patterns |
| Processor on the phone | Media / Note Extraction (106) | Input: Localization of note features<br>Output: Extracted notes into sub-images |
| Processor on the phone | Media / Note Enhancement (108) | Input: Extracted notes into sub-images<br>Output: Digitally enhanced sub-images that meets quality standards after correction for shadow, lighting, rotation, scaling, etc. |
| Web server, Personal Computer, etc. | Storage, Sharing and Secondary Processing (110) | Input: Digitally enhanced sub-images<br>Output: Secondary applications, office suites, Dropbox, Evernote, etc. |

*FIG. 4*

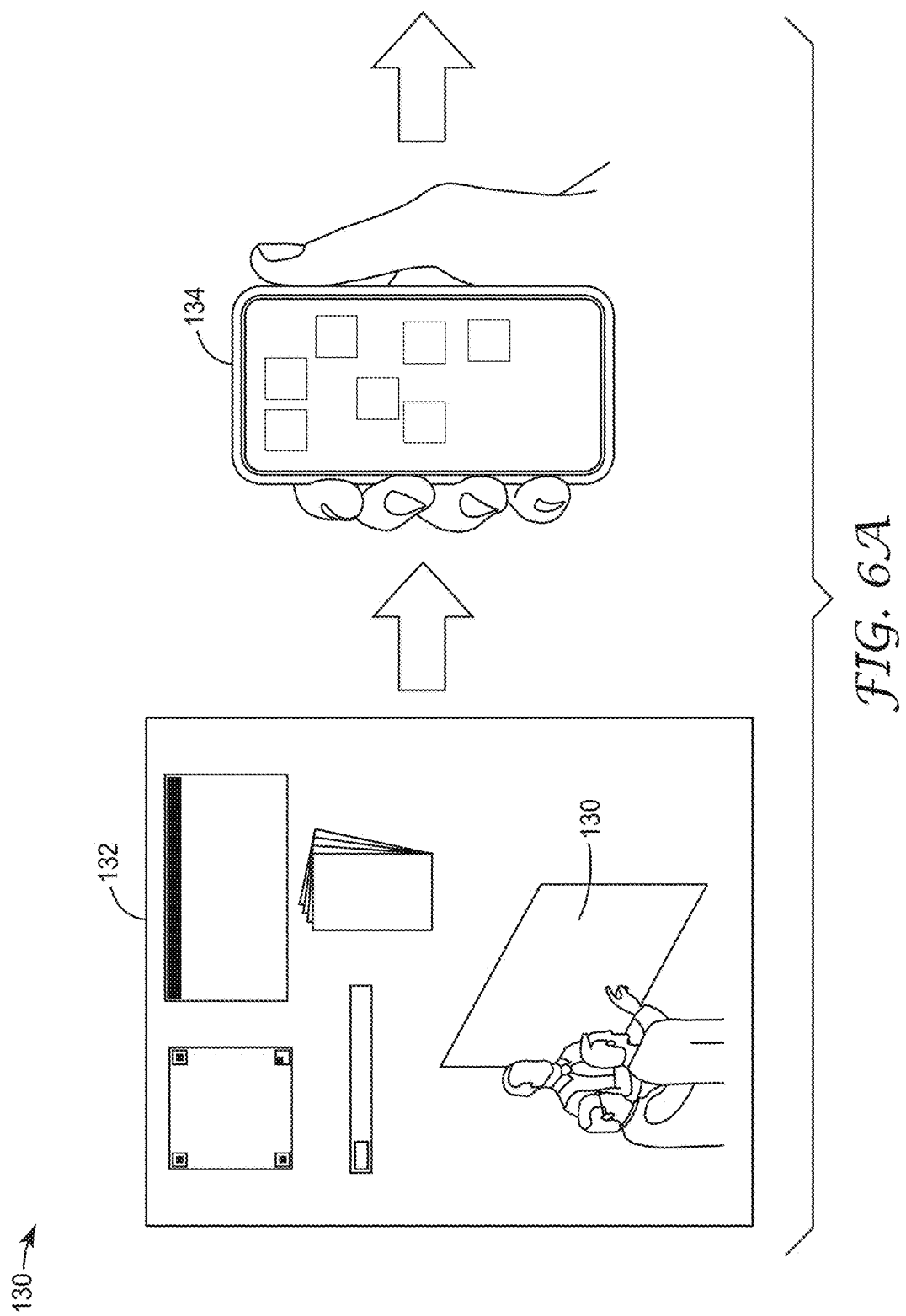

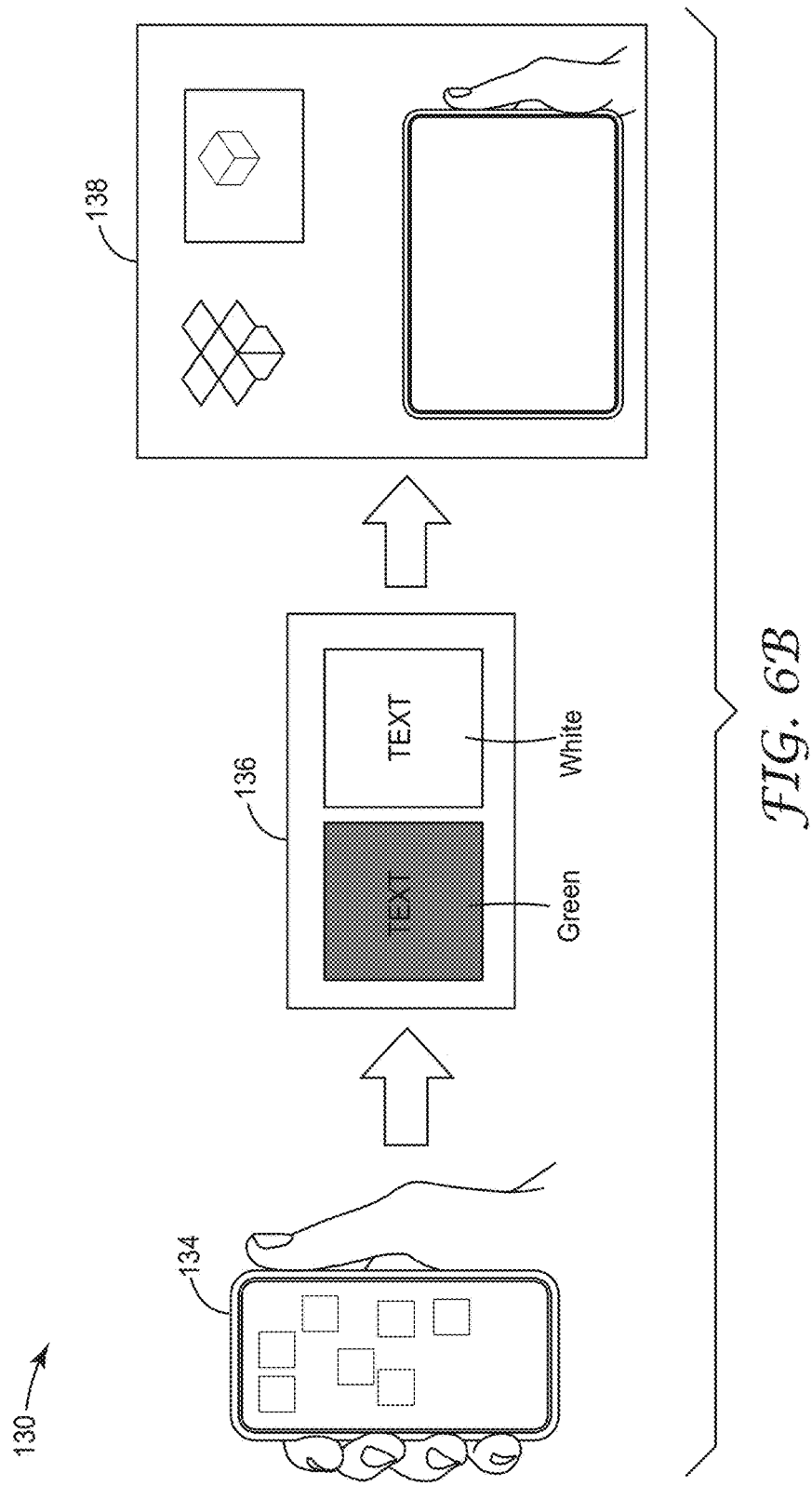

EDITING DIGITAL NOTES REPRESENTING PHYSICAL NOTES

This application claims the benefit of U.S. Provisional Application No. 61/891,442, filed Oct. 16, 2013, the entire content of which is incorporated by reference herein in its entirety.

TECHNICAL FIELD

The present disclosure relates to note content capturing, recognition, extraction, and/or management tools and systems.

BACKGROUND

Paper notes have been broadly used in recording, sharing, and communicating ideas and information. For example, during a collaboration session (e.g., brainstorming session), participants write down ideas on Post-It® notes, whiteboard, or paper, and then share with one another. In addition, people commonly use notes throughout the day to memorialize information or content which the individual does not want to forget. As additional examples, people frequently use notes as reminders of actions or events to take in the future, such as to make a telephone call, revise a document or to fill out a time sheet.

For example, in many situations people participate in a collaboration session by writing information on paper-based notes, such as Post-It® notes. Paper Post-It® notes can readily be removed from a dispenser pad of sticky-back paper Post-It® notes and applied to various surfaces, such as whiteboards, documents, the tops of desks, telephones, or the like. Information can be written on paper Post-It® notes either before or after the paper Post-It® notes are detached from their dispenser pad or attached to their target surfaces. Paper Post-It® notes can be easily moved from one surface to another, such as between documents or between documents and the tops of desks, they can overlap edges or boundaries of documents, they can be layered, and they can be moved with the objects to which they are attached.

Software programs currently exist which permit computer users to generate software-based notes in digital form and to utilize the digital notes within computing environments. For example, a computer user may create digital notes and "attach" the digital notes to an electronic document, a desktop, or an electronic workspace presented by the computing environment. The computer user may manipulate the notes, allowing the notes to be created, deleted, edited, saved, and selectively viewed. The computer user may move such a note within a document, or between documents and/or the desktop, by cutting the note from a document, storing the note in a clipboard, and then pasting the note to another area of the same document or to a different document. In this way, the software programs provide a virtual representation of notes and allow an individual to utilize the digital notes in a manner similar to physical notes that he or she may use on a daily basis.

SUMMARY

In general, the disclosure describes techniques for creating and manipulating software notes representative of physical notes.

In one example, a method includes receiving, by one or more processors of a device, a digital note of a plurality of digital notes generated based on image data comprising a visual representation of a scene that includes a plurality of physical notes such that each of the plurality of digital notes respectively corresponds to a particular physical note of the plurality of physical notes, wherein each of the physical notes includes respective recognizable content; receiving, by the one or more processors, user input indicating a modification to one or more visual characteristics of the digital note; editing, by the one or more processors and in response to the user input, the one or more visual characteristics of the digital note; and outputting, by the one or more processors and for display, a modified version of the digital note that includes the one or more visual characteristics.

In another example, computing device includes a memory configured to store digital notes, and one or more processors. In this example, the one or more processors are configured to receive a digital note of a plurality of digital notes generated based on image data comprising a visual representation of a scene that includes a plurality of physical notes such that each of the plurality of digital notes respectively corresponds to a particular physical note of the plurality of physical notes, wherein each of the physical notes includes respective recognizable content; receive user input indicating a modification to one or more visual characteristics of the digital note; edit, in response to the user input, the one or more visual characteristics of the digital note; and output, for display, a modified version of the digital note that includes the one or more visual characteristics.

In another example, a computing system includes means for receiving a digital note of a plurality of digital notes generated based on image data comprising a visual representation of a scene that includes a plurality of physical notes such that each of the plurality of digital notes respectively corresponds to a particular physical note of the plurality of physical notes, wherein each of the physical notes includes respective recognizable content; means for receiving user input indicating a modification to one or more visual characteristics of the digital note; means for editing, in response to the user input, the one or more visual characteristics of the digital note; and means for outputting, for display, a modified version of the digital note that includes the one or more visual characteristics.

In another example, a computer-readable storage medium stores instructions that, when executed, cause one or more processors of a device to: receive a digital note of a plurality of digital notes generated based on image data comprising a visual representation of a scene that includes a plurality of physical notes such that each of the plurality of digital notes respectively corresponds to a particular physical note of the plurality of physical notes, wherein each of the physical notes includes respective recognizable content; receive user input indicating a modification to one or more visual characteristics of the digital note; edit, in response to the user input, the one or more visual characteristics of the digital note; and output, for display, a modified version of the digital note that includes the one or more visual characteristics.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 4 is a flowchart illustrating one example of a technique used to convert physical notes to digital notes and storing the digital notes in a data storage device.

FIGS. 6A and 6B are a flowchart illustrating another example of a note recognition technique.

DETAILED DESCRIPTION

Figure 1:
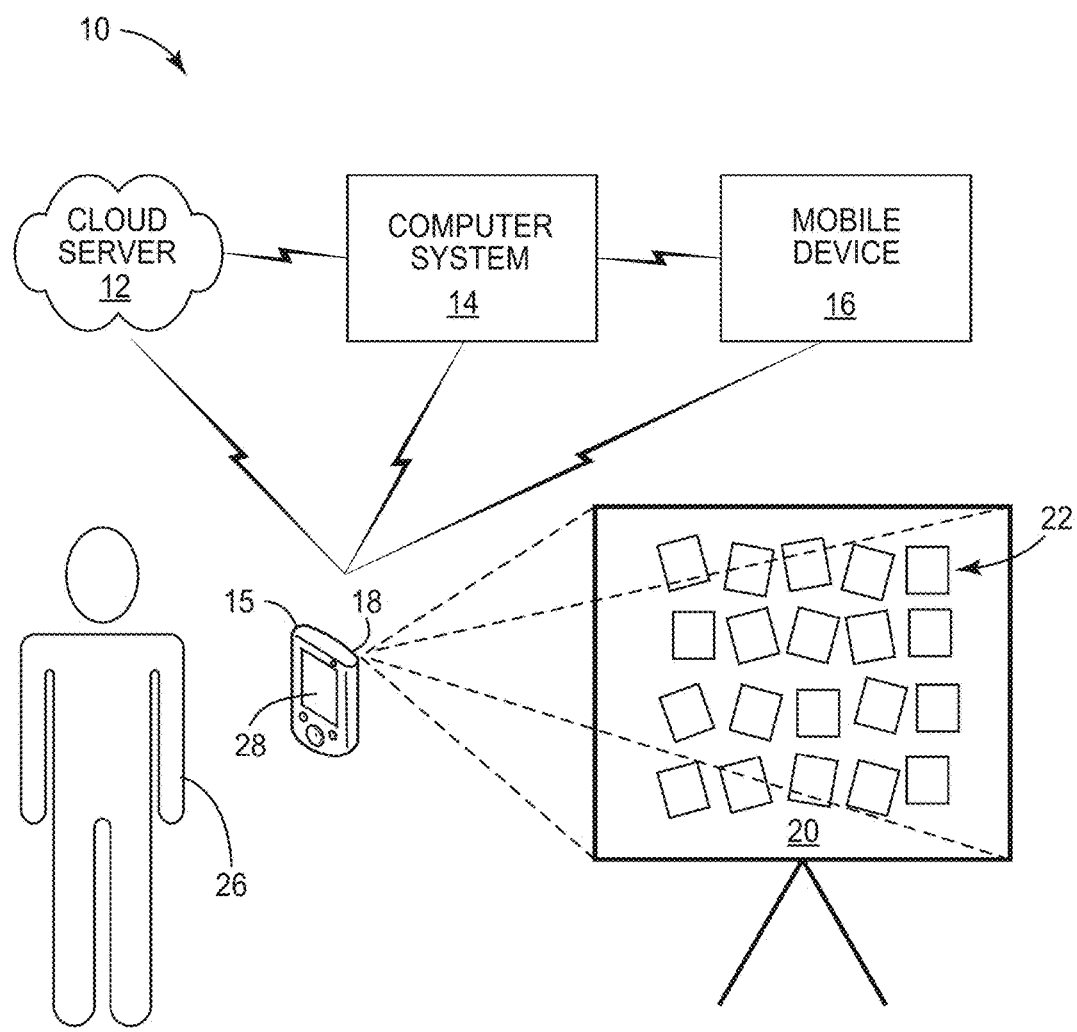
FIG. 1 is a representation illustrating one example of a user capturing an image of a workspace with notes using an image capture device on a mobile device.

The present disclosure describes techniques for creating and manipulating software notes representative of physical notes. For example, techniques are described for recognizing physical notes present within a physical environment, capturing information therefrom and creating corresponding digital representations of the physical notes, referred to herein as digital notes or software-based notes. Further, at least some aspects of the present disclosure are directed to techniques for managing multiple notes, such as storing, retrieving, editing the digital notes, categorizing and grouping the digital notes, or the like.

In general, notes can include physical notes and digital notes. Physical notes generally refer to physical objects with a general boundary and recognizable content. Physical notes can include the resulting objects after people write, draw, or enter via other type of inputs on the objects, for example, paper, white board, or other objects accepting the inputs. By way of examples, physical notes can include hand-written Post-It® notes, paper, or film, white-board with drawings, posters, and signs. In some cases, physical notes can be generated using digital techniques, e.g. printing onto printable Post-It® notes or printed document. In some cases, one object can include several physical notes. For example, several ideas can be written on separate areas of a single piece of poster paper or a white-board. In some implementations, to facilitate the recognition of these notes, marks, such as lines, shapes, colors, symbols, markers, or stickers, can be applied to the edges of the notes. Physical notes can be two-dimensional or three dimensional. Physical notes can have various shapes and sizes. For example, a physical note may be a 7.62×7.62 cm (3×3 inches) note; a physical note may be a 66.04×99.06 cm (26×39 inches) poster; and a physical note may be a triangular metal sign. In some cases, physical notes may have known shapes and/or sizes that conform to standards, such as legal, A3, A4, and other size standards, and known shapes, which may not be limited to geometric shapes, such as stars, circles, rectangles, or the like. In other cases, physical notes may have non-standardized sizes and/or irregular shapes.

Digital notes generally refer to digital objects with information and/or ideas. Digital notes can be generated using digital inputs. Digital inputs can include, for example, keyboards, touch screens, digital cameras, digital recording devices, stylus, digital pens, or the like. In some cases, digital notes may be representative of physical notes.

In some cases, digital notes may be representative of physical notes used in a collaboration space. Collaboration space generally refers to a gathering area allowing more than one person to brainstorm, such as sharing ideas and thoughts with each other. The collaboration space can also represent a virtual space allowing a group of persons to brainstorm, such as sharing ideas and thoughts remotely, besides the gathering area. The collaboration space may be referred to as workspaces, or the like.

FIG. 1 illustrates an example of a note recognition environment 10. In the example of FIG. 1, environment 10 includes a mobile device 15 to capture and recognize one of more notes 22 from a workspace 20. As described herein, mobile device provides an execution environment for one or more software applications that, as described, can efficiently capture and extract note content from a large number of physical notes, such as the collection of notes 22 from workspace 20. In this example, notes 22 may be the results of a collaborative brainstorming session having multiple participants. As described, mobile device 15 and the software executing thereon may perform a variety of note-related operations, including automated creation of digital notes representative of physical notes 22 of workspace 20.

In some examples, the plurality of physical notes 22 of workspace 20 may comprise notes of different color. In other examples, the plurality of physical notes 22 of workspace 20 may comprise at least one note including fiducial markings, such as markings at the upper-right and lower-left corners of the note. In other examples, the plurality of physical notes 22 of workspace 20 may comprise at least one note having one color for the body of the note and another color for the border of the note. In other examples, notes from the plurality of physical notes 22 of workspace 20 may be arranged so that they overlap, such as being arranged in a stacked overlapping relationship. In other examples, notes from the plurality of physical notes 22 of workspace 20 may be arranged adjacently.

In the example implementation, mobile device 15 includes, among other components, an image capture device 18, and a presentation device 28. In addition, although not shown in FIG. 1, mobile device 15 may include one or more processors, microprocessors, internal memory and/or data storage and other electronic circuitry for executing software or firmware to provide the functionality described herein.

In general, image capture device 18 is a camera or other component configured to capture image data representative of workspace 20 and notes 22 positioned therein. In other words, the image data captures a visual representation of an environment, such as workspace 20, having a plurality of visual notes. Although discussed as a camera of mobile device 15, image capture device 18 may comprise other components capable of capturing image data, such as a video recorder, an infrared camera, a CCD (Charge Coupled Device) array, a laser scanner, or the like. Moreover, the captured image data can include at least one of an image, a video, a sequence of images (i.e., multiple images taken within a time period and/or with an order), a collection of images, or the like, and the term input image is used herein to refer to the various example types of image data.

Presentation device 28 may include, but not limited to, an electronically addressable display, such as a liquid crystal display (LCD) or other type of display device for use with mobile device 28. In some implementations, mobile device 15 generates the content to display on presentation device 28 for the notes in a variety of formats, for example, a list, grouped in rows and/or column, a flow diagram, or the like. Mobile device 15 may, in some cases, communicate display information for presentation by other devices, such as a tablet computer, a projector, an electronic billboard or other external device.

As described herein, mobile device 15, and the software executing thereon, provide a platform for creating and manipulating digital notes representative of physical notes 22. For example, in general, mobile device 15 is configured to process image data produced by image capture device 18 to detect and recognize at least one of physical notes 22 positioned within workspace 20. In some examples, the mobile device 15 is configured to recognize note(s) by determining the general boundary of the note(s). After a note is recognized, mobile device 15 extracts the content of at least one of the one or more notes, where the content is the visual information of note 22.

As further described below, mobile device 15 may implement techniques for automated detection and recognition of physical notes 22 and extraction of information, content or other characteristics associated with each of the physical notes. For example, mobile device 15 may allow user 26 fine grain control over techniques used by mobile device 15 to detect and recognize physical notes 22. As one example, mobile device 15 may allow user 26 to select between marker-based detection techniques in which one or more of notes 22 includes a physical fiducial mark on the surface of the note or non-marker based techniques in which no fiducial mark is used.

In addition, mobile device 15 provide user 26 with an improved electronic environment for generating and manipulating corresponding digital notes representative of physical notes 22, including removing background or other image-related artifacts from the notes. As another example, mobile device 15 may provide mechanisms allowing user 26 to easily add digital notes to and/or delete digital notes from a set of digital notes representative of the brainstorming activity associated with workspace 20. In some example implementations, mobile device 15 provides functionality by which user 26 is able to record and manage relationships between groups of notes 22.

In some example implementations, mobile device 15 provides functionality by which user 26 is able to export the digital notes to other systems, such as cloud-based repositories (e.g., cloud server 12) or other computing devices (e.g., computer system 14 or mobile device 16).

In the example of FIG. 1, mobile device 15 is illustrated as a mobile phone. However, in other examples, mobile device 15 may be a tablet computer, a personal digital assistant (PDA), a laptop computer, a media player, an e-book reader, a wearable computing device (e.g., a watch, eyewear, a glove), or any other type of mobile or non-mobile computing device suitable for performing the techniques described herein.

Figure 2:
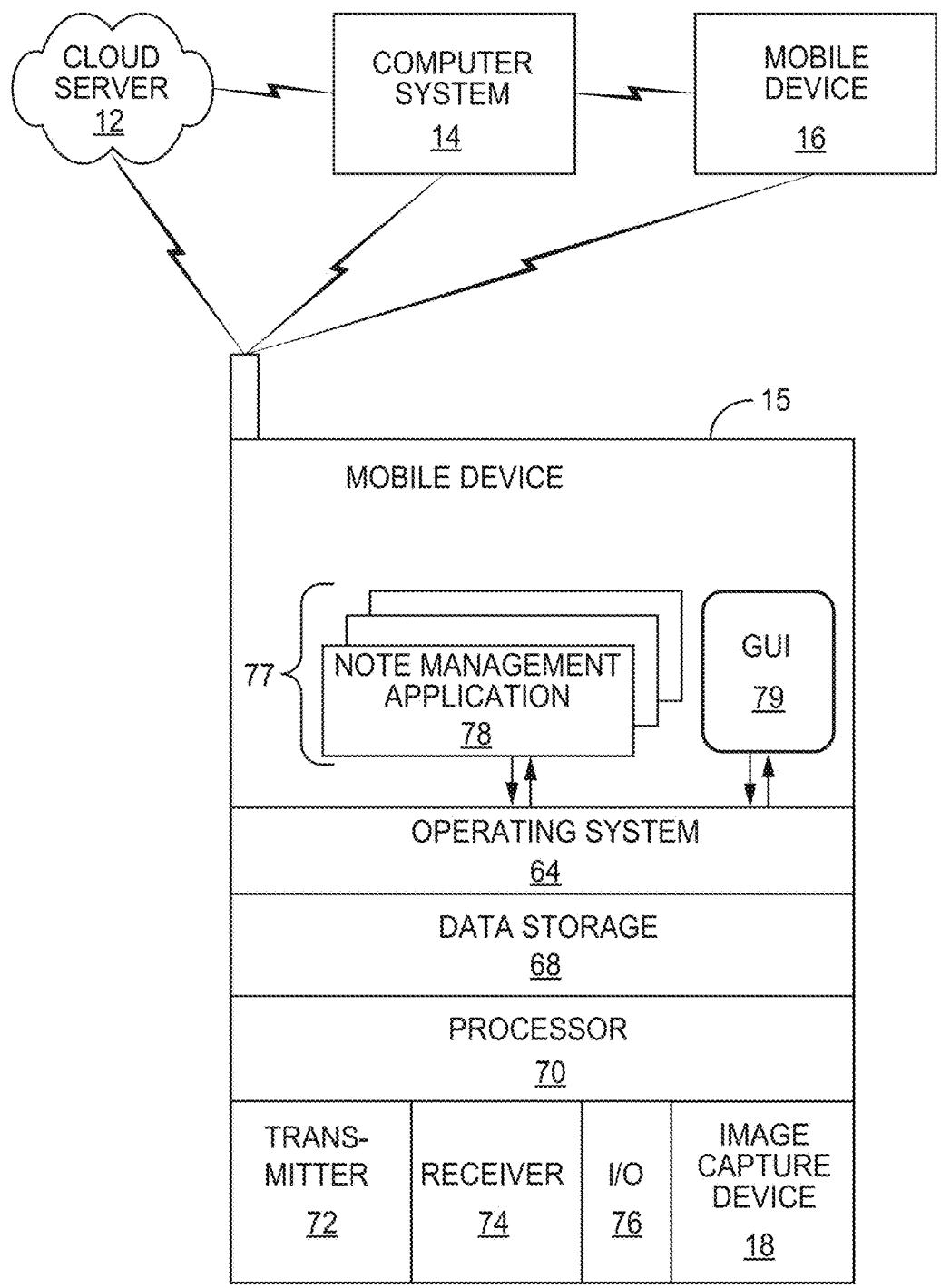
FIG. 2 is a block diagram illustrating one example of a mobile device.

FIG. 2 illustrates a block diagram illustrating an example of a mobile device that operates in accordance with the techniques described herein. For purposes of example, the mobile device of FIG. 2 will be described with respect to mobile device 15 of FIG. 1

In this example, mobile device 15 includes various hardware components that provide core functionality for operation of the device. For example, mobile device 15 includes one or more programmable processors 70 configured to operate according to executable instructions (i.e., program code), typically stored in a computer-readable medium or data storage 68 such as static, random-access memory (SRAM) device or Flash memory device. I/O 76 may include one or more devices, such as a keyboard, camera button, power button, volume button, home button, back button, menu button, or presentation device 28 as described in FIG. 1. Transmitter 72 and receiver 74 provide wireless communication with other devices, such as cloud server 12, computer system 14, or other mobile device 16 as described in FIG. 1, via a wireless communication interface as described in FIG. 1, such as but not limited to high-frequency radio frequency (RF) signals. Mobile device 15 may include additional discrete digital logic or analog circuitry not shown in FIG. 2.

In general, operating system 64 executes on processor 70 and provides an operating environment for one or more user applications 77 (commonly referred to "apps"), including note management application 78. User applications 77 may, for example, comprise executable program code stored in computer-readable storage device (e.g., data storage 68) for execution by processor 70. As other examples, user applications 77 may comprise firmware or, in some examples, may be implemented in discrete logic.

In operation, mobile device 15 receives input image data and processes the input image data in accordance with the techniques described herein. For example, image capture device 18 may capture an input image of an environment having a plurality of notes, such as workspace 20 of FIG. 1 having of notes 22. As another example, mobile device 15 may receive image data from external sources, such as cloud server 15, computer system 14, or mobile device 16, via receiver 74. In general, mobile device 15 stores the image data in data storage 68 for access and processing by note management application 78 and/or other user applications 77.

As shown in FIG. 2, user applications 77 may invoke kernel functions of operating system 64 to output a graphical user interface (GUI) 79 for presenting information to a user of mobile device. As further described below, note management application 78 may construct and control GUI 79 to provide an improved electronic environment for generating and manipulating corresponding digital notes representative of physical notes 22. For example, note management application 78 may construct GUI 79 to include a mechanism that allows user 26 to easily add digital notes to and/or deleting digital notes from defined sets of digital notes recognized from the image data. In some example implementations, note management application 78 provides functionality by which user 26 is able to record and manage relationships between groups of the digital notes by way of GUI 79.

Figure 3:
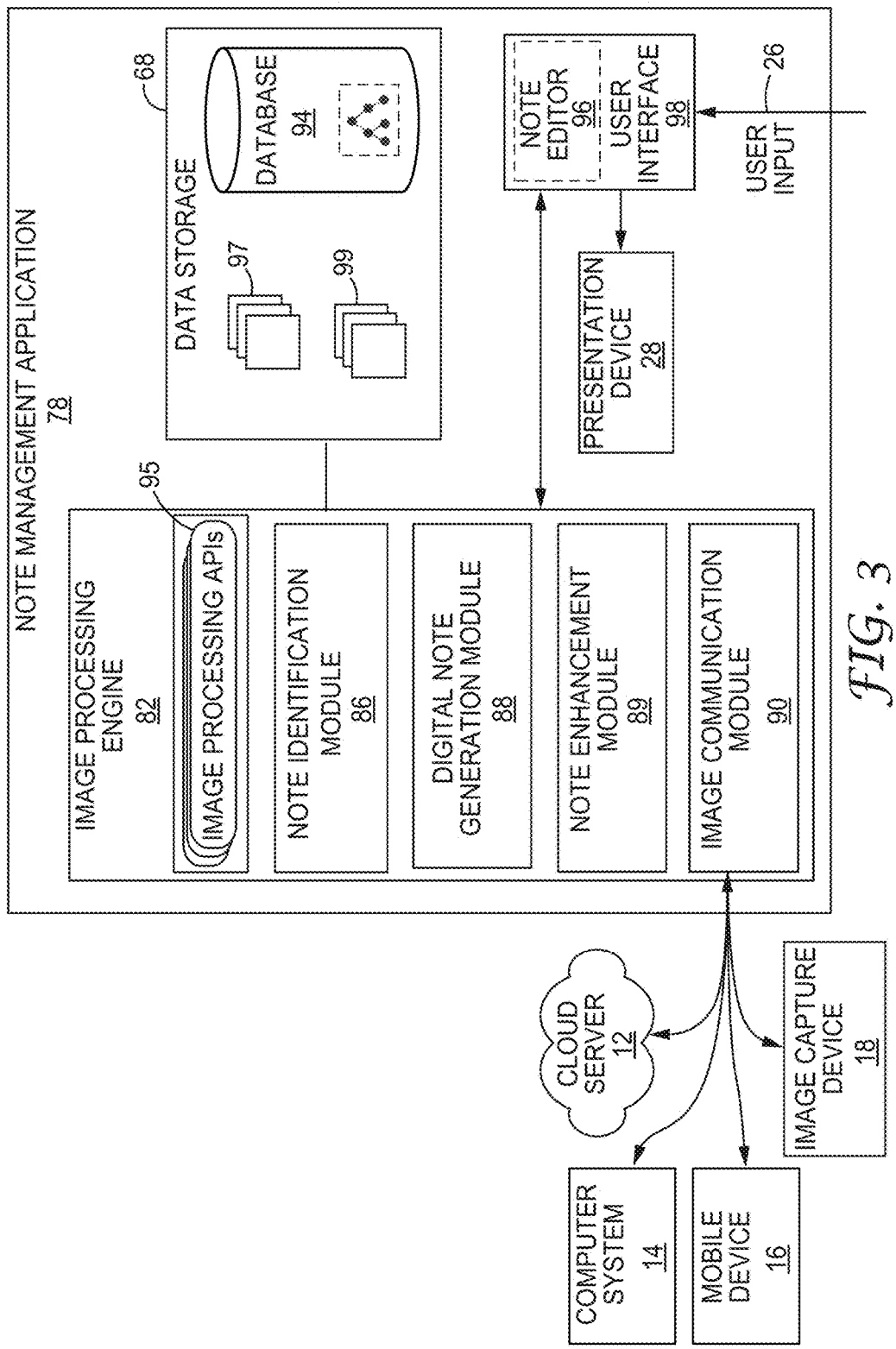
FIG. 3 is a block diagram illustrating one example of a user application to process the input image.

FIG. 3 is a block diagram illustrating one example implementation of note management application 78 that operates in accordance with the techniques described herein. Although described as a user application 77 executing on mobile device 15, the examples described herein may be implemented on any computing device, such as cloud server 12, computer system 14, or other mobile devices.

In this example, user application 78 includes image processing engine 82 that provides image processing and object recognition functionality. Image processing engine 82 may include image communication module 90, note identification module 86, digital note generation module 88, and note enhancement module 89. In addition, image processing engine 82 includes image processing Application Programming Interfaces (APIs) 95 that provide a library of image manipulation functions, e.g., image thresholding, masking, filtering, edge detection, and the like, for use by the other components of image processing engine 82.

In general, image data may be stored in data storage device 68. In this example, note management application 78 stores images 97 within data storage device 68. Each of images 97 may comprise pixel data for environments having a plurality of physical images, such as workspace 20 of FIG. 1.

As described herein, note identification module 86 processes images 97 and identifies (i.e., recognizes) the plurality of physical notes in the images. The input image may be processed by note identification module 86 using marker and/or non-marker detection processes. Digital note generation module 88 generates digital notes 99 corresponding to the physical notes recognized within images 97. For example, each of digital notes 99 corresponds to one of the physical notes identified in an input image 97. During this process, digital note generation module 88 may update database 94 to include a record of the digital note, and may store within the database information (e.g., content) captured from boundaries of the physical note within the input image as detected by note identification module 86. Moreover, digital note generation module 88 may store within database 94 metadata associating the digital notes into one or more groups of digital notes.

Note enhancement 89 enables editing and/or enhancement of digital notes, such as digital notes generated by digital note generation module 88. For instance, note enhancement module 89 may include a process or processes that enhance the extracted information from the input image. As one example, note enhancement module 89 may include a process or processes to enhance the extracted information from the input image in accordance with the techniques of FIGS. 26 and 27. As another example, note enhancement module 89 may by invoked by note editor 96 to enable editing of digital notes in accordance with the techniques of FIGS. 28-30. Note enhancement module 89 may be configured to receive digital notes from data storage 68 and store edited digital notes to data storage 68. In some examples, note enhancement module 89 may store an edited and/or enhanced digital note to data storage 68 by storing the digital note along with one or more objects that correspond to edits and/or enhancements of the digital note (e.g., shape layer objects of FIG. 29).

Image communication module 90 controls communication of image data between mobile device 15 and external devices, such as cloud server 12, computer system 14, mobile device 16, or image capture device 18. In some examples, image communication modules 90 may, for example, allow a user to communicate processed or unprocessed images 97 of environments and/or digital notes and associated information extracted therefrom including metadata from database 68. In some examples, image communication module 90 exports this data to a zip file that may be communicated by FTP, HTTP, email, Bluetooth, or other mechanism.

In the example of FIG. 1, note management application 78 includes user interface 98 that constructs and controls GUI 79 (FIG. 2). As described below, user interface 98 may, in some examples, output for display an input image 97 overlaid with the plurality of digital notes 99, where each of the digital notes is overlaid in place of a corresponding physical note. In addition, user interface 98 may display a group of digital notes 99 that has been designated by the user. This group of digital notes 99 may be, for example, a subset of the digital notes recognized in a particular input image 97. User interface 98 may display this designated group (set) of the digital notes on a second portion of GUI 79 and allow user 26 to easily add or remove digital notes 99 from the designated group.

In some example implementations, user interface 98 provides a note editor 96 that allows a user to edit the overlay image and/or the digital notes. For instance, note editor 96 may allow a user to edit the digital notes in accordance with the techniques of FIGS. 28-29A, 29B. In some examples, note editor 96 may invoke one or more components of image processing engine 82, such as note enhancement module 89, to perform edits on the digital notes.

Additional example details of note management application 78 for detecting and recognizing physical notes are described in U.S. Patent Application 61/844,140, filed Jul. 9, 2013 entitled SYSTEMS AND METHODS FOR NOTE RECOGNITION AND MANAGEMENT USING COLOR CLASSIFICATION," U.S. Patent Application 61/844,152, filed Jul. 9, 2013, entitled "SYSTEMS AND METHODS FOR NOTE CONTENT EXTRACTION AND MANAGEMENT USING SEGMENTED NOTES, and U.S. Patent Application 61/844,176, filed Jul. 9, 2013, "SYSTEMS AND METHODS FOR NOTE CONTENT EXTRACTION AND MANAGEMENT BY SEGMENTING NOTES," the entire contents of each of which are incorporated herein by reference.

FIG. 4 is a flowchart illustrating an example of a note recognition process 100 as may be implemented by note management application 78 of mobile device 15. Initially, note identification module 86 of note management application 78 captures an input image of a plurality of notes through image acquisition (102). In some examples, the notes are physical notes and it is more efficient to capture more than one note at a time. Next, note identification module 86 recognizes one of the plurality of notes from the input image (104). For example, note identification module 86 may recognize note features using a color detection module, a shape detection module, and a pattern detection module, and subsequently determine the general boundary of the note.

Digital note generation module 88 extracts content of the one of the plurality of notes to create sub-images (106). In some examples, digital note generation module 88 can apply image transformation to at least part of the input image before extracting content. In some other examples, digital note generation module 88 can apply image enhancement or another image processing technique, such as removing a background of the underlying workspace or changing the color of each note in the plurality of notes, to improve the quality of the extracted content or sub-images (108). For instance, digital note generation module 88 can apply image enhancement in accordance with the techniques of FIG. 25. In yet other examples, digital note generation module 88 can further recognize text and figures from the extracted content or sub-images. Digital note generation module 88 stores the enhanced extracted content or sub-images to data storage 68 of mobile device 15, and may communicate the digital notes to cloud server 12 or other computer system 14 (110). Program code or other executable instructions for causing a programmable processor to perform process 100 may be stored within a computer-readable storage of mobile device 15.

Figure 5:
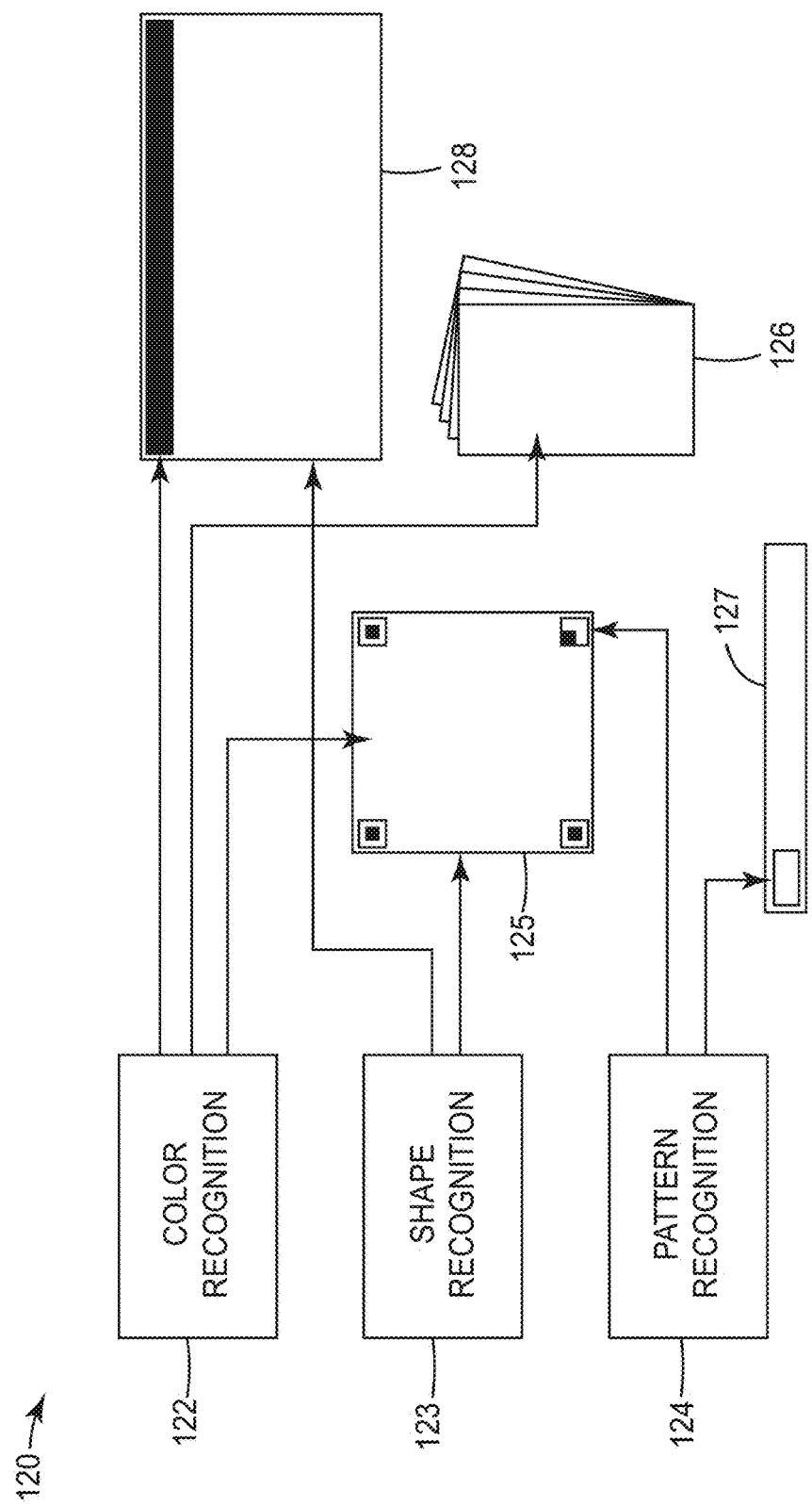
FIG. 5 is a block diagram illustrating an example of a note recognition technique which may use multiple note recognition modules to recognize notes and extract the content of notes.

FIG. 5 is a flow diagram illustrating an example of note recognition technique 120 in which note identification module 86 may use multiple detection modules to recognize notes and extract the content of notes. In some examples, the detection modules may include a color detection module, a shape detection module, and a pattern detection module. In one example, a color detection module may use color spaces such as the RGB (red, green, and blue), LAB (e.g., Hunter 1948 L,a,b color space, CIE 1976 (L*, a*, b*) color space), CMYK (cyan, magenta, yellow, and key (black)), HSV (hue, saturation, and value) etc. to identify regions of interest corresponding to the notes 125, 126, 127, 128 for color recognition 122. In other examples of the shape detection module and pattern detection modules, the notes 125, 126, 127, 128 are further distinguished in their shape and due to the presence of unique patterns detected by shape recognition algorithm 123 (e.g., Hough transform, shape context, etc.) and pattern recognition algorithm 124 (e.g., Support Vector Machine, cross-correlation, template matching, etc.), respectively. These algorithms 122, 123, 124 may help filter out unwanted objects in the input image or other sources of the content of notes 125, 126, 127, 128 and leave only those regions of interest corresponding to notes 125, 126, 127, 128. In another example, a computer system may be configured to execute any variation of technique 120. In another example, a non-transitory computer-readable medium including instructions for causing a programmable processor to execute may execute any variation of technique 120.

FIGS. 6A and 6B together are a flowchart illustrating another example of a note recognition process 130. Initially, process 130 captures an input image, such as an image of plurality of notes 22 of brainstorm session 20 through image acquisition as described in FIGS. 1-3 (132). In some examples, the notes are physical notes and it is more efficient to capture more than one note at a time. Next, process 130 recognizes from the input image one or more notes of plurality of notes 22 as described in FIG. 1, which the user, such as user 26 of FIG. 1, may select (134). For example, process 130 can recognize note features using a color detection module, a shape detection module, and a pattern detection module, and subsequently determine the boundary of the note as described in FIG. 5. Next, digital note generation module 88 extracts content of each note of plurality of notes 22 to create sub-images (136). In some examples, digital note generation module 88 can apply image transformation to at least part of the input image before extracting content (not shown in FIGS. 6A and 6B). In some other examples, note enhancement module 89 can apply image enhancement or other image processing technique, such as removing the background from the image of the workspace or enhancing pixel data (e.g., sharpening) associated with each of the digital notes to improve the quality of the extracted content or sub-images (136). In the example of FIG. 6B, note enhancement module 89 has, in response to user input, changed a digital note from green to white to provide increased readability (136). Program code or other executable instructions for causing a programmable processor to perform process 130 may be stored within a computer-readable storage of mobile device 15.

Digital note generation module 88 may further recognize text and figures from the extracted content or sub-images (not shown in FIGS. 6A and 6B). Digital note generation module 88 and/or note enhancement module 89 may store the enhanced extracted content or sub-images to data storage 68 of mobile device 15, and may subsequently communicate the original image data and/or digital notes including extracted information and metadata to cloud server 12 or computer system 14 as described in FIGS. 1-3 (138).

Figure 7A:
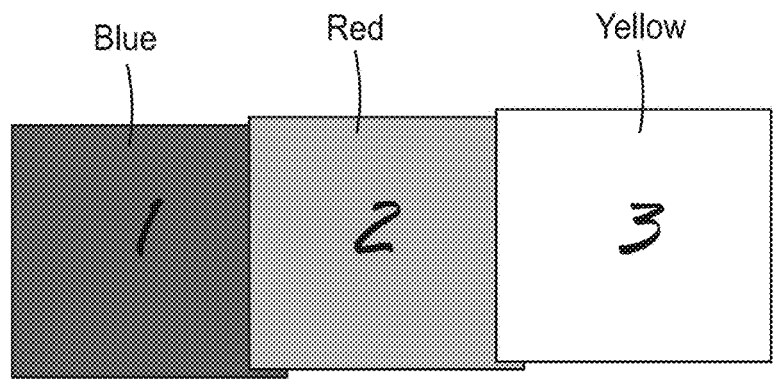
FIGS. 7A-7D are conceptual diagrams illustrating examples of notes that overlap the boundary of another note.
Figure 7B:
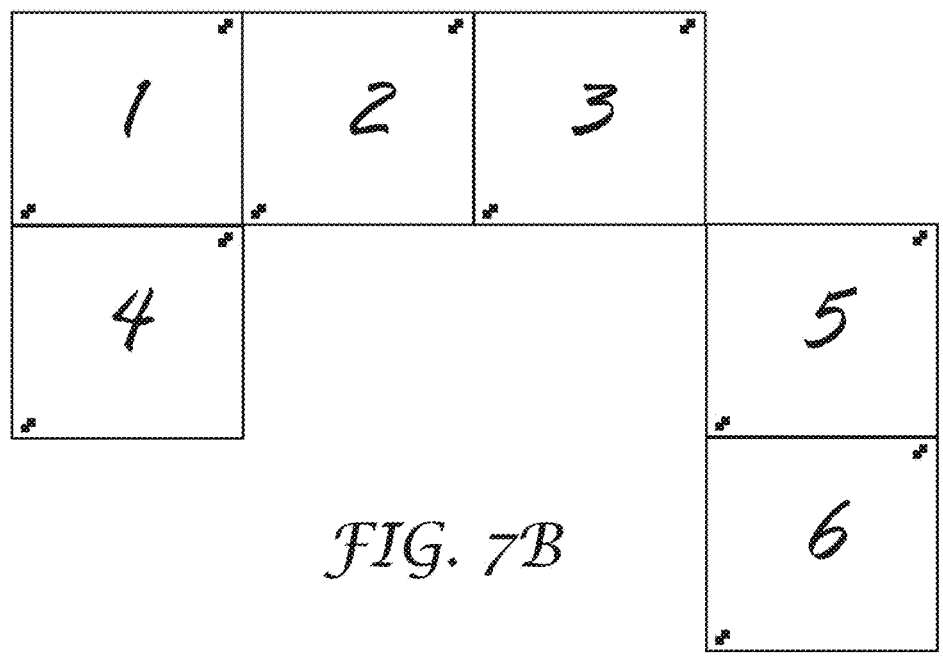
Figure 7C:
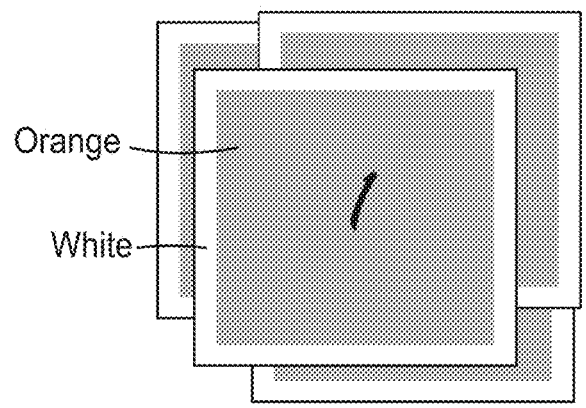
Figure 7D:
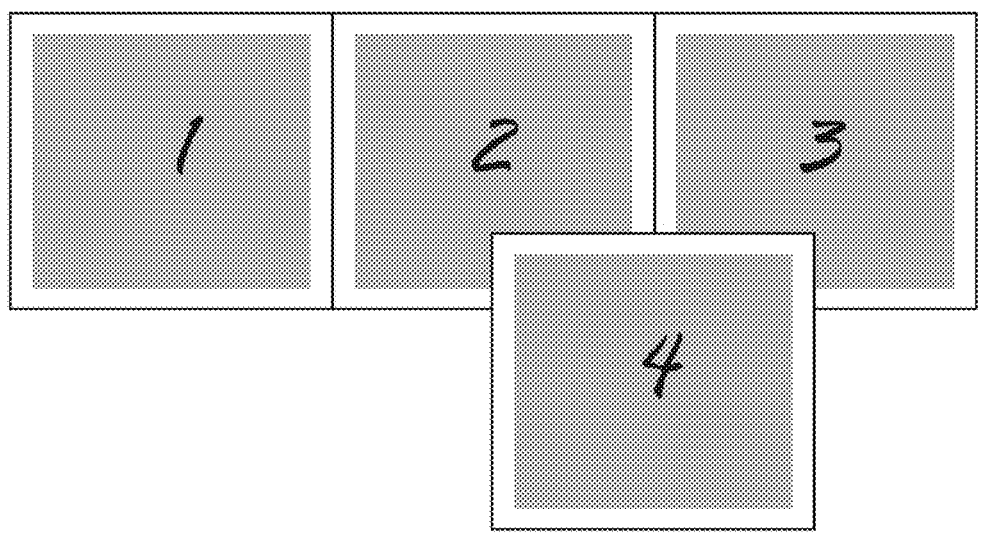

FIGS. 7A-7D are conceptual diagrams illustrating examples of at least one physical note that overlaps the boundary of another note. FIG. 7A is a conceptual diagram illustrating an example of a plurality of adjacent notes 22 of different colors on a workspace 20 that overlap, as described with respect to FIG. 1. FIG. 7B is a conceptual diagram illustrating an example of a plurality of notes 22 of one color including markings at the upper-right and lower-left corners of each note on a workspace 20 that overlap, as described with respect to FIG. 1. FIG. 7C is a conceptual diagram illustrating an example of a plurality of notes 22 in a stacked overlapping relationship, each of notes 22 having one color for the body and another color for the border, on a workspace 20 as described with respect to FIG. 1. FIG. 7D is a conceptual diagram illustrating another example of a plurality of adjacent notes 22 that overlap the boundary of another one or more of notes 22, as described with respect to FIG. 1. FIGS. 7A-7D illustrate some examples of overlapping notes. However, notes 22 could be used in other combinations to create other examples of overlapping notes.

As further described below, physical notes having borders that are different in color from the body of the notes provide a form of a fiducial mark that may be used for color segmentation and detection of the physical notes. As fiducial marks, in some examples, the border color may be selected to provide good color separation from the background color, such as a white or black border color that is different from the background (body) color of the note. As further examples, the border color and the body color may be selected to be complementary colors so as to provide good color separation, such as use of cyan borders or other fiducial marks on a yellow note, thereby providing high color contrast to facilitate identification of the physical note.

In other examples, fiducial marks may be constructed using an invisible ink that may only be visible to the image processing engine. As another example, retro-reflective material may be used on the notes as a fiducial mark that may be responsive to a flash from the imaging device.

Figure 8A:
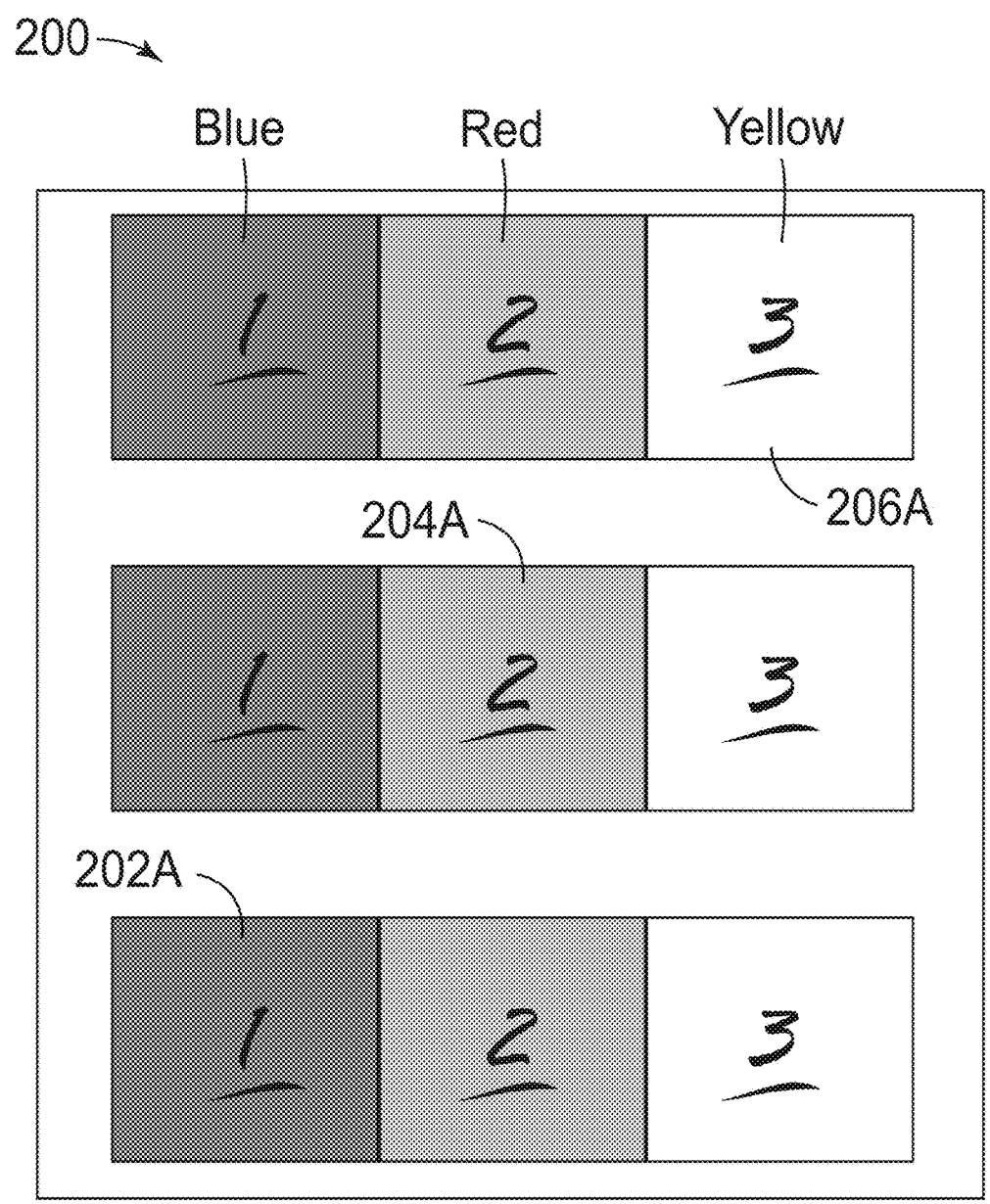
FIGS. 8A and 8B are conceptual diagrams illustrating an example of a technique for detecting and segmenting overlapping notes based on different colors in the overlapping notes and extracting a set of content as note segments.

FIG. 8A is a conceptual diagram illustrating an example technique 200 for detecting and segmenting overlapping and/or adjacent notes by using color classification algorithms. In some cases, the input image is retrieved from a visual representation (not shown in FIG. 8A) if the visual representation is not a single image. For example, the visual representation is a set of images, and the input image retrieved is an aggregation of at least part of the set of images. As another example, the visual representation is a video, and the input image retrieved is a combination of several or all frames of the video.

Upon receiving the input image as described in FIGS. 1-3, note management application 78 executing on mobile device 15, cloud server 12, or computer system 14, identifies a plurality of overlapping physical notes by using a color detection module, which may be a component of note identification module 86. The color detection module may convert the input image to a desirable color space (not shown in FIG. 8A). An example applicable color space includes, but not limited to, RGB (red, green, and blue), LAB (e.g., Hunter 1948 L,a,b color space, CIE 1976 (L*, a*, b*) color space), CMYK (cyan, magenta, yellow, and key (black)), HSV (hue, saturation, and value), HSL (hue, saturation, and lightness), HSI (hue, saturation, and intensity), sRGB (standard red, green, and blue) color space. Next, the color detection module may apply one or more classification functions to color values for each pixel in the input image (not shown in FIG. 8A). The classification functions can be computed using optional training steps. The classification algorithms for the color detection module can be, for example, linear discriminant analysis, quadratic classifier, Gaussian Mixture Models, Boosted Decision Trees, Support Vector Machines or the like. Using the classification algorithms, indicators indicative of color classes for each pixel in the image (not shown in FIG. 8A) are generated. A color class includes a particular range of wavelength or can be an "other" color class referring to any other color besides the color classes of interest. For example, a color class can be magenta, yellow, blue, orange, etc. An indicator can be represented by, for example, a number, a code, a symbol, an alphanumerical token, a color value, a grayscale value, or the like. In another example, technique 200 may also use a shape detection module and a pattern detection module as described in FIG. 5.

Figure 8B:
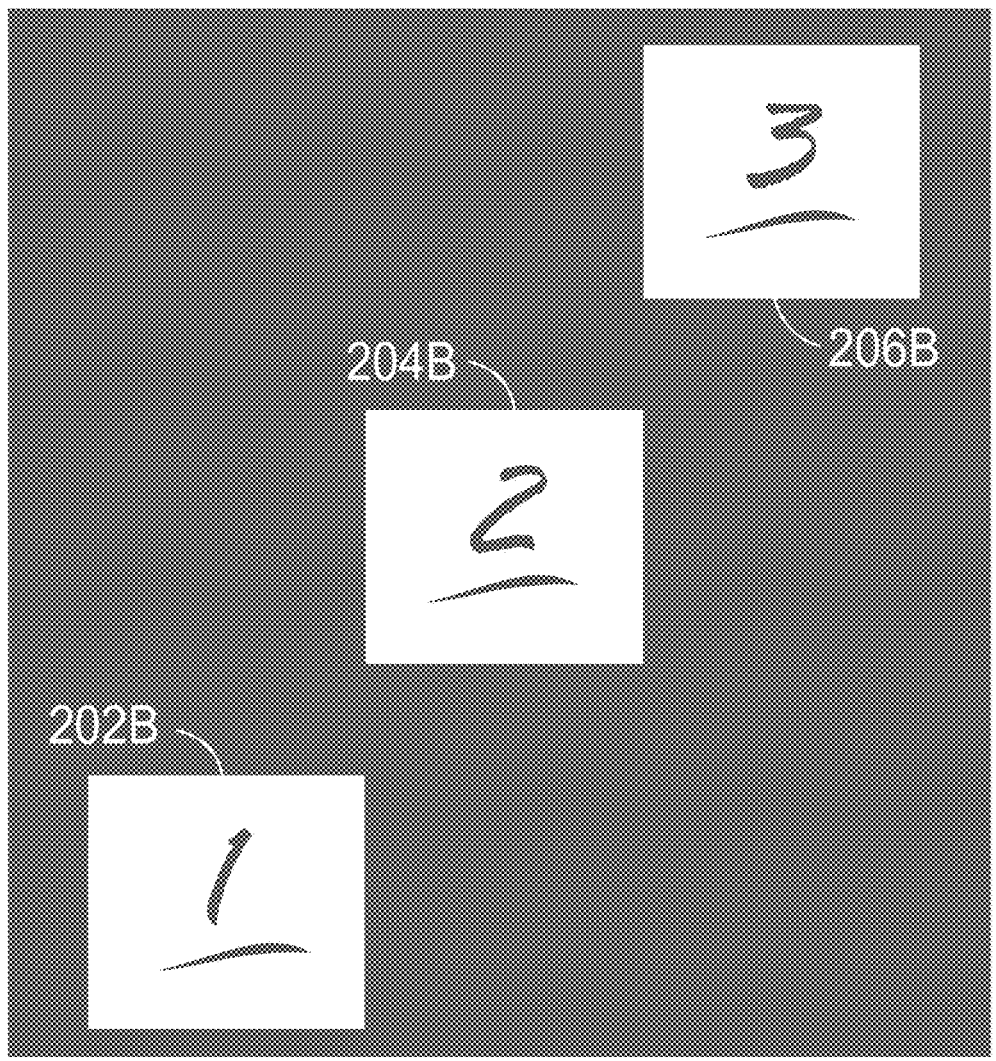

FIG. 8B is a conceptual diagram illustrating an example of technique 200 where based on the indicators, the boundary of note(s) 202B, 204B, 206B or note segment(s) can be determined. In one example, the adjacent pixels with a same indicator are grouped into a region and the boundary of the region can be determined. In some cases, the indicators are further processed using image processing principles, for example, noise filtering, morphological opening, or the like, before the boundary is determined. In some examples, the shape and/or the size of a note or note segment is predetermined, which can be used to determine and/or filter the general boundary of note(s) 202B, 204B, 206B or note segment(s). Using the boundaries, the content of the note(s) 202B, 204B, 206B or note segment(s) can be segmented and extracted to generate segmented digital notes. In another example, technique 200 may also display the input image including the plurality of segmented digital notes in place of the plurality of overlapping notes on a first portion of a graphical user interface and the plurality of digital notes on a second portion of the graphical user interface.

Figure 9A:
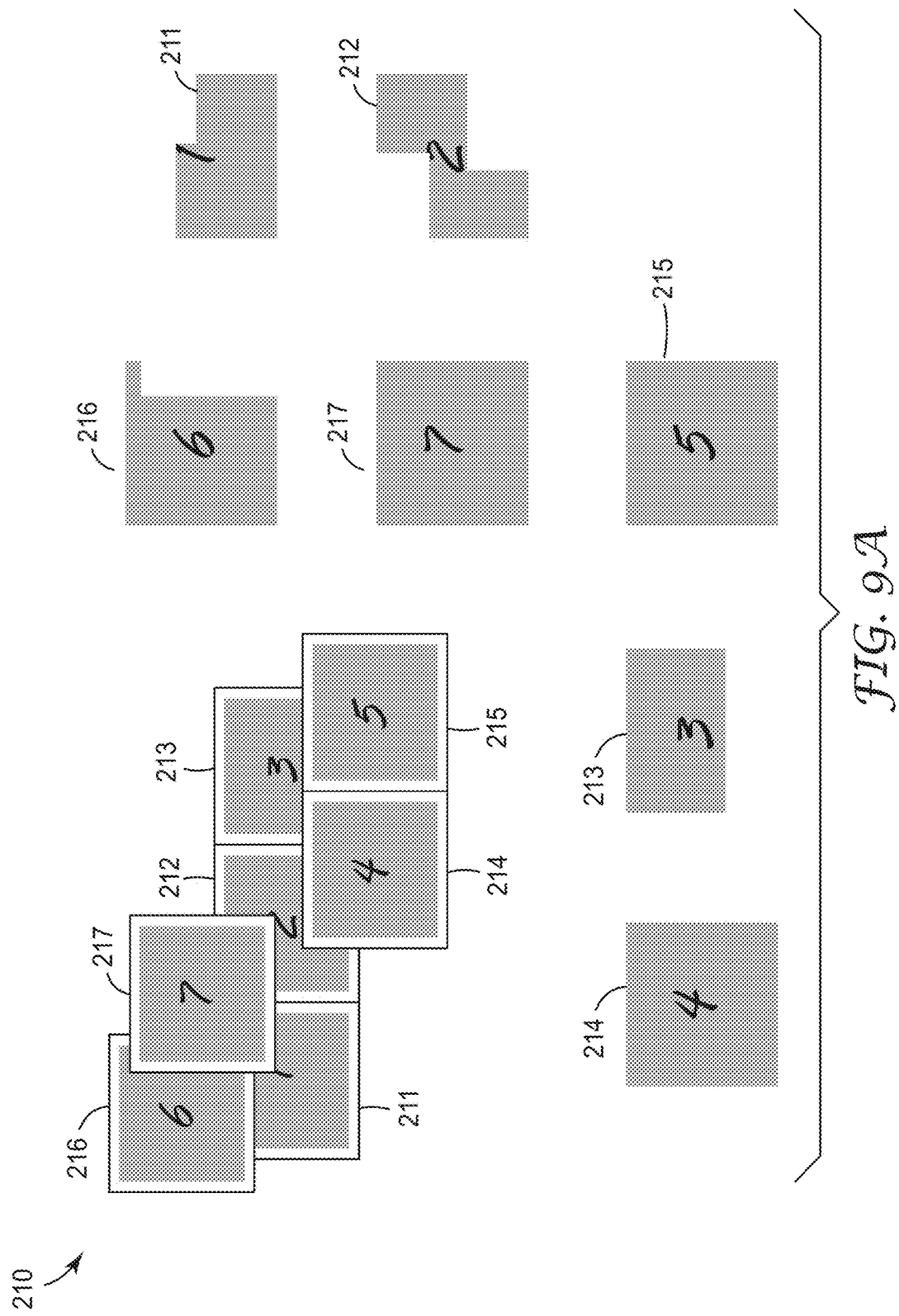
FIGS. 9A and 9B are conceptual diagrams illustrating another example of a technique for detecting and segmenting overlapping notes based on different colors in the overlapping notes and extracting a set of content as note segments.
Figure 9B:
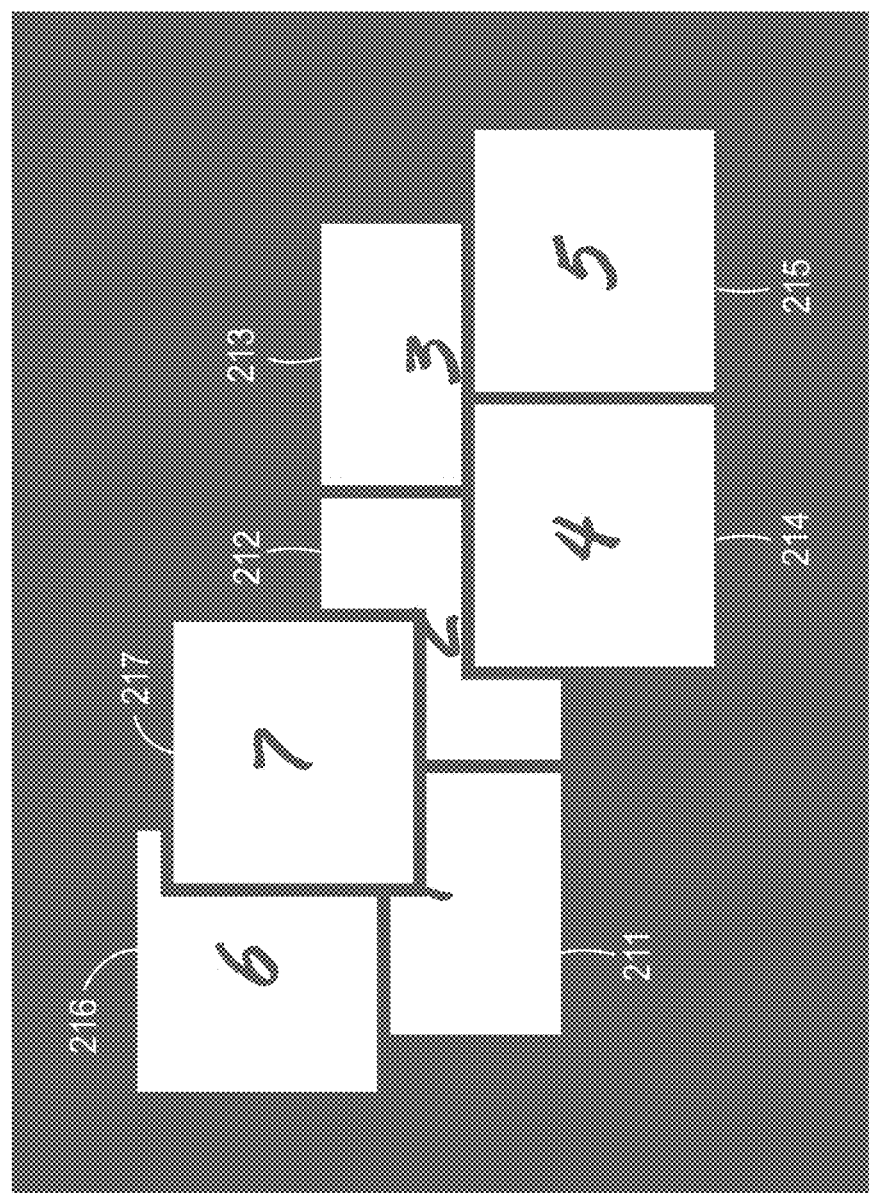

FIGS. 9A and 9B are conceptual diagrams illustrating another example of technique 200 as technique 210 where note(s) 211-217 or note segment(s) overlap and have colored boundaries, borders, or colored mark(s) at one or more locations instead of having a solid color. In one example of technique 210, a color detection module as described in FIG. 8A can be used to identify the boundaries, borders, or marks (as shown in FIG. 9B) and further extract the content of the note(s) 211-217 or note segment(s) (as shown in FIG. 9A).

Figure 10:
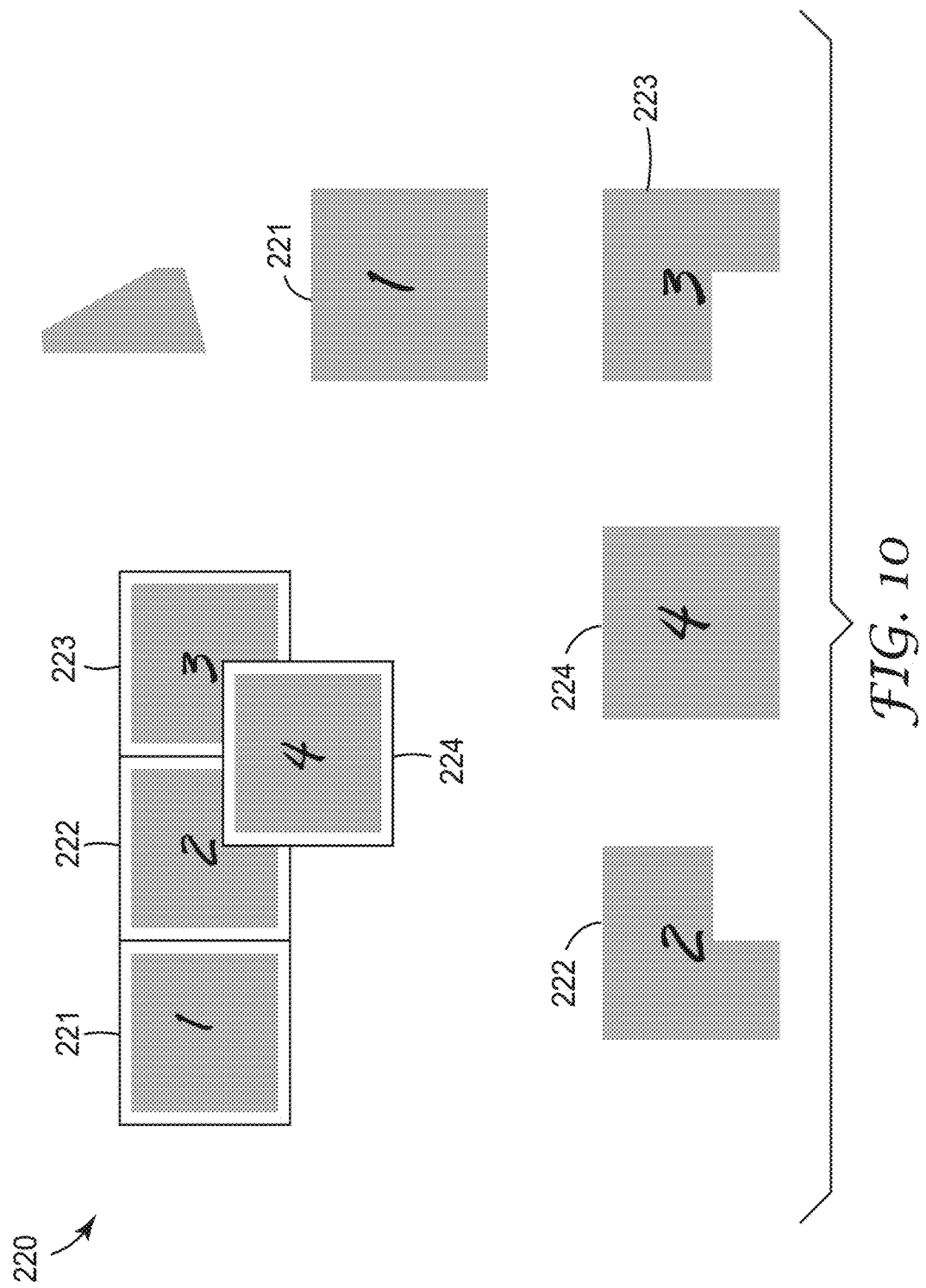
FIG. 10 is a conceptual diagram illustrating another example of a technique for detecting and segmenting overlapping notes based on different colors in the overlapping notes and extracting a set of content as note segments.

FIG. 10 is a conceptual diagram illustrating another example of technique 200 as technique 220 where note(s) 221-224 or note segment(s) overlap and have colored boundaries, borders, or colored mark(s) at one or more locations instead of having solid color. In one example of technique 220, a color detection module as described in FIG. 8A can be used to identify the boundaries, borders, or marks (as shown in FIG. 10) and further extract the content of the note(s) 222-224 or note segment(s) (as shown in FIG. 10).

Figure 11:
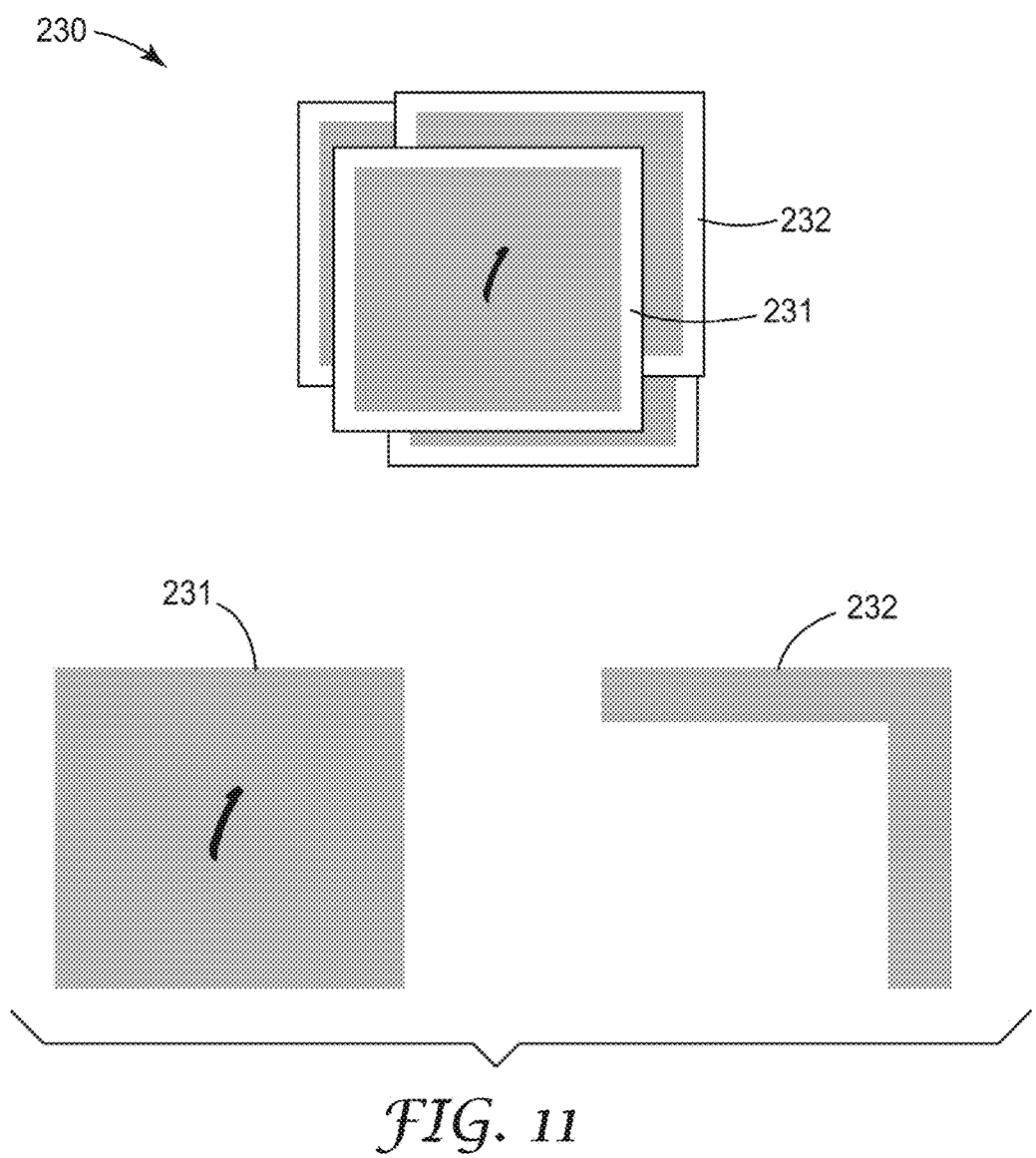
FIG. 11 is a conceptual diagram illustrating another example of a technique for detecting and segmenting overlapping notes based on different colors in the overlapping notes and extracting a set of content as note segments.

FIG. 11 is a conceptual diagram illustrating another example of technique 200 as technique 230 where note(s) 231, 232 or note segment(s) overlap and have colored boundaries, borders, or colored mark(s) at one or more locations instead of having a solid color. In one example of technique 230, a color detection module as described in FIG. 8A can be used to identify the boundaries, borders, or marks (as shown in FIG. 11) and further extract the content of the note(s) 231, 232 or note segment(s) (as shown in FIG. 11).

In another example, a computer system may be configured to execute any variation of techniques 200, 210, 220, 230. In another example, a non-transitory computer-readable medium including instructions that cause a programmable processor to execute may execute any variation of techniques 200, 210, 220, 230.

Figure 12A:
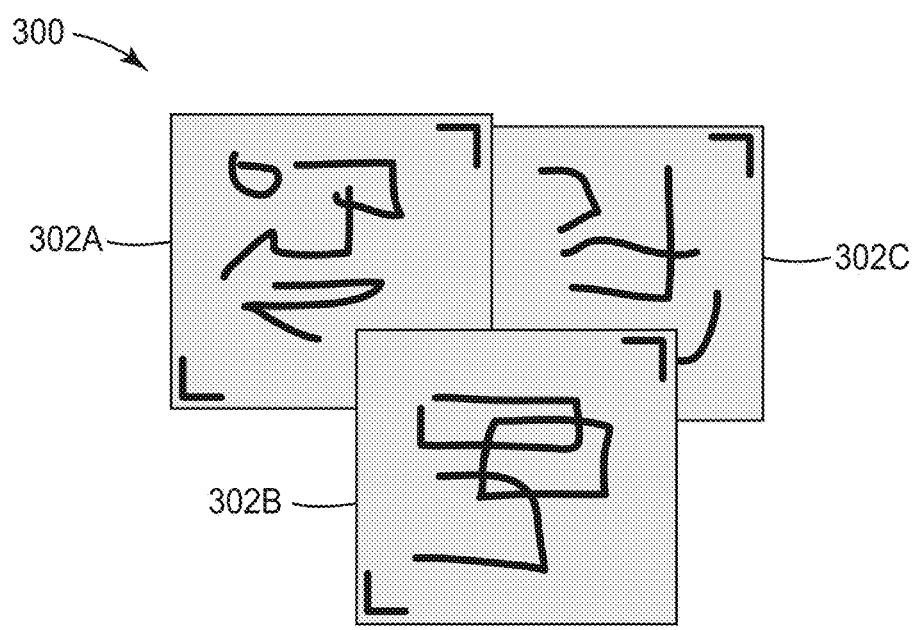
FIGS. 12A-12F and 13 are conceptual diagrams illustrating example aspects of an example technique for segmenting a plurality of overlapping notes when the notes are the same color and extracting a set of content as note segments.
Figure 12B:
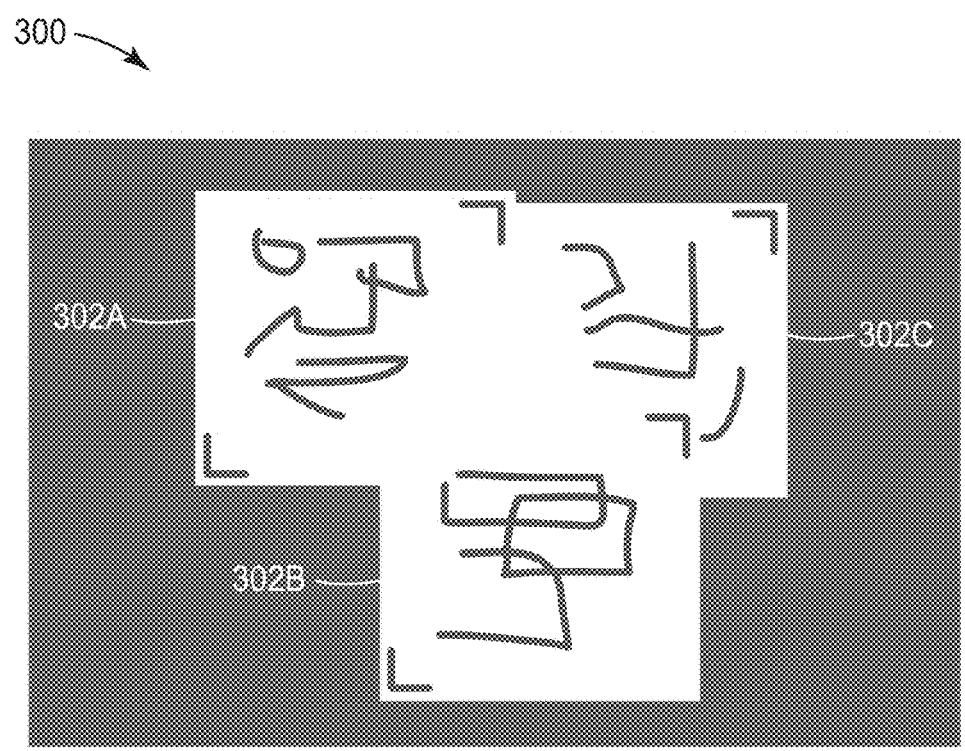
Figure 12C:
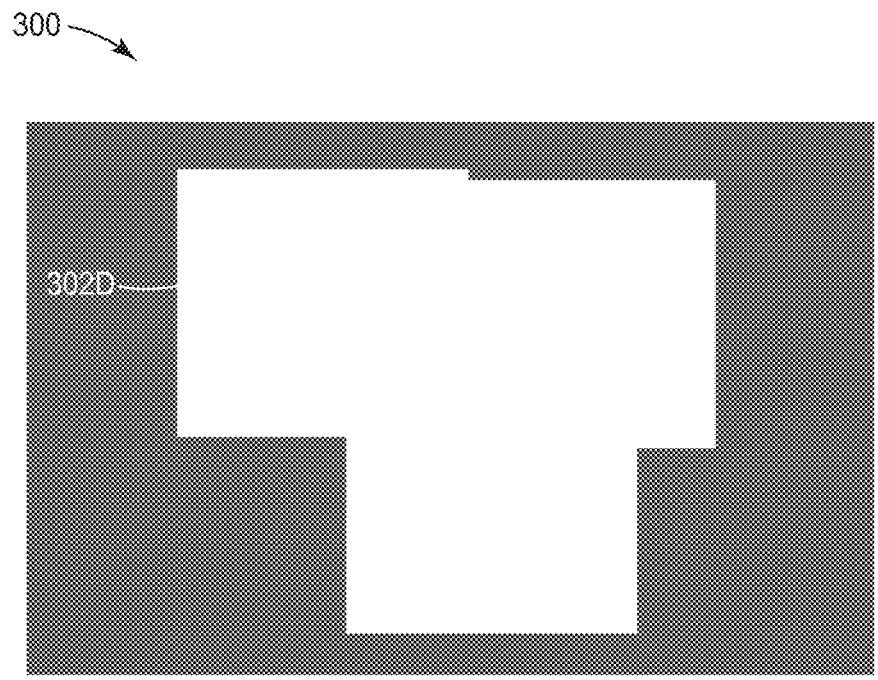
Figure 12D:
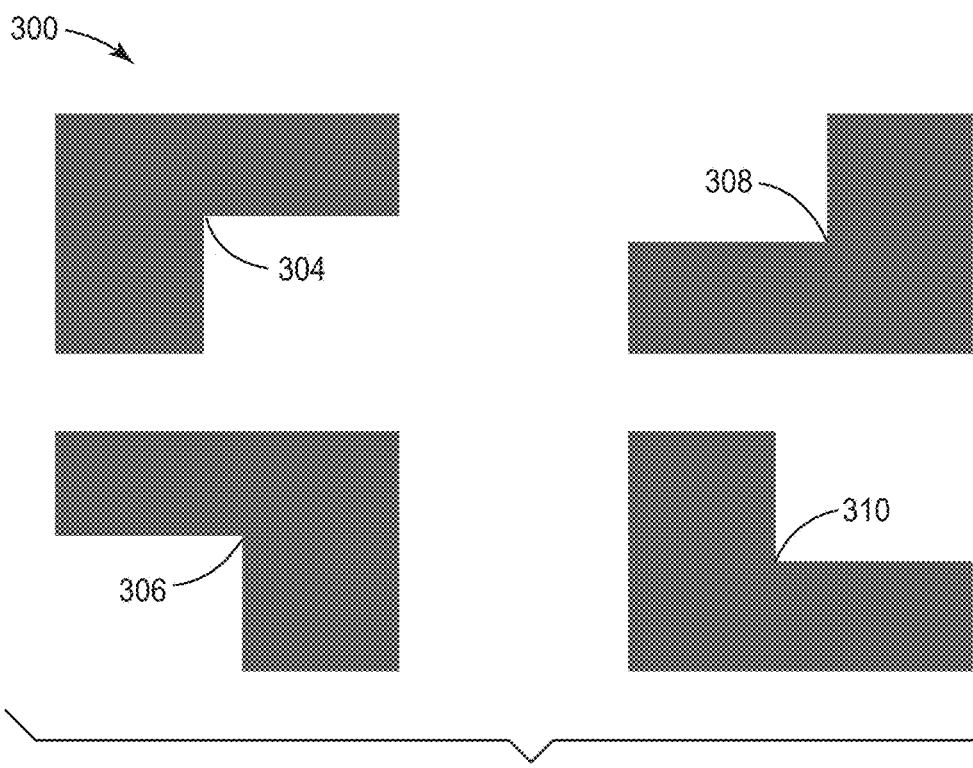
Figure 12E:
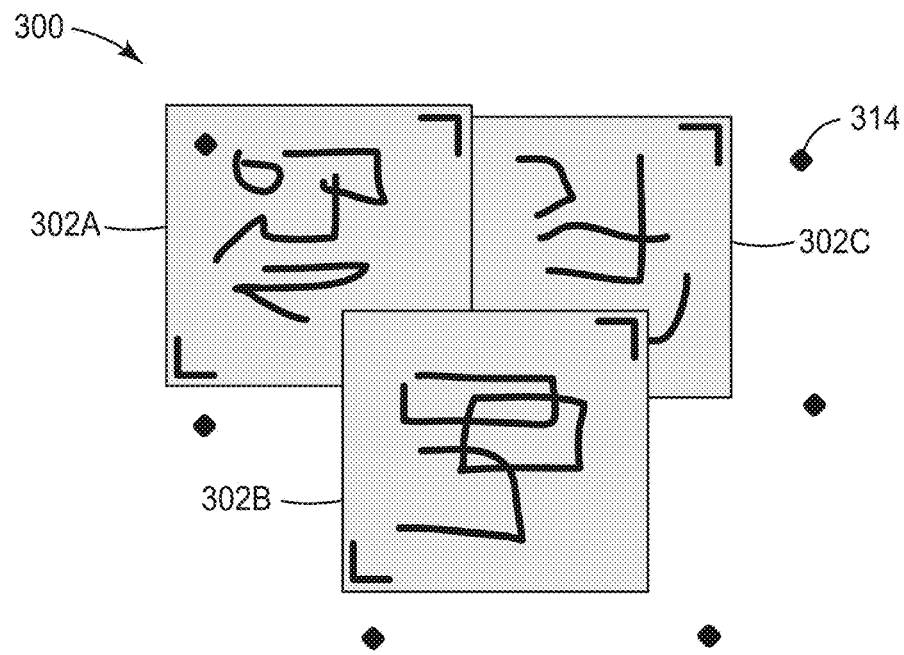
Figure 12F:
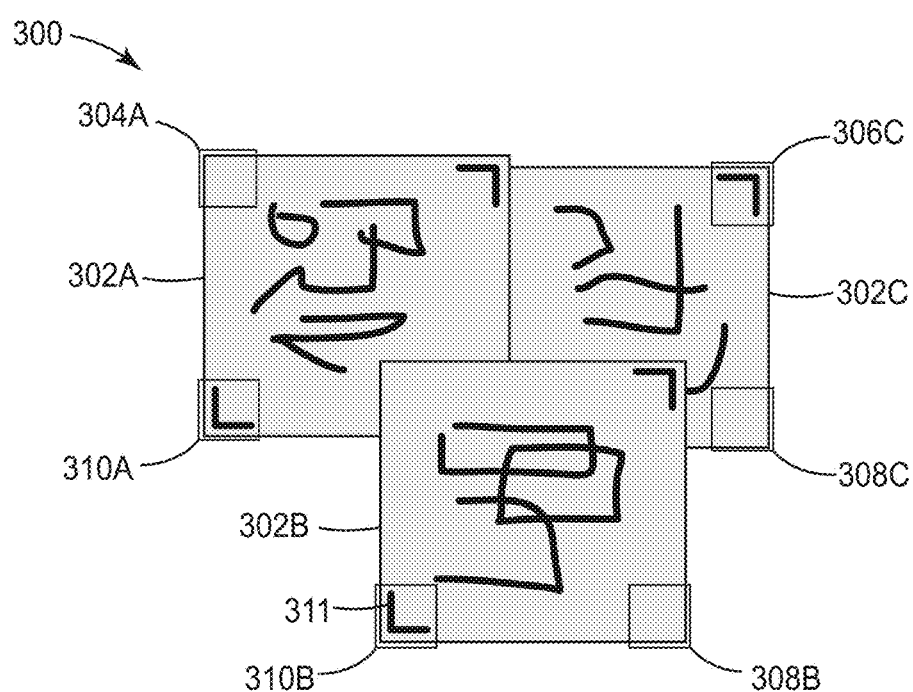
Figure 13:
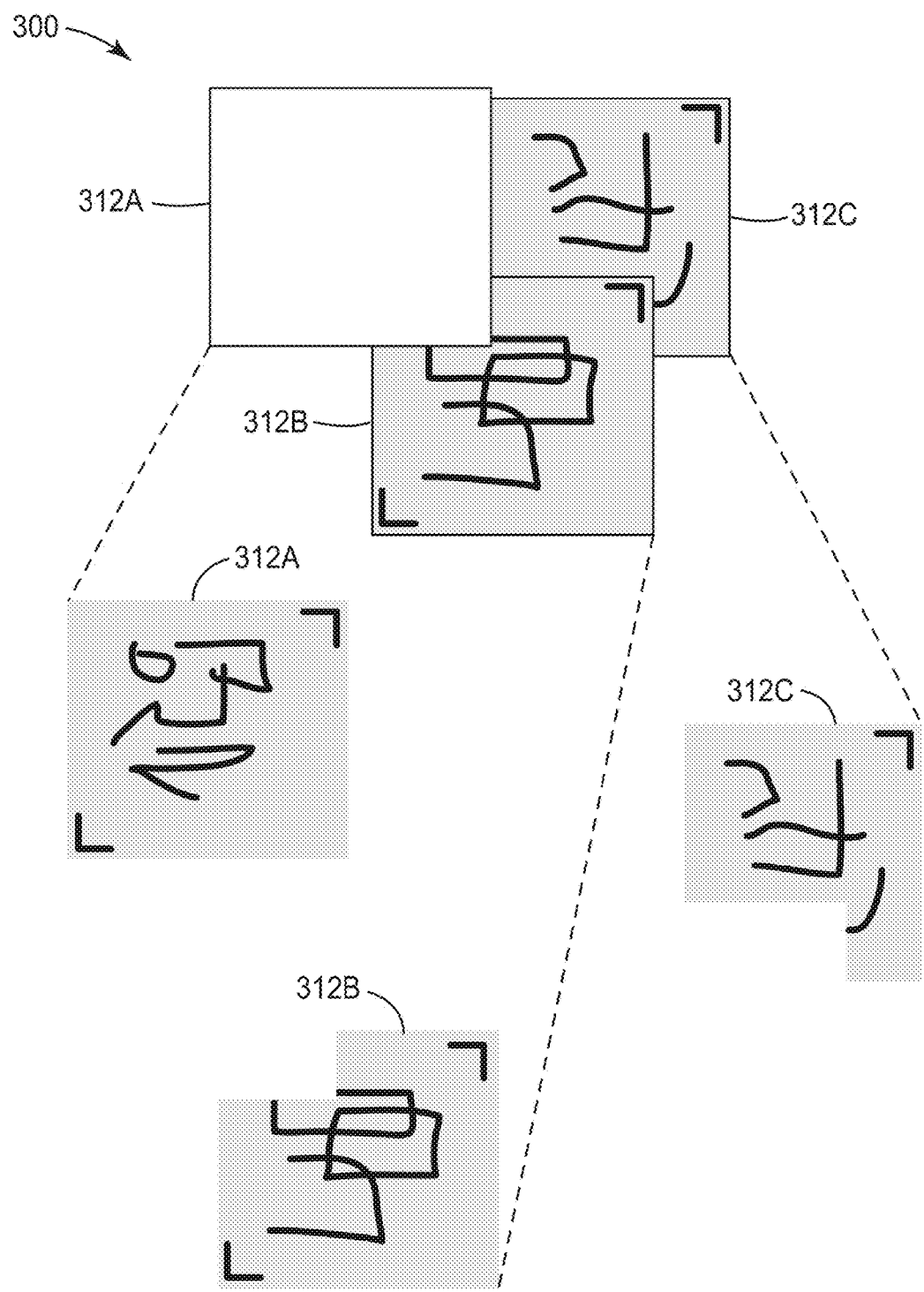
Figure 14:
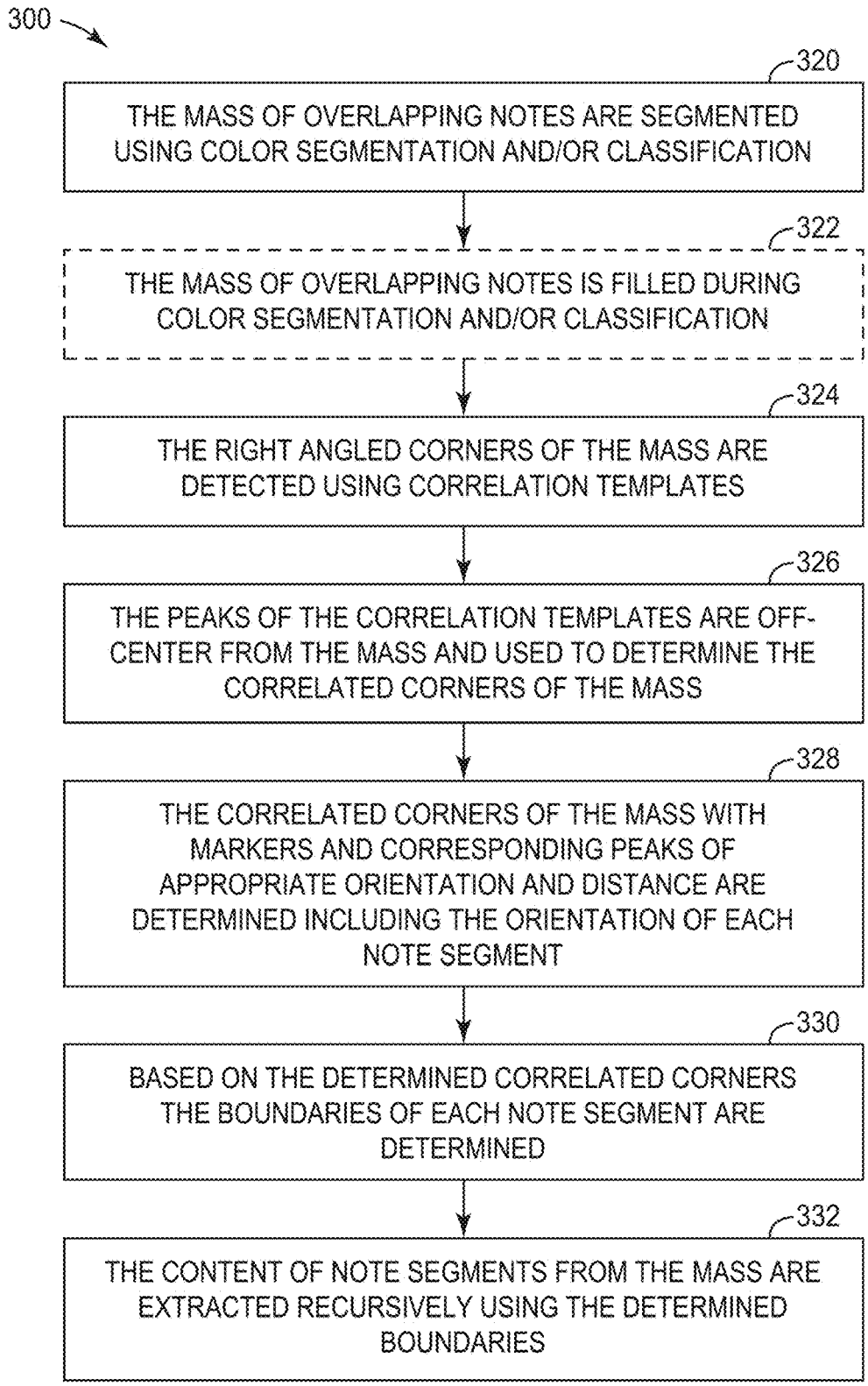
FIG. 14 is a flowchart illustrating the example technique illustrated by FIGS. 12A-12F and 13.

FIGS. 12A-12F and 13 are conceptual diagrams illustrating example aspects of an example technique 300 for segmenting a plurality of overlapping notes when the notes are the same color and extracting a set of content for the note segments, and FIG. 14 is a flowchart illustrating example technique 300. Upon receiving the input image as described in FIGS. 1-3, cloud server 12, computer system 14, mobile devices 15, 16, and/or image processing engine 82 identifies a mass of the plurality of overlapping notes 302A-302C and determines whether the overlapping notes 302A-302C are the same color.

In FIG. 12A overlapping notes 302A-302C are the same color and are segmented using a color detection module as described in FIG. 8A and as shown in FIG. 12B (320 of FIG. 14). Optionally, the mass of plurality of overlapping notes 302A-302C may be filled during the color detection module analysis as shown as mass 302D in FIG. 12C (322 of FIG. 14). The right-angled corners of the mass of plurality of notes 302A-302C are detected using correlation templates 304, 306, 308, 310 (324 of FIG. 14). The peaks 314 of the correlation templates 304, 306, 308, 310 are located off-center and are used to determine the corners of the mass of plurality of notes 302A-302C as shown in FIG. 12E (326 of FIG. 14). The corners of the mass of plurality of notes 302A-302C with marks 311 applied to one or more corners along at least a part of the boundary and have corresponding correlation peaks are used to determine the correlated corners 304A, 310A, 310B, 308B, 308C, and 306C and the orientation of each note in the mass of plurality of notes 302A-302C as shown in FIG. 12F (328 of FIG. 14). In another example, the technique 300 may optionally include performing geometric correction and cropping techniques to the mass of plurality of notes 302A-302C based on the orientation of each note in the mass of plurality of notes 302A-302C. In another example, the marks can be a different color border, such as a white border, along the boundary of the note. In another example, technique 300 may further include determining whether at least one of the plurality of notes in the input image includes one or more marks 311 in the mass of plurality of notes 302A-302C by comparing one or more marks 311 to marks in a database.

In FIGS. 12A-12F and FIG. 13 the input image does contain one or more marks 311, so technique 300 may include utilizing a marker detection module with the color detection module to determine the boundary of each note segment. In FIG. 13, based on the correlated corners 304A, 310A, 310B, 308B, 308C, and 306C, the boundaries of segments 312A-312C of the mass can be determined (330 of FIG. 14). In some cases, the marker detection module can determine the relative positions of marks 311, which can be used to determine the boundaries of the plurality of note segments 312A-312C. The content of note segments 312A-312C of the mass can extracted from the plurality of note segments 312A-312C using the determined boundaries (332 of FIG. 14). In some cases, each piece of content is extracted from a corresponding note segment. In another example, the extracted contents of note segments 312A-312C are used to generate a plurality of digital notes corresponding to the boundary of each note in the plurality of overlapping notes identified in the input image, and the plurality of digital notes include information represented by the plurality of note segments 312A-312C in the input image. In another example, the extracted contents of note segments 312A-312C are used to generate a plurality of segmented digital notes corresponding to the boundary of each note in the plurality of overlapping notes identified in the input image, and the plurality of segmented digital notes include information represented by the plurality of note segments 312A-312C in the input image.

Figure 16:
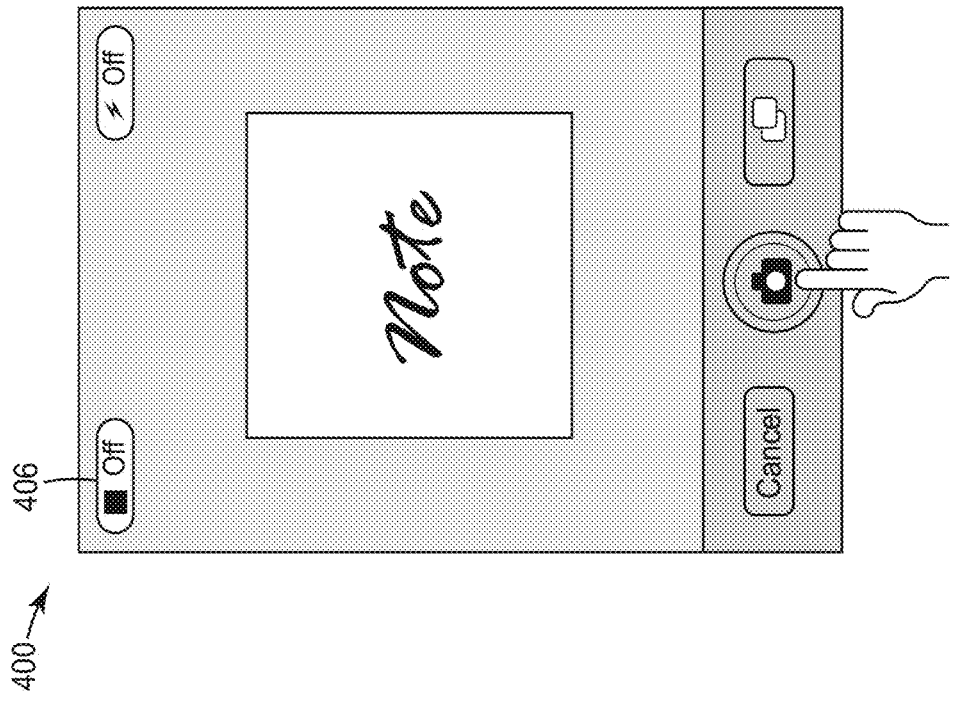
FIGS. 15 and 16 illustrate an example of a marker detection toggle overlaid on an image by a graphical user interface.
Figure 15:
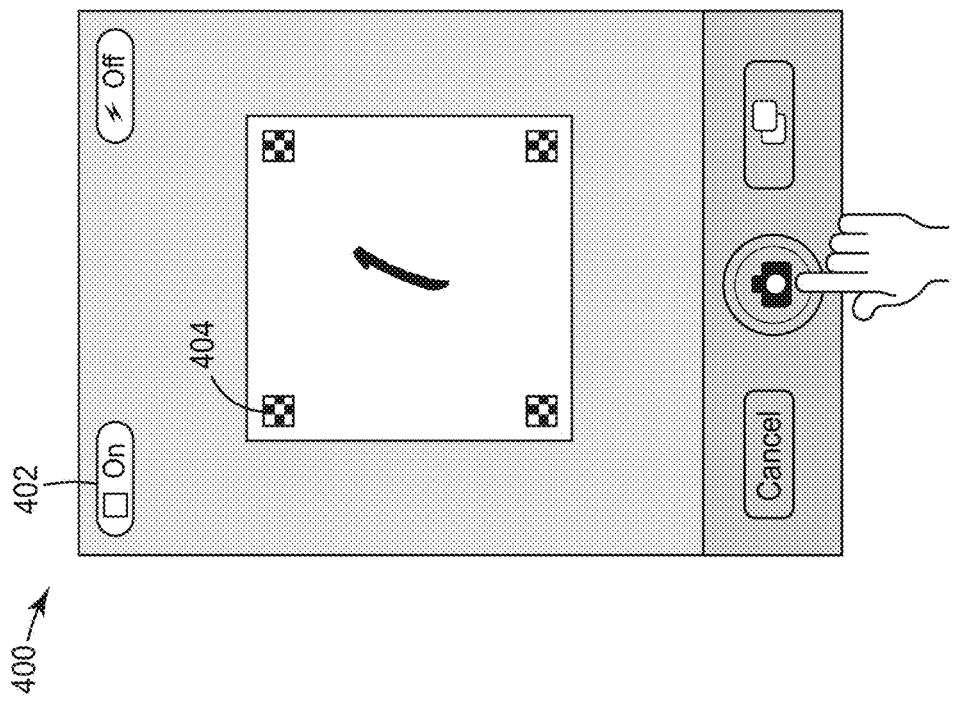

FIGS. 15 and 16 illustrate an example graphical user interface 400 presented by note management application 18. In this example, graphical user interface 400 includes a marker detection control 402, 406 that selectively allows the user to enable or disable mark-based note detection modules or non-marker-based detection modules.

In one example, as illustrated in FIG. 15, a user, such as user 26 of FIG. 1, activates marker detection control 402 before directing note management application 18 to capture or otherwise process an input image. By activating marker detection toggle 402 to utilize a marker detection module, user 26 directs image processing engine 82 of note management application 78 to segment a plurality of detected overlapping physical notes based on fiducial markers associated with the notes. The user may activate a marker detection control 402 prior to capturing the input image of the workspace or may activate marker detection control 402 after the workspace is captured but prior to a processing of the input image to utilize a marker detection module to segment the plurality of overlapping notes based on fiducial markers. In this example, the note in the input image contains mark 404, which can be a barcode, a color code, a color, a matrix code, a color block, a different color border, or the like.

In general, the marker detection module uses one or more marks 404 to determine the boundary of the note. In some cases, the note may be slanted in the input image (not shown in FIGS. 15 and 16). In some other cases, the input image may be taken with geometric distortion. The marker detection module may use the determined boundary of mark 404 or a portion of mark 404 to determine the necessary image transformation and correction to the input image to obtain the content of the note.

In another case, as illustrated in FIG. 16, the user may elect to disable marker detection control 406 to not include a marker detection module in the note recognition technique. In response, image processing engine 82 of note management module 78 may invoke any one or more non-marker-based note detection algorithms such as identifying the plurality of physical notes based on shapes defined by perimeters of the plurality of notes in the input image, identifying the plurality of notes according to color spaces associated with background colors of the plurality of notes, and/or identifying the plurality of notes according to a pattern recognition algorithm.

For purposes of example, marker detection control 402, 406 is shown as a toggle UI element having an on state and an off state, although other UI elements could be used, such as radio buttons, drop down lists and the like.

Figure 18:
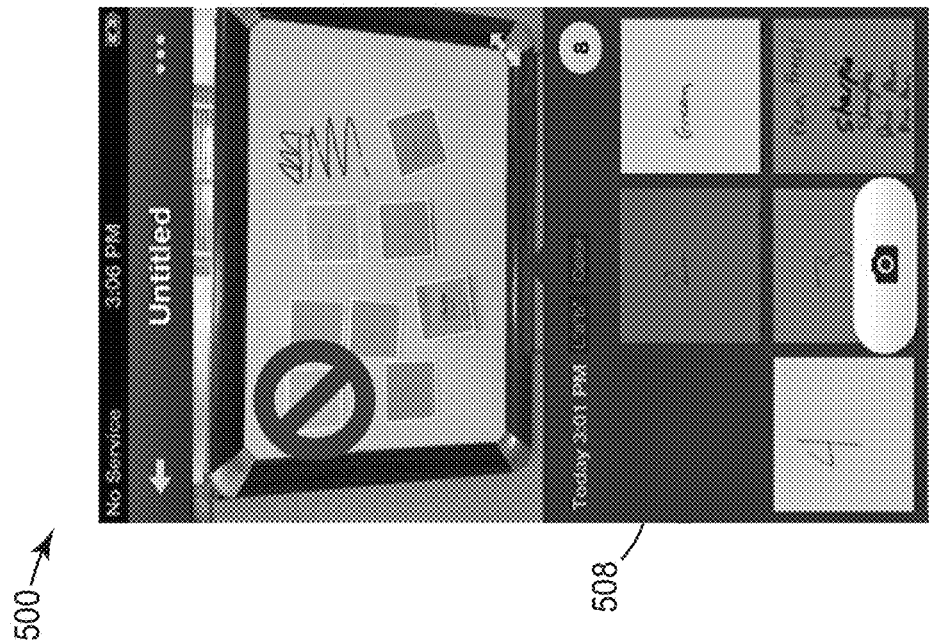
FIGS. 17 and 18 illustrate an example of selecting and removing a digital note from one or more portions of a graphical user interface.
Figure 17:
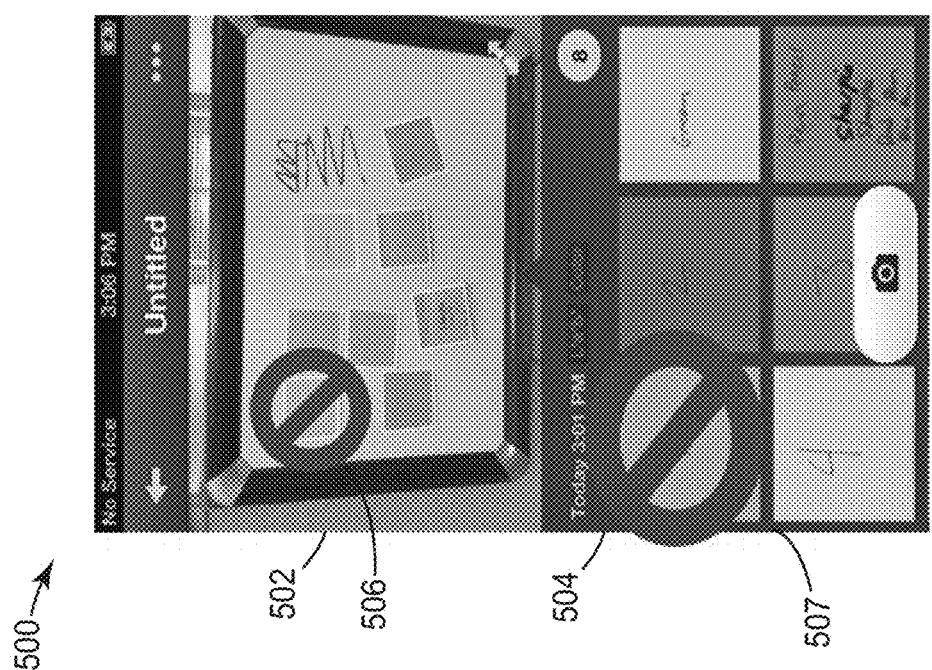

FIGS. 17 and 18 illustrate an example in which note management application 78 of mobile device 15 provides functionality by which user 26 manages a set of digital notes associated with a workspace, such as workspace 20 of FIG. 1. For example, note management application 78 generates GUI 79 to include input controls that allow user 26 to selectively include or exclude notes recognized in an input image, thereby controlling which of the physical notes have corresponding digital notes in a set or group of digital notes.

In the example illustrated by FIG. 17, a mobile device includes a graphical user interface 500 with a first portion (region) 502 and a second portion (region) 504. Note management application 78 displays within first portion 502 of graphical user interface 500 the input image captured from a workspace, where the input image typically provides a visual representation of a workspace having a plurality of physical notes. Note management application 78 displays within second portion 504 a set of digital images generated from the physical notes within the input image as recognized by note management application 78.

In addition, note management application 78 may display, on the first portion 502 of graphical user interface 500, the digital notes and enhanced sub-images associated therewith overlaid on the original input image, where each of the plurality of digital notes is presented in place of the corresponding physical note recognized by the note management application. This may, for example, aid the user in associating the digital notes with their respect physical notes in the workspace.

Each note in the plurality of digital notes on first portion 502 and second portion 504 of the graphical user interface may be selected 506, 507 by a user input for deletion from the set of digital notes. As illustrated between FIGS. 17 and 18, the selected digital note 506, 507 in the second portion of the graphical user interface may be deleted 508 from the second portion of the graphical user interface and remain in the first portion of the graphical user interface. In another example, the selected digital note 506, 507 may be deleted from both the first portion and the second portion of the graphical user interface. In another example, the selected digital note 506, 507 may be deleted from the first portion of the graphical user interface and remain in the second portion of the graphical user interface.

Figure 20:
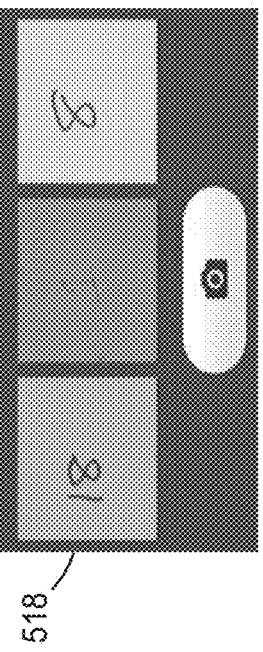
FIGS. 19 and 20 illustrate an example of selecting and adding a digital note from one portion of the graphical user interface to a second portion of the graphical user interface.
Figure 19:
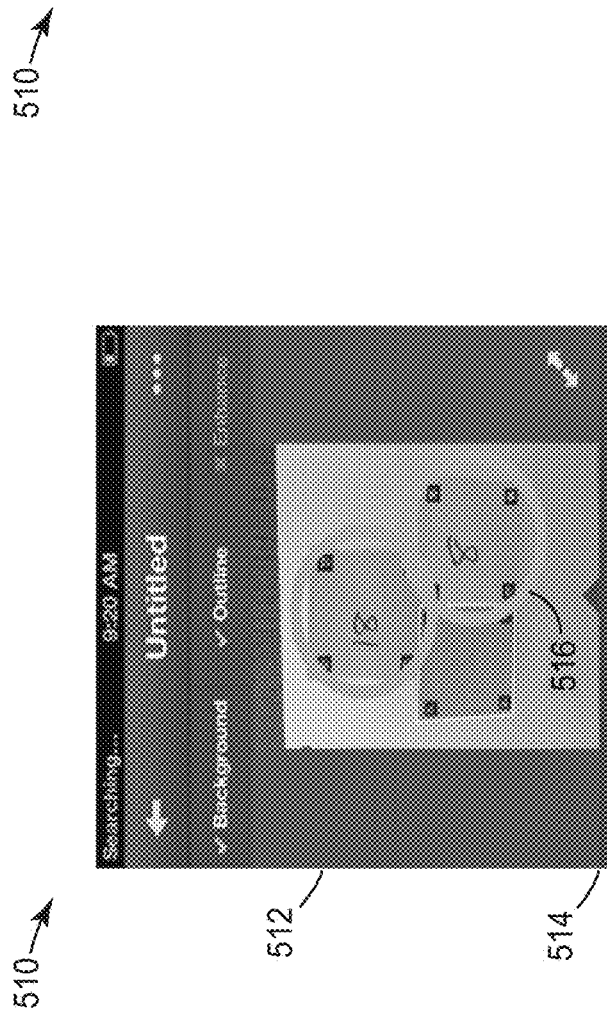

FIGS. 19 and 20 illustrate example user interfaces 510 with a first portion (region) 512 and a second portion (region) 514 presented by mobile device 15 that allow a user to select and add a digital note for inclusion within a set of digital notes created from physical notes recognized from a given workspace. As illustrated between FIGS. 19 and 20, digital notes 516 selected in the first portion 512 of the graphical user interface may be added to the set of digital notes 518 presented in the second portion 514 of the graphical user interface. In other words, the user may select one or more of the digital notes overlaid on the image of the workspace and indicate that the notes are to be included in a particular set of digital notes presented in the second portion of the graphical user interface.

Figure 21:
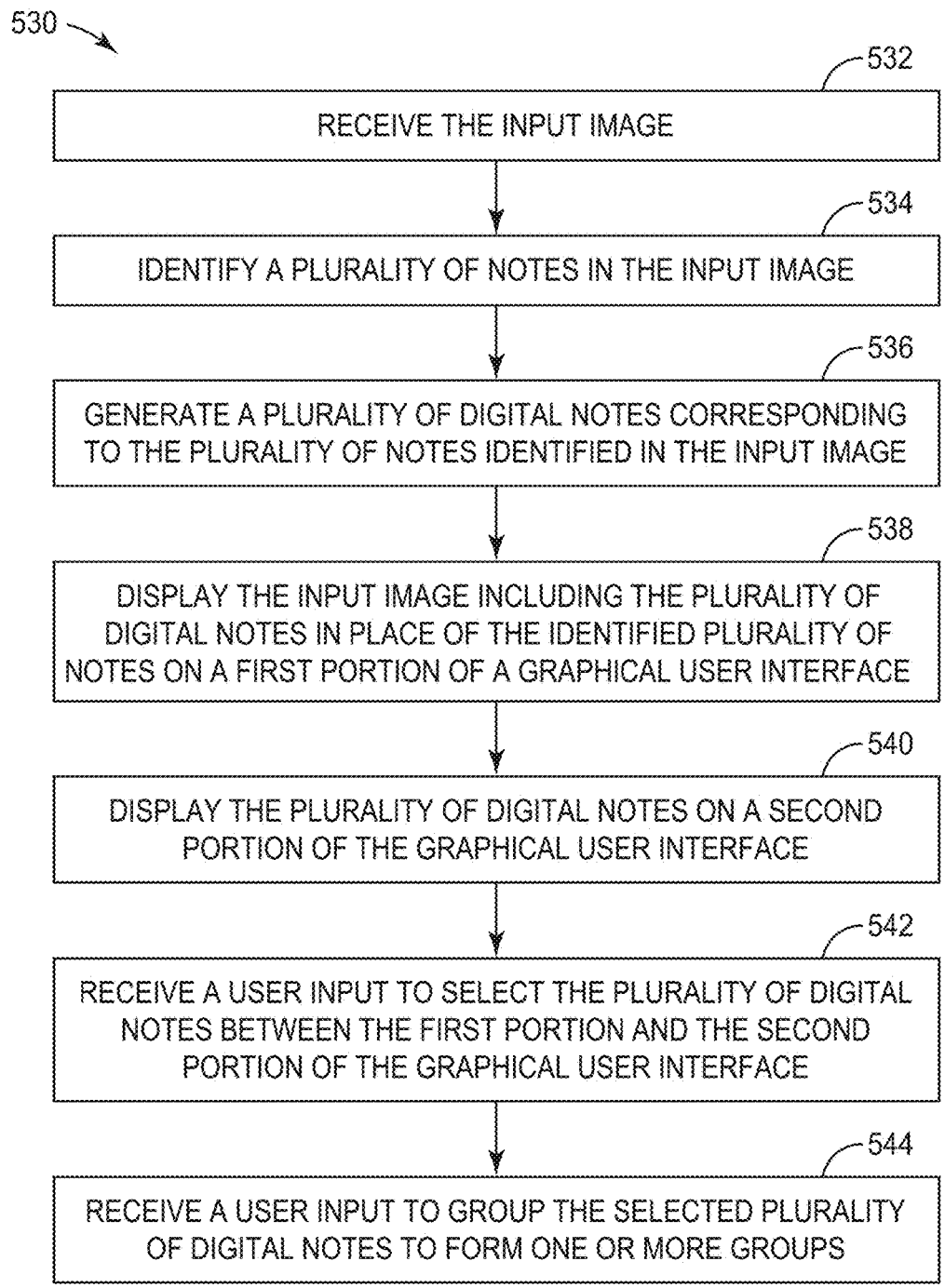
FIG. 21 is a flowchart illustrating an example technique for selecting, grouping, and displaying digital notes through the graphical user interface.

FIG. 21 is a flowchart illustrating example operation of note management application 78 when, in response to user input, selecting a plurality of digital notes in the first portion of the graphical user interface or the second portion of the graphical user interface and grouping the selected plurality of digital notes. In one example of process 530, note management application 78 executing on a computing device, mobile device 15, cloud server 12, or computer system 14, as described in FIGS. 1-3, receives an input image (532). Next, the computing device is configured to identify a plurality of notes in the input image (534). Upon identifying the plurality of notes in the input image, the computing device generates a plurality of digital notes corresponding to the plurality of notes identified in the input image (536). After generating the plurality of digital notes, the computing device is configured to display the input image including the plurality of digital notes overlaid thereon in place of the identified plurality of notes on a first portion of graphical user interface (538). Upon displaying the first portion, the computing device is also configured to display a user-defined set of the digital notes on a second portion of the graphical user interface (540). Next, the computing device is configured to receive a user input to select at least some of the plurality of digital notes by way of the graphical user interface (542). After receiving the user input to select the plurality of digital notes, the computing device is also configured to receive a user input to group the selected plurality of digital notes to form one or more groups (544). In another example, the one or more groups may include a hierarchical order.

Figure 22:
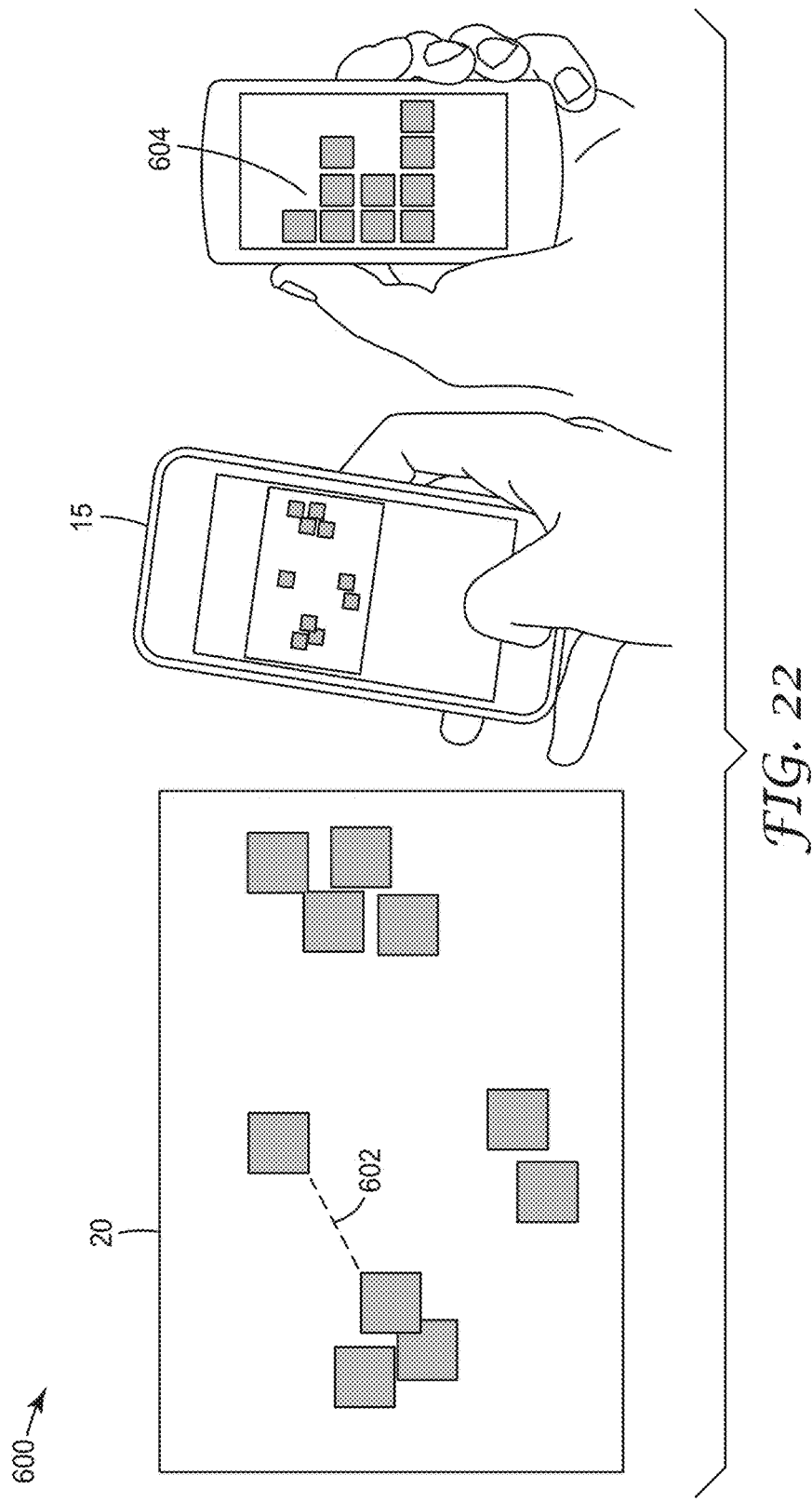
FIG. 22 is a conceptual diagram illustrating an example technique for detecting a group of digital notes, and displaying the grouped digital notes through the graphical user interface.
Figure 23:
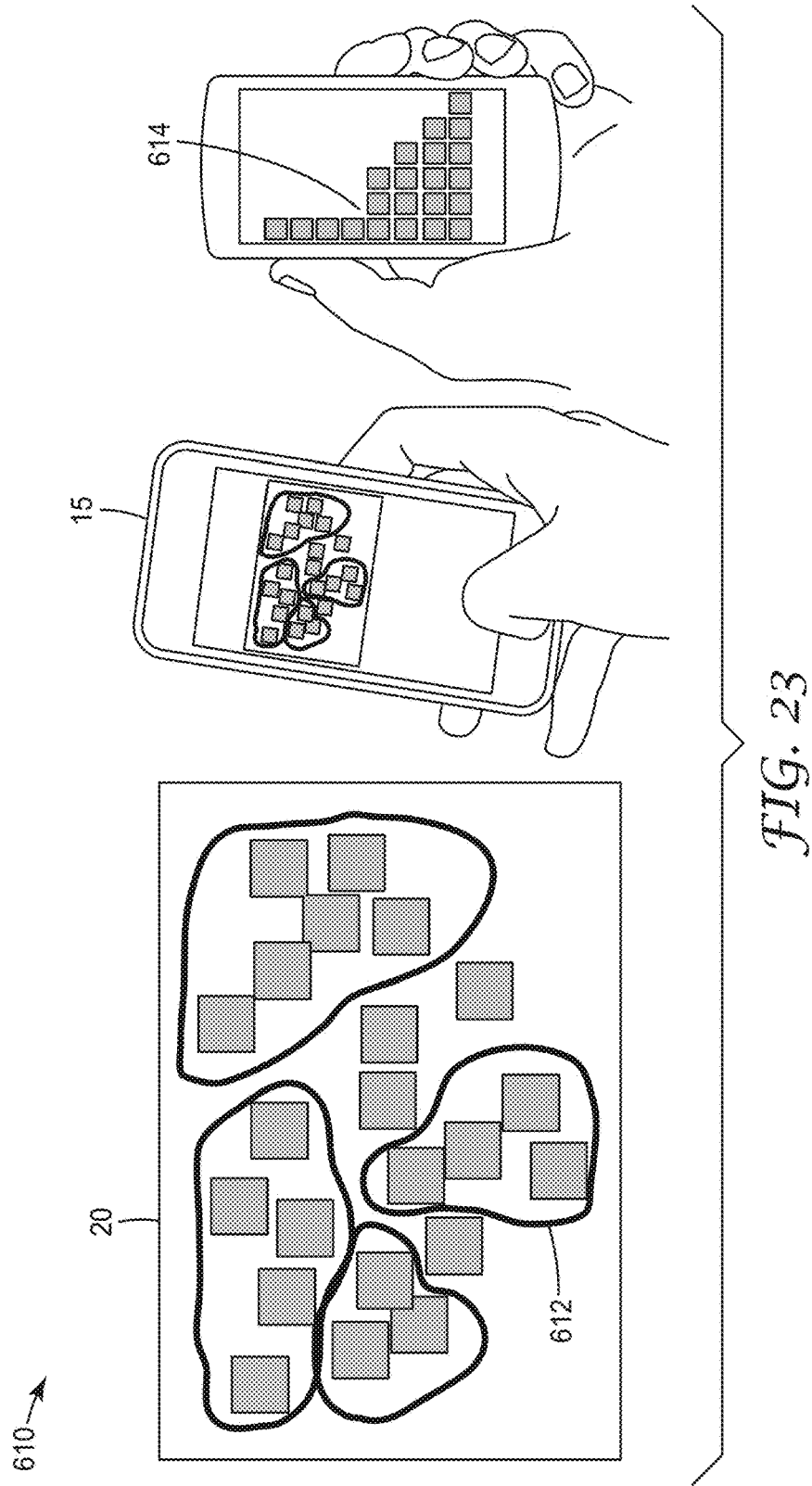
FIG. 23 is a conceptual diagram illustrating another example technique for detecting a group of digital notes, and displaying the grouped digital notes through the graphical user interface.
Figure 24:
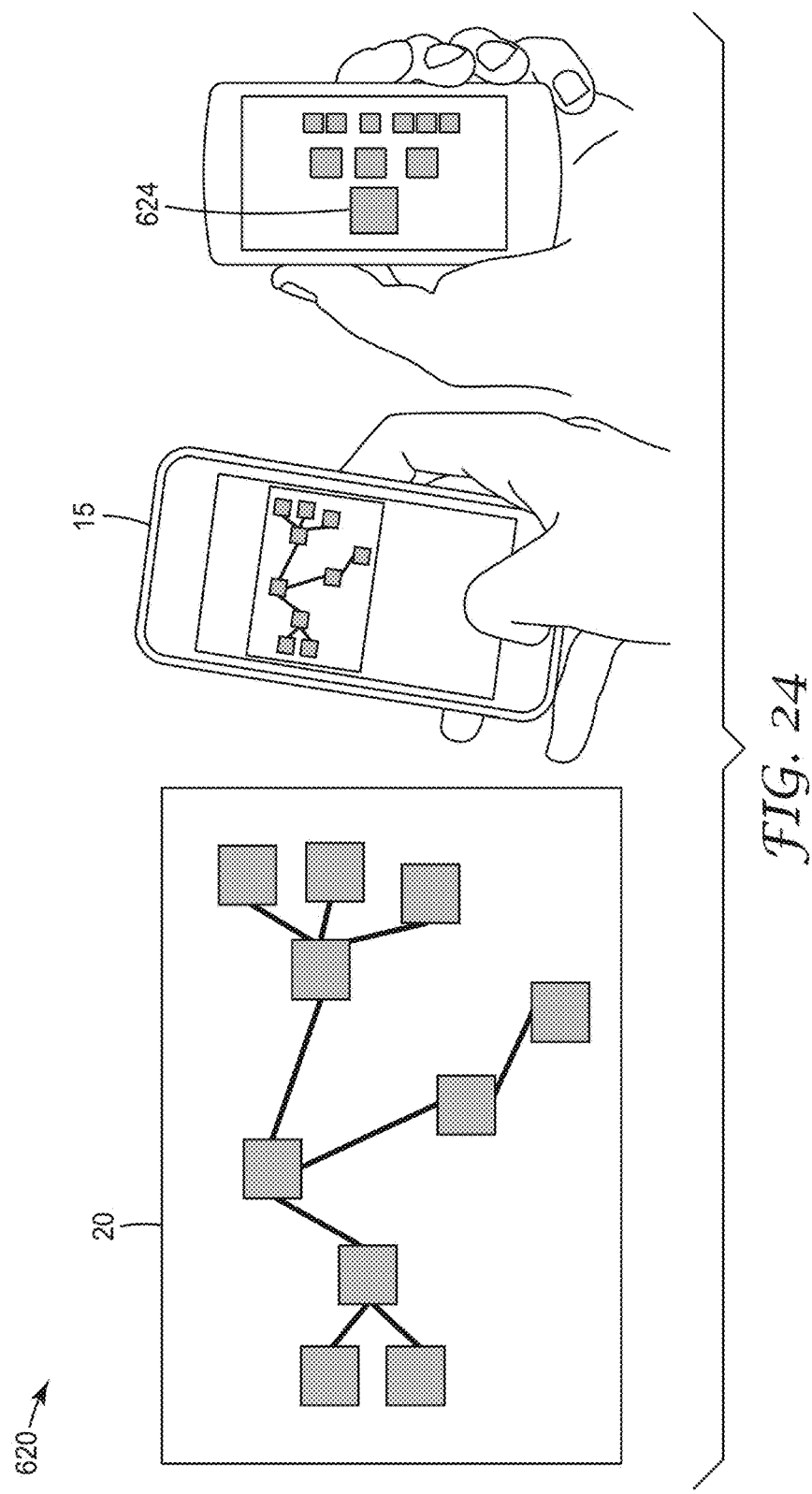
FIG. 24 is a conceptual diagram illustrating an example technique for detecting a hierarchical order of digital notes, and displaying the digital notes in order through the graphical user interface.

FIGS. 22-24 are conceptual diagrams illustrating examples of techniques in which note management application 78 executing on a computing device, such as mobile device 15, detects notes and automatically groups the notes based on one or more detected grouping indicators. Upon receiving an input image as described in FIGS. 1-3, note management application 78 identifies a plurality of physical notes in the input image and generates a plurality of digital notes.

In the example technique 600 illustrated by FIG. 22, note management application 78 processes an input image of workspace 20 that, in this example, includes a plurality of notes separated into groups based on distance. In this example, note management application 78 identifies an indication of one or more groups based on the distances 602 between each of the recognized notes and a threshold distance as determined by mobile device 15. That is, note management application 78 may determine clusters of physical notes within the input image and, based on the clusters, logically associate the digital notes into groups of digital notes. In some examples, note management application 78 may compute a 2D grid or 3D array of position data associated with objects within the input image and, for each recognized physical note, determine an absolute position and boundary for the note within the 2D or 3D space and thereby compute a complete representation of the workspace. Based on this information, note management application 78 can determine minimum distances between each physical note within the virtual space and, based on the distances, determine groupings of the corresponding digital notes corresponding to the physical notes. In other examples, note management application 78 may determine groupings based on a threshold value, which may be a threshold distance or a threshold ratio, pre-determined by a user or calculated by mobile device 15.

FIG. 23 is a conceptual diagram illustrating another example technique 610 in which note management application 78 determines an indication of one or more groups based on loop 612 physically drawn around the plurality of notes within the workspace as detected within the input image by mobile device 15.

FIG. 24 is a conceptual diagram illustrating another example technique 620 in which note management application 78 determines an indication of one or more groups based on one or more lines 622 physically drawn within the workspace so as to connect each of the physical notes and to establish a hierarchical order, as detected within the input image by mobile device 15. In another example, the one or more loops 612 and one or more lines 622 may be a Post-It® Roll and/or Scotch® colored tapes or other material.

In some examples, note management application 78 may be configured to detect a template of group indicators. For example, if the user places a printed template on the wall with a known design, note management application 78 may automatically establish the location of the physical notes relative to the printed template. In one example, the template may be a calendar and the notes may represent tasks or events placed on the calendar. Upon processing an image of the workspace including the template and plurality of physical notes, note management application 78 determines the task/event as taking place on a specific date based on the location of the note within the template. Templates could either be printed and adhered to the wall, or simply projected onto the wall surface.

Moreover, although described by way of example to detection of physical group indicators detected within an input image, the technique may be applied to detection of one or more group indicators gestured or otherwise entered by the user upon interacting with a presence-sensitive display of mobile device or other device.

In some examples, techniques 600, 610, 620 may include using multiple detection modules to recognize notes and extract the content of the plurality of notes, such as a color detection module, a shape detection module, and a pattern detection module as described in FIG. 5. In one example of the color detection module, the technique may include using color spaces such as the RGB, HSV, CIELAB, etc. to identify regions of interest corresponding to the notes for color recognition. In other examples of the shape detection module and the pattern detection module, the notes are further distinguished in their shape and due to the presence of unique patterns detected by shape recognition (e.g., Hough transform, shape context, etc.) and pattern recognition algorithms (e.g., Support Vector Machine, cross-correlation, template matching, etc.) respectively. These algorithms help filter out unwanted objects in the input image or other sources of notes' content and leave only those regions of interest corresponding to the notes.

In some examples, techniques 600, 610, 620 may further include a computing device, such as cloud server 12, computer system 14, and/or mobile devices 15, 16, which are configured to gather content and group indications of the plurality of notes and display the plurality of notes according to the grouping or order of the notes 604, 614, 624, as shown in FIGS. 22-24. In another example, a computer system may be configured to execute any variation of techniques 600, 610, 620. In another example, a non-transitory computer-readable medium including instructions that cause a programmable processor to execute may execute any variation of techniques 600, 610, 620.

Figure 25:
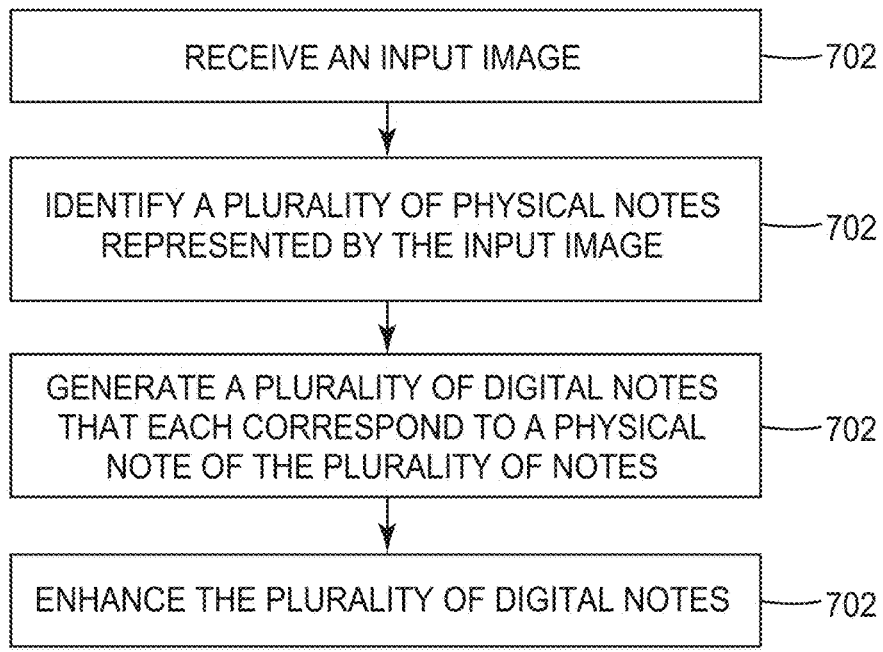
FIG. 25 is a flowchart illustrating example operations of a note management application to apply image enhancement to an input image, in accordance with one or more techniques of this disclosure.

FIG. 25 is a flowchart illustrating example operations of a note management application to apply image enhancement to an input image, in accordance with one or more techniques of this disclosure. For instance, as discussed above, in some examples, note enhancement module 89 of note management application 78 of FIG. 3 may apply the image enhancement techniques of FIG. 25 to one or more sub-images generated from an input image of a plurality of notes.

In accordance with one or more techniques of this disclosure, a device, such as mobile device 15 of FIGS. 1 and 2, may receive an input image (702). In some examples, one or more processors may execute an image processing engine (e.g., image processing engine 28 of FIG. 3) to receive image data comprising a visual representation of a scene that includes a plurality of physical notes that each include respective recognizable content. For instance, processor 70 of mobile device 15 may execute image processing engine 82 to receive image data (e.g., as image data 722 of FIG. 27) comprising a visual representation of scene that includes a plurality of physical notes that each include respective recognizable content (e.g., physical notes 724A-724C of FIG. 27). In some examples, the image data may be an example of an image of images 97 of FIG. 3.

As one example, image processing engine 82 may receive the image data from a camera of mobile device 15, such as image capture device 18 of FIGS. 1 and 2. For instance, a user of mobile device 15, such as user 26, may use image capture device 18 to take a picture of a plurality of physical notes.

As another example, image communication module 90 of image processing engine 82 may receive the image data from one or more external devices, such as another mobile device (e.g., mobile device 16 of FIG. 2), a cloud server (e.g., cloud server 12), a computer system (e.g., computer system 14), and the like. For instance, a user of another device may take a picture of a plurality of physical notes and cause the other device to send the picture to mobile device 15 (e.g., via e-mail, multimedia message, and the like).

As another example, image processing engine 82 may receive the image data from a storage device of mobile device 15, such as data storage device 68. For instance, data storage device 68 may store image data previously captured by image capture device 18 and/or image data previously received from one or more external devices.

In any case, image processing engine 82 may identify a plurality of notes represented by the input image (704). For instance, note identification module 86 of image processing engine 82 may recognize note features using a color detection module, a shape detection module, and a pattern detection module, and subsequently determine the general boundary of the note. In some examples, a pattern detection module can identify each of the plurality of physical notes represented in the input image using one or more pattern recognition algorithms, such as a support vector machine algorithm, a cross-correlation algorithm, and a template matching algorithm, for example. In some examples, note identification module 86 may utilize a shape detection module to identify at least one of the plurality of notes based on shapes defined by perimeters of the plurality of notes in the input image. In some examples, note identification module 86 may identify the plurality of notes according to color spaces associated with background colors the plurality of notes. In some examples, note identification module 86 may utilize a pattern detection module to identify at least one of the plurality of notes. In some examples, the pattern detection module may include pattern recognition algorithms, such as a support vector machine algorithm; a cross-correlation algorithm; and/or a template matching algorithm. In some examples, the plurality of notes in the input image may include one or more of a 7.62×7.62 centimeter (cm) (3.0×3.0 inch) note, a 66.04×99.06 cm (26.0×39.0 inch) poster, a triangular metal sign, a sticker, and a 22.59×27.94 cm (8.5×11 inch) sheet of paper.

Figure 27:
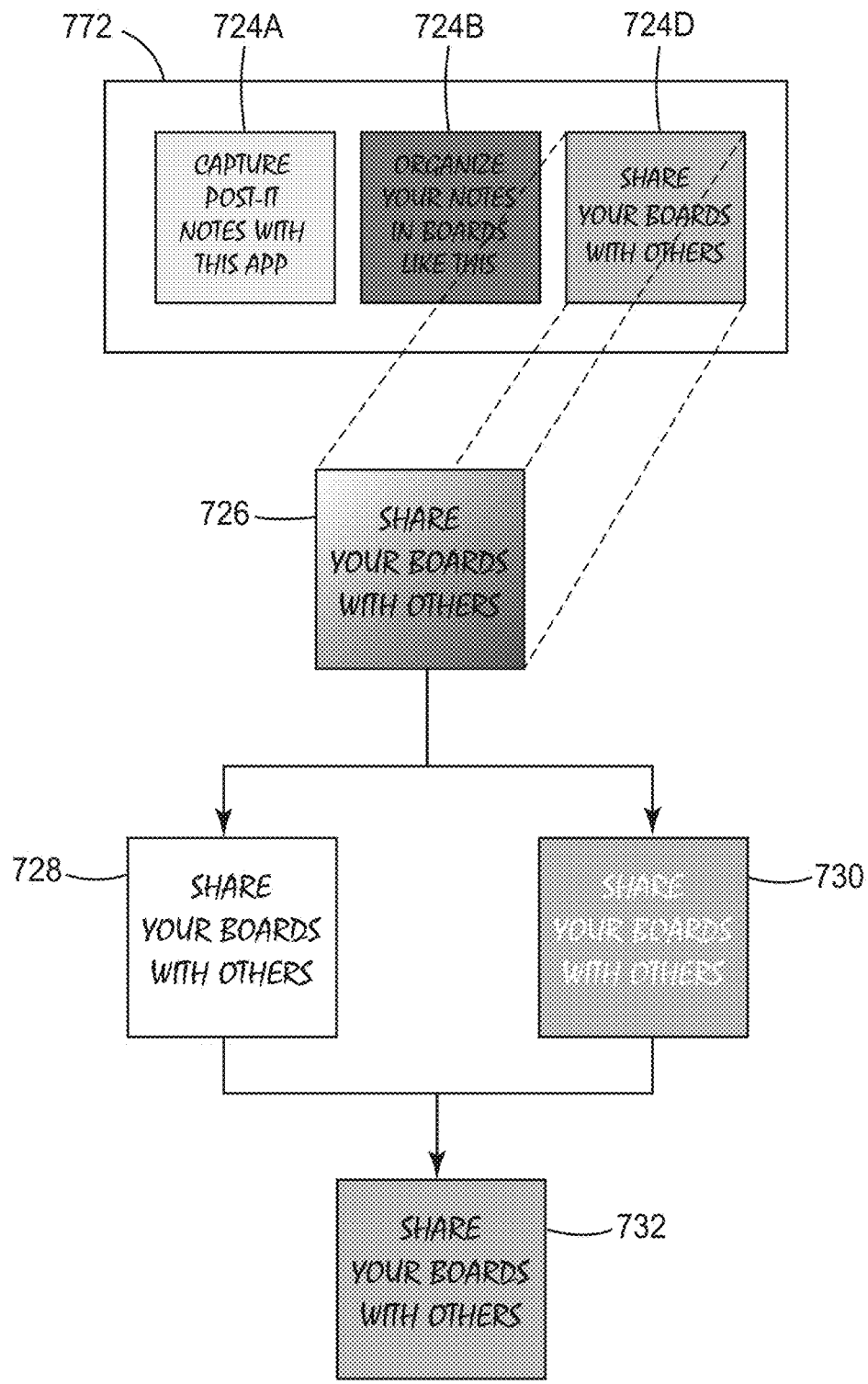
FIG. 27 is a conceptual diagram illustrating example operations of a note management application to set the background of a sub-image to a uniform color, in accordance with one or more techniques of this disclosure.

Digital note generation module 88 may generate, based on the identified plurality of notes, a plurality of digital notes that each respectively correspond to a particular physical note of the plurality of physical notes (706). For instance, digital note generation module 88 may extract respective content of the plurality of identified notes to create a plurality of sub-images. As illustrated in the example of FIG. 27, digital note generation module 88 may extract content from physical note 724C to create sub-image 726.

Note enhancement module 89 may enhance each of the plurality of digital notes (708). In some aspects, note enhancement module 89 may enhance one or more of the digital notes by correcting shadows, lighting, rotation, and scaling of notes in the respective input image. In some examples, while the physical note to which a particular sub-image corresponds may have a uniform background color, the background of the particular sub-image may not be a uniform color (e.g., due to lighting conditions when the image data was captured, quantization errors, etc. . . . ). As such, in some examples, note enhancement module 89 may enhance the particular sub-image by setting each pixel corresponding to the background of the particular sub-image to a uniform color (e.g., pixel value). In some examples, note enhancement module 89 may set the background of the particular sub-image to a uniform color in accordance with the techniques of FIG. 26. In some examples, note enhancement module 89 may enhance one or more of the digital notes by correcting one or more of shadows, lighting, rotation, and/or scaling of notes in the input image.

In some examples, note management application 78 may enable a user to modify and/or edit the digital note. For instance, note editor 96 of user interface 98 may enable a user of mobile device 15 to edit the digital note in accordance with the techniques of FIG. 28.

Figure 26:
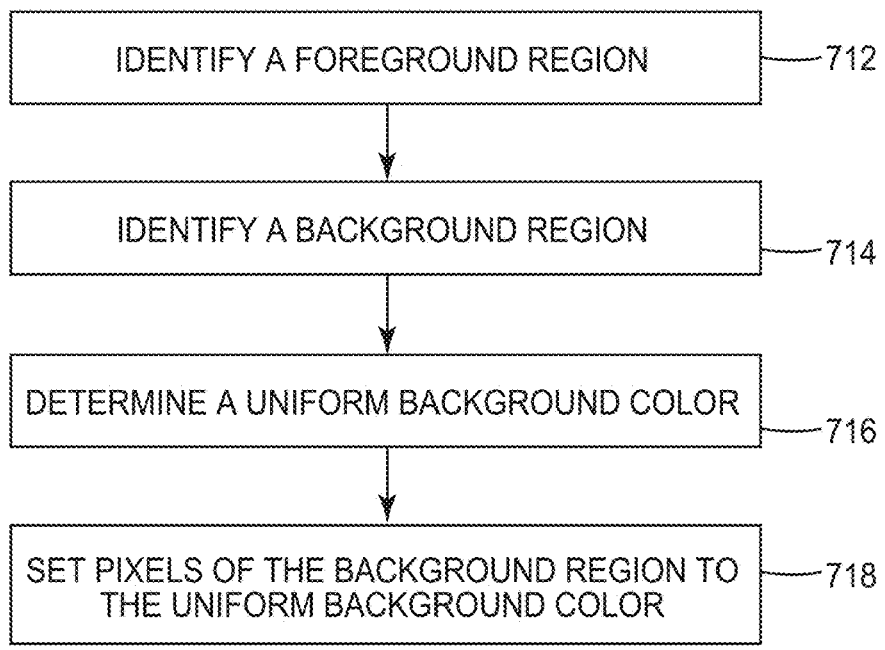
FIG. 26 is a flowchart illustrating example operations of a note management application to set the background of a sub-image to a uniform color, in accordance with one or more techniques of this disclosure.

FIG. 26 is a flowchart illustrating example operations of a note management application to set the background of a sub-image to a uniform color, in accordance with one or more techniques of this disclosure. FIG. 26 is described for purposes of example with respect to FIG. 27. FIG. 27 is a conceptual diagram illustrating example operations of a note management application to set the background of a sub-image to a uniform color, in accordance with one or more techniques of this disclosure.

As discussed above, in some examples, note enhancement module 89 of note management application 78 may apply the image enhancement techniques of FIG. 25 to set the background of a sub-image to a uniform color.

As discussed above, digital note generation module 88 may identify a plurality of physical notes from image data that includes a visual representation of a scene that includes the plurality of physical notes, where each physical note includes respective recognizable content, and extract a sub-image that corresponds to a particular physical note from the image data. In some examples, the extracted sub-image may be considered to be a digital note. Digital note generation module 88 may store the plurality of digital notes to a digital data storage device, such as data storage 68 of FIG. 3, e.g., for retrieval by a user. In accordance with one or more techniques of this disclosure, note enhancement module 89 may identify a foreground region of the digital note (712). For instance, note enhancement module 89 may identify the foreground region as the region that includes content that corresponds to the respective recognizable content of the physical note to which the digital note corresponds. As illustrated in the example of FIG. 27, note enhancement module 89 may identify foreground region 728.

Note enhancement module 89 may identify a background region of the digital note (714). For instance, in some examples, note enhancement module 89 may identify the background region as the parts of the digital note that are not included in the foreground region. As illustrated in the example of FIG. 27, note enhancement module 89 may identify background region 730. In some examples, note enhancement module 89 may first identify background region 730, and then identify foreground region 728 based on the identified background region 730. In other examples, note enhancement module 89 may first identify foreground region 728, and then identify background region 730 based on the identified foreground region 728. In some examples, note enhancement module 89 may identify the foreground region and/or the background region of the particular digital note in accordance with the techniques of FIG. 31.

In any case, note enhancement module 89 may determine a uniform background color for the digital note (716). For instance, in some examples note enhancement module 89 may select a pixel value for the uniform background color as an average or median color value of pixels included in the background region of the digital note.

Note enhancement module 89 may set pixels included in the background region of the digital note to the determined uniform background color (718). As one example, note enhancement module 89 may replace pixel values of the pixels included in the background region of the digital note with a pixel value corresponding to the determined uniform background color. As another example, note enhancement module 89 may store to a data structure a bitmap mask that identifies the background region along with an indication of the determined uniform background color, such that the digital note may be rendered with the uniform background color without overwriting the original data. By setting the background of a digital note to a uniform color, note enhancement module 89 may improve the visual quality of the digital note when the digital note is rendered for display. For instance, the visual quality of enhanced digital note 732 may be greater than digital note 726. In this way, note enhancement module 89 may improve the quality of the extracted content or sub-images.

Figure 28:
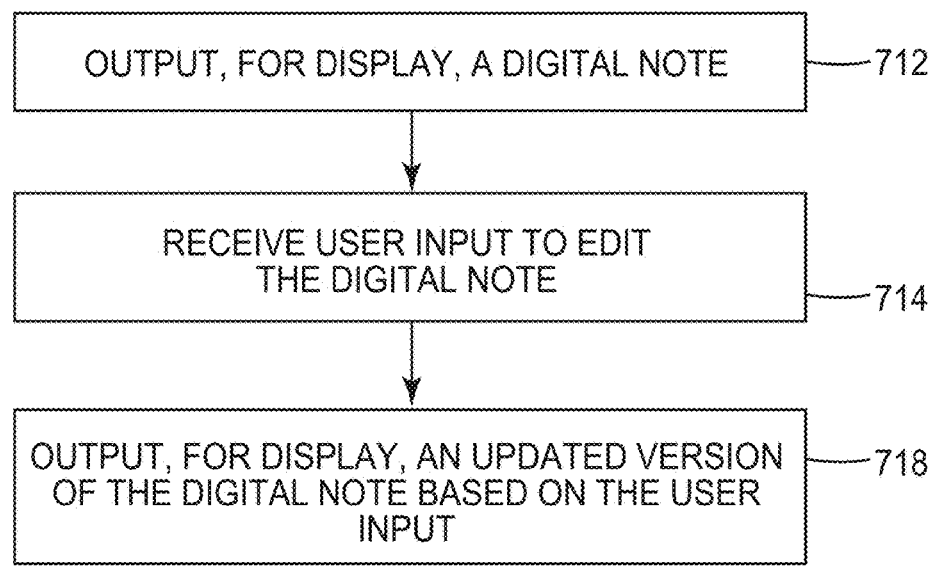
FIG. 28 is a flowchart illustrating example operations of a device to enable editing of digital notes that correspond to physical notes, in accordance with one or more techniques of this disclosure.
Figure 29A:
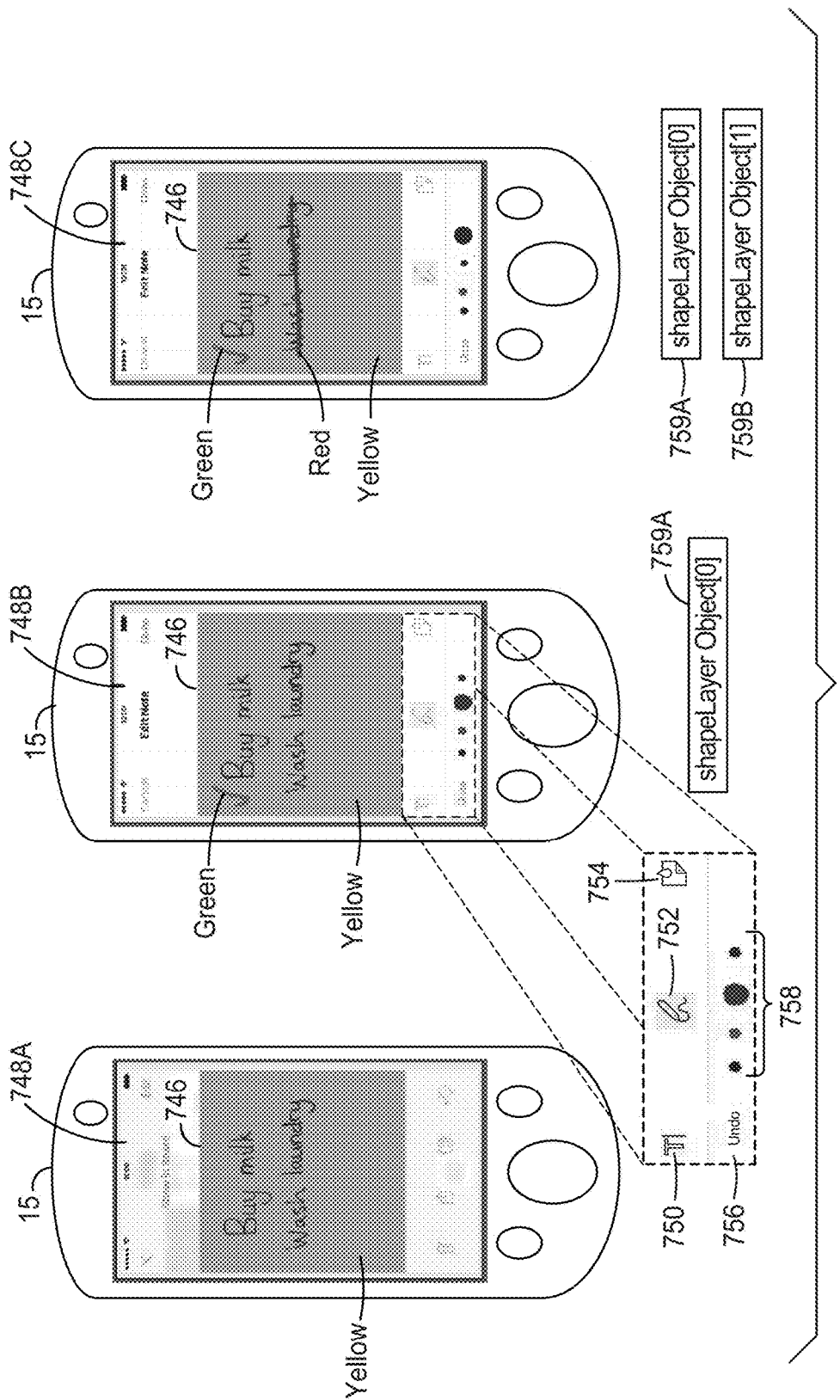
FIGS. 29A and 29B are conceptual diagrams illustrating example operations of a device to enable editing of digital notes that correspond to physical notes, in accordance with one or more techniques of this disclosure.
Figure 29B:
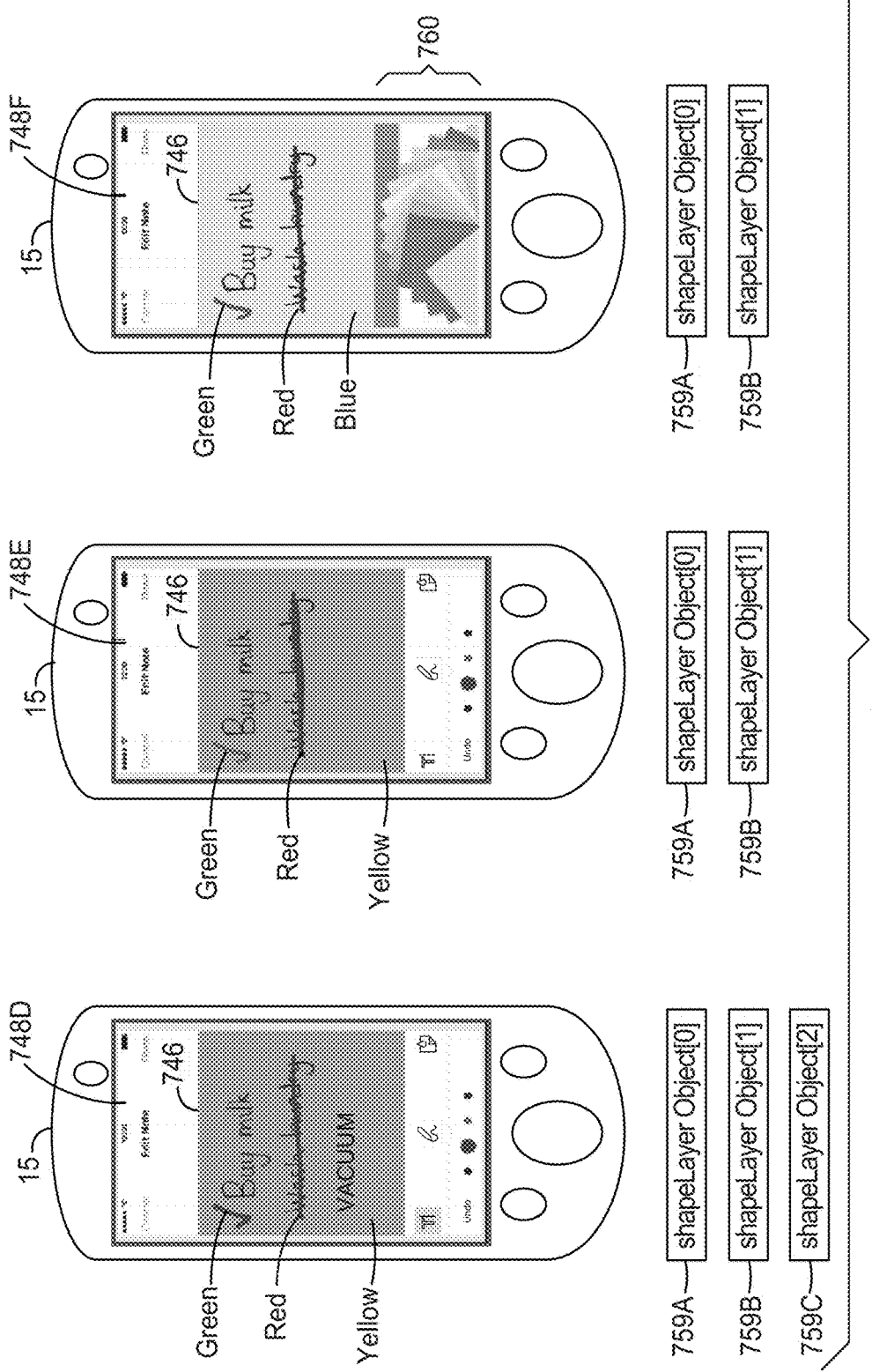

FIG. 28 is a flowchart illustrating example operations of a device to enable editing of digital notes that correspond to physical notes, in accordance with one or more techniques of this disclosure. FIG. 28 is described for purposes of example with respect to FIGS. 29A and 29B. FIGS. 29A and 29B are conceptual diagrams illustrating example operations of a device to enable editing of digital notes that correspond to physical notes, in accordance with one or more techniques of this disclosure. For instance, a device that implements the techniques of FIG. 28 may enable a user, such as user 26, to edit or modify digital notes that correspond to physical notes. Some example edits or modification include, but are not limited to, adding/deleting typed text, adding/deleting hand-drawn text, adding/deleting drawings, modifying foreground colors, and modifying background colors.

Mobile device 15 may receive a digital note of a plurality of digital notes generated based on image data comprising a visual representation of a scene that includes a plurality of physical notes such that each of the plurality of digital notes respectively corresponds to a particular physical note of the plurality of physical notes, which each include respective recognizable content. For instance, as illustrated in FIG. 29A, mobile device 15 may receive digital note 746 which corresponds to a physical note with recognizable content (i.e., a hand-written to-do list of "Buy milk" and "Wash laundry").

In accordance with one or more techniques of this disclosure, a device, such as mobile device 15, may output a digital note for display (740). For instance, the device may output an enhanced digital note generated in accordance with the techniques of FIG. 25 and/or FIG. 26. As illustrated in the example of FIG. 29A, note editor 96 of mobile device 15 may output graphical user interface (GUI) 748A that includes digital note 746 which, as discussed above, corresponds to a physical note with recognizable content "Buy milk" and "Wash laundry."

Note editor 96 may receive user input to edit the digital note (742). As one example, note editor 96 may receive an indication that a user of the device performed a gesture to "draw" a line on the digital note with a virtual pen. In some examples, the digital notes may be modified using free form writing or drawing by touching a dragging a finger on a touch screen, such as a touch screen of mobile device 15. Alternatively, the user can perform the user input on a desktop or laptop using a mouse pointer (clicking and dragging). Note editor 96 may store data indicative of gestures created by free form writing or drawing in memory, and display an image representing the data indicative of gestures as layers overlaid on the digital note. For example, as illustrated in FIGS. 29A and 29B, note editor 96 may store data indicative of one or more gestures (e.g., strokes) created by free from writing or drawing as objects, such as shape layer objects 759A-759C. In some examples, note editor 96 may store the objects as JavaScript Object Notation (JSON) data objects, Extensible Markup Language (XML) objects, or other data objects. Since the strokes created by free form writing or drawing can be stored in memory, erasing or undoing the strokes is also possible. In some examples, note editor 96 may invoke note enhancement module 89 to perform one or more operations related to note editing. For instance, note editor 96 may invoke image enhancement module 89 to store the data indicative of the gestures.

As another example, note editor 96 may receive an indication that the user of the device has selected an updated background color. In some examples, as the background pixels can be tracked over time, note editor 96 may invoke note enhancement module 89 to replace the tracked background pixels with the new color (i.e., after other edits have been made to the digital note, such as edits that may cause a background pixel to become a foreground pixel). One or all of these functionalities can be provided in the form of buttons, such as touch enabled buttons included in the GUI. For instance, as illustrated in FIGS. 29A and 29B, each of GUIs 748B-748F may include text entry tool 750, digital pen tool 752, background color tool 754, undo button 756, and color selection area 758.

In any case, responsive to receiving the user input, note editor 96 may output, for display, an updated version of the digital note based on the user input (744). As illustrated in the example of FIG. 29A, responsive to receiving an indication that the user of mobile device 15 performed a gesture to draw a line on the digital note with a virtual green pen (i.e., that the user selected digital pen tool 752, selected green selected from color selection area 758, and performed a gesture in the shape of a checkmark), note editor 96 may output GUI 748B that includes a green line in the shape of a checkmark. As discussed above, the stroke corresponding to the green line may be stored as a data object in a data structure, such as shape layer object 759A. In this way, note editor 96 may enable a user to edit a digital note that corresponds to a physical note. As shown in the example of FIGS. 29A and 29B, techniques of this disclosure enable a user to write a to-do list on a physical note, take a photo of the physical note to create a digital note corresponding to the physical note, and digitally check off items from the to-do list originally written on the physical note.

In some examples, note editing module 89 may determine a mask that indicates which pixels of digital note 746 are background pixels and which pixels of digital note 746 are foreground pixels. In some examples, the mask may be a bitmap with a binary value for each pixel of digital note 746 where a first binary value indicates that a particular pixel is a foreground pixel and a second binary value indicates that the particular pixel is a background pixel.

In some examples, when invoked by note editor 96 to edit the digital note, digital note editing module 89 may update the mask that indicates which pixels of the digital note are foreground/background pixels based on the user input. For instance, before the user input that corresponds to the green line, the mask may indicate that the pixels corresponding to the green line are background pixels. After receiving the user input that corresponds to the green line, digital note editing module 89 may update the mask such that the pixels corresponding to the green line are indicated as foreground pixels.

In some examples, note editor 96 may continue to receive additional user input (742) and continue to output, for display, updated versions of the digital note based on the additional user input (744). As illustrated in the example of FIG. 29A, responsive to receiving an indication that the user of mobile device 15 performed a gesture to draw a line on the digital note with a virtual red pen (i.e., that the user selected digital pen tool 752, selected red from color selection area 758, and performed a gesture in the shape of a line crossing out the "Wash laundry" to-do item), note editor 96 may output GUI 748C that includes a red line crossing out the "Wash laundry" to-do item. As discussed above, note editor 96 may store, or may invoke note enhancement module 89 to store, the stroke corresponding to the red line as an object, such as shape layer object 759B, which may be rendered into GUI 748C along with shape layer object 759A and digital note 746. In this way, the device may store the editing information separately from the digital note.

In some examples, digital note editing module 89 may receive user input to edit the digital note by the user typing content onto the digital note. For instance, the user may select text entry tool 750, which may cause the device to display a virtual keyboard via which the user may enter the word "Vacuum." As illustrated in the example of FIG. 29B, responsive to receiving an indication that the user of mobile device 15 typed in the word "Vacuum" on the digital note with a keyboard (e.g., a virtual keyboard or physical keyboard), note editor 96 may output GUI 748D that includes text spelling out the word "Vacuum." In some examples, note editor 96 may provide an interface by which the user can select characteristics of the text to be typed (e.g., font, color), or may modify the characteristics of the text after typing. As discussed above, note editor 96 may store, or may invoke note enhancement module 89 to store, the text as an object, such as shape layer object 759C, which may be rendered into GUI 748D along with shape layer objects 759A-759B, and digital note 746.

In some examples, the user may desire to "undo" one or more of the edits made. For instance, in the example of FIG. 29B, the user may desire to undo inserting the word "Vacuum." As such, the user may select undo button 756 to undo the previously made edit. As illustrated in the example of FIG. 29B, responsive to receiving an indication that the user of mobile device 15 performed a gesture to select undo button 756, note editor 96 may output GUI 748E that does not include the text spelling out the word "Vacuum." As the text may be stored as a separate object, such as shape layer object 759C, the device may simply render GUI 748E without shape layer object 759C.

In some examples, the user may desire to edit the digital note by changing the background color of the digital note. For instance, the user may select background color tool 754 and select a new background color from a selection of background color options displayed in background color selection area 760. As illustrated in the example of FIG. 29B, responsive to receiving an indication that the user of mobile device 15 has selected an updated background color, note editor 96 may update the background color of the digital note and output GUI 748F that includes the digital note with the updated background color. For instance, note editor 96 may invoke note enhancement module 89 to update the background color of the digital note. In some examples, the updated background color may be selected from a group of colors that corresponds to colors in which the physical notes are actually available. In some examples, the updated background color may be selected from a group of colors consisting of background colors of the plurality of digital notes generated based on a single scene (e.g., a scene that includes a plurality of physical notes, one of which corresponds to the digital note currently being edited). In this way, in examples where the notes are grouped by background color, the user may move digital notes between groups with maintaining the uniformity of background colors within each group.

In some examples, the updated background color selected by the user may not be visually compatible with the color of one or more foreground objects (e.g., original content "Buy milk", "Wash laundry"; and modified content such as the green check mark next to "Buy milk", the red line crossing out "Wash laundry", and the black text "Vacuum"). For instance, the updated background color may make one or more of the foreground objects harder to read. For example, the updated background color may decrease the contrast ratio between a particular foreground object and the background of the digital note. In accordance with one or more techniques of this disclosure, note editor 96 may automatically modify, or invoke note enhancement module 89 to automatically modify, the color of one or more foreground objects based on the updated background color. In this way, note editor 96 may enable editing of the background color of the digital note without sacrificing the readability of the one or more foreground objects. Example details of how note editor 96 may modify the color of the one or more foreground objects are discussed below with reference to FIG. 30.

In some examples, as opposed to overwriting the image data of the digital note with the edits, the device may store information corresponding to each edit as a separate data object which may be used to render the digital note. For instance, as illustrated in the example of FIG. 29A, note editor 96 may store information corresponding to the green line in the shape of a checkmark as "shapeLayer Object [0]" 759A. Similarly, note editor 96 may store information corresponding to the red line crossing out "Wash laundry" as "shapeLayer Object [1]" 759B, and information corresponding to the text "Vacuum" as "shapeLayer Object [2]" 759C. In some examples, shape layer objects 759A-759C may be stored in a container along with digital note 746. For instance, note editor 96 may store shape layer object 759A as a set of coordinates that correspond to the location and shape of the line (i.e., the check mark), and an indication that the line is green. Similarly, note editor 96 may store digital note 746 by storing the original image data (i.e., the photograph of the physical note to which digital note 746 corresponds) along with the foreground/background mask, and an indication of a uniform background color (as discussed above with reference to FIGS. 26 and 27).

As such, note editor 96 may enable the user to undo an edit without modifying the underlying image data of the digital note. In some examples, the rendering order may be first-in-first-out, meaning that earlier created objects are rendered "under" later created objects.

Figure 30:
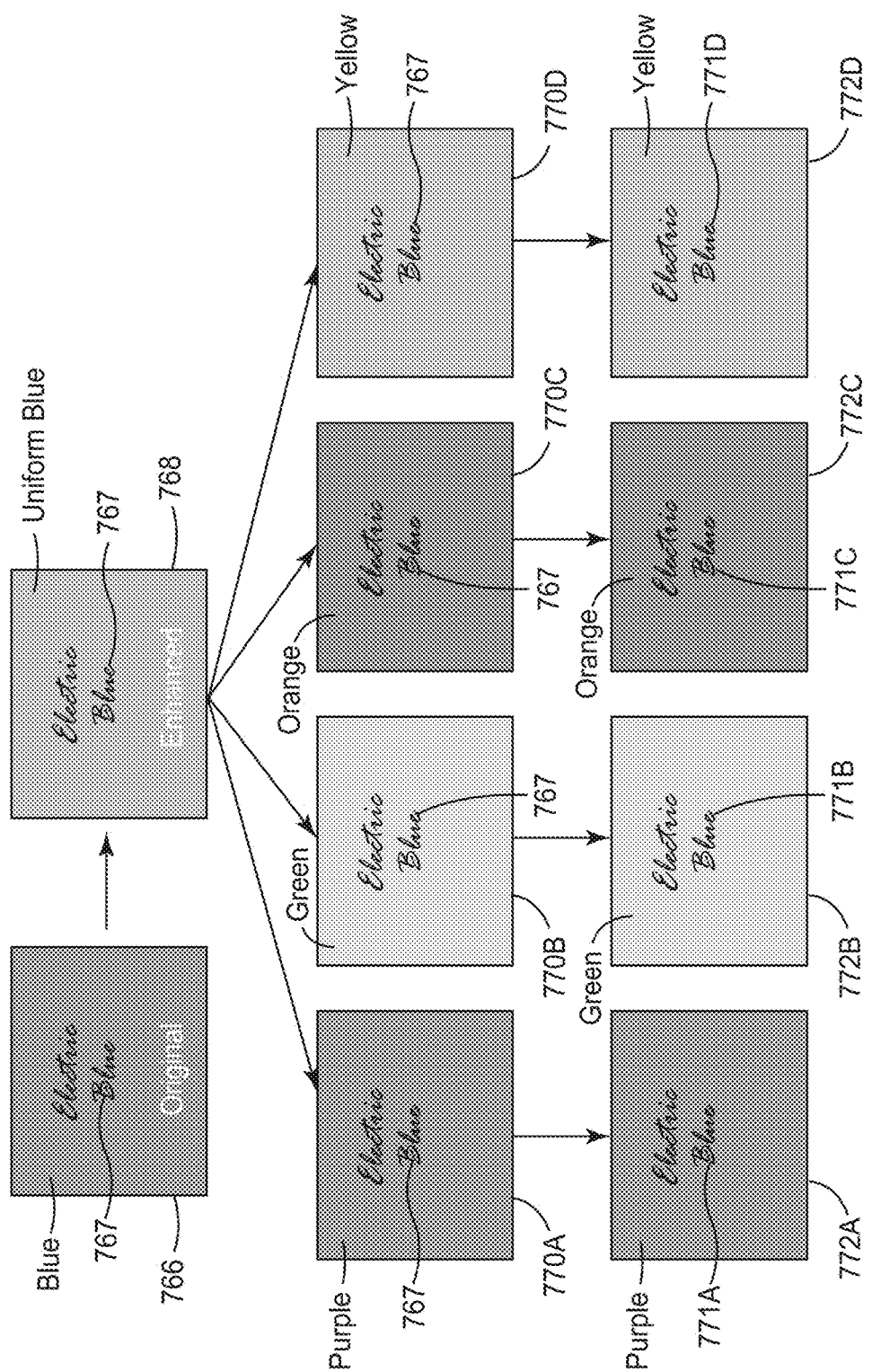
FIG. 30 is a conceptual diagram illustrating example modification to a color of a foreground object based on an updated background color, in accordance with one or more techniques of this disclosure.

FIG. 30 is a conceptual diagram illustrating example modification to a color of a foreground object based on an updated background color, in accordance with one or more techniques of this disclosure. As illustrated in FIG. 30, a device, such as mobile device 15 of FIGS. 1 and 2, may receive original digital note 766. As shown in FIG. 30, original digital note 766 may include foreground object 767 including the words "Electric blue" written in a dark blue on a non-uniform blue background color. As discussed above, the device may perform one or more operations to enhance original digital note 766 to generate enhanced digital note 768. For instance, digital note editing module 89 of FIG. 3 may enhance original digital note 766 in accordance with the techniques of FIGS. 25-27. As shown in FIG. 30, enhanced digital note 768 may include foreground object 767 (i.e., "Electric blue") written in a dark blue on a uniform blue background color.

Note editor 96 may, responsive to receiving user input that indicates an updated background color, set a background color of enhanced digital note 768 to the updated background color. For instance, note editor 96 may invoke note enhancement module 89 to set the background color of enhanced digital note 768 to the updated background color. As one example, where the updated background color is purple, note editor 96 may generate colored digital note 770A by setting the background color of enhanced digital note 768 to purple. As another example, where the updated background color is lime green, note editor 96 may generate colored digital note 770B by setting the background color of enhanced digital note 768 to lime green. As another example, where the updated background color is orange, note editor 96 may generate colored digital note 770C by setting the background color of enhanced digital note 768 to orange. As another example, where the updated background color is yellow, note editor 96 may generate colored digital note 770D by setting the background color of enhanced digital note 768 to yellow. However, as discussed above, in some examples, the updated background color may not be visually compatible with the color of foreground object 767 (i.e., "Electric blue" written in a dark blue).

In accordance with one or more techniques of this disclosure, the device may automatically modify the color of one or more foreground objects based on the updated background color. For instance, note editor 96 may select an updated foreground color as a function of the updated background color, and set a color of one or more foreground objects to the updated foreground color. In some examples, note editor 96 may select the updated foreground color such that a contrast ratio between the updated foreground color and the updated background color is greater than a contrast ratio between a current foreground color and the updated background color.

In some examples, note editor 96 may select the updated foreground color based on a current foreground color and the updated background color. In some examples, note editor 96 may update the color of one or more foreground objects on a pixel-by-pixel level, e.g., may modify pixel values of each respective pixel of the foreground objects based on pixel values of the corresponding respective pixels of the foreground colors, and based on the value of the background color. For instance, the color of some pixels of foreground objects may be influenced by the previous background color. By updating the color of the pixels of the foreground objects on a pixel-by-pixel level and based on the updates and previous background colors, note editor 96 may improve the visual appearance of the digital note.

As one example, note editor 96 may select the updated foreground color in accordance with equations 1-15 below, where $L_i$ is the current L value of the $i^{th}$ pixel of a foreground object, $a_i$ is the current a value of the $i^{th}$ pixel of the foreground object, $b_i$ is the current b value of the $i^{th}$ pixel of the foreground object, $Lnew_i$ is the updated L value of the $i^{th}$ pixel of the foreground object, $anew_i$ is the updated a value of the $i^{th}$ pixel of the foreground object, $bnew_i$ is the updated b value of the $i^{th}$ pixel of the foreground object.

$$nc_L, nc_a, nc_b = \text{old note background color } L^*, a^*, b^* \quad (1)$$

$$rc_L, rc_a, rc_b = \text{updated background color } L^*, a^*, b^* \quad (2)$$

$$L_i = L^* \text{ of the } i^{th} \text{ pixel} \quad (3)$$

$$a_i = a^* \text{ of the } i^{th} \text{ pixel} \quad (4)$$

$$b_i = b^* \text{ of the } i^{th} \text{ pixel} \quad (5)$$

$$\Delta a = |a_i - nc_a| \quad (6)$$

$$\Delta b = |b_i - nc_b| \quad (7)$$

$$absdist = \sqrt{(\Delta a)^2 + (\Delta b)^2} \quad (8)$$

$$blendfactor = \frac{absdist}{60} \quad (9)$$

$$diff_L = nc_L - rc_L \quad (10)$$

$$diff_a = nc_a - rc_a \quad (11)$$

$$diff_b = nc_b - rc_b \quad (12)$$

$$Lnew_i = L_i - diff_L \cdot blendfactor \quad (13)$$

$$anew_i = a_i - diff_a \cdot blendfactor \quad (14)$$

$$bnew_i = b_i - diff_b \cdot blendfactor \quad (15)$$

In this example, note editor 96 can compute an updated value ($Lnew_i$, $anew_i$, $bnew_i$) of the $i^{th}$ pixel of the foreground object as a function of the old value ($L^*$, $a^*$, $b^*$) of the $i^{th}$ pixel of the foreground object, the old note background color ($L^*$, $a^*$, $b^*$), and the updated background color ($L^*$, $a^*$, $b^*$). The constant "60" in the denominator of equation (9) is one example value, and other values can be chosen for the denominator. The constant value of equation (9) can be chosen to select a value that gives good visual results. For instance, using a lower value for the constant of equation (9) may cause the updated values for the pixel to retain more of the old note background color. Similarly, using a higher value for the constant of equation (9) may cause the updated values for the pixel to retain less of the old note background color. $diff_L$, $diff_a$, and $diff_b$ may be thought of as representing a vector direction in which the new color is going. The updated value ($Lnew_i$, $anew_i$, $bnew_i$) reflects how the foreground color values are moved along this vector translation.

In some examples, note editor 96 may identify a foreground region of the digital note and a background region of the digital note, e.g., in order to modify the colors of the foreground region and the background region. As discussed above, in some examples, note editor 96 invoke note enhancement module 89 to identify the foreground region and/or the background region of a digital note in accordance with the techniques of FIG. 31.

In some examples, once the background region is identified, note editor 96 may enable editing functionality. For instance, note editor 96 may enable editing functionality on digital notes that correspond to physical notes as it will be possible to determine what the true background pixels are and the changes (i.e., edits) can be monitored as new foreground pixels. FIG. 30 illustrates examples of changing the note color of images of physical notes. As illustrated in FIG. 30 note editor 96 may re-color foreground pixels of colored digital notes 770A-770D, e.g., to have a mix of old background color and new background color. Alternatively, note editor 96 may select the updated foreground color to be a color that is a complementary color to the updated background color based on RGB or LAB color wheel. This selection may increase the contrast.

As one example, note editor 96 may generate improved digital note 772A by modifying the color of the foreground object 767 (i.e., "Electric blue") based on the updated background color of purple to generate modified foreground object 771A having a first modified color. As another example, note editor 96 may generate improved digital note 772B by modifying the color of the foreground object 767 (i.e., "Electric blue") based on the updated background color of green to generate modified foreground object 771B having a second modified color. As another example, note editor 96 may generate improved digital note 772C by modifying the color of the foreground object 767 (i.e., "Electric blue") based on the updated background color of orange to generate modified foreground object 771C having a third modified color. As another example, note editor 96 may generate improved digital note 772D by modifying the color of the foreground object 767 (i.e., "Electric blue") based on the updated background color of yellow to generate modified foreground object 771D having a fourth modified color. In this way, as shown by FIG. 30, foreground objects 771A-771D (i.e., "Electric blue") are easier to read on improved digital notes 772A-772D than on colored digital notes 770A-770D, respectively. In some examples, noted editor 96 may select the first, second, third, and/or fourth modified colors based on the respective selected background color in accordance with equations (1)-(15), above. Although shown for purposes of example with the foreground objects having a uniform color throughout the object, in some examples pixel values of individual pixels of the foreground objects are modified based on the new selected background color and the original pixel value of the respective pixel.

Figure 31:
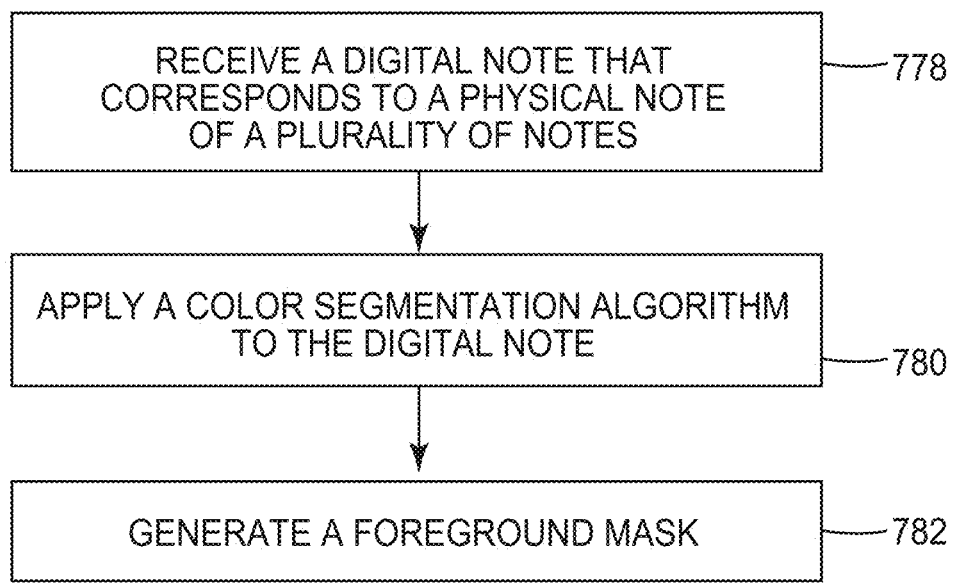
FIG. 31 is a flowchart illustrating example operations of a device to identify foreground regions of digital notes that correspond to physical notes, in accordance with one or more techniques of this disclosure.

FIG. 31 is a flowchart illustrating example operations of a device to identify foreground regions of digital notes that correspond to physical notes, in accordance with one or more techniques of this disclosure. For instance, a device that implements the techniques of FIG. 31 may be able to separate foreground handwritten or hand-drawn text or drawings from note images, use color segmentation algorithms to identify contiguous segments of color different from a background color, and agglomerate the identified segments to form the foreground.

In accordance with one or more techniques of this disclosure, a device, such as mobile device 15 of FIGS. 1 and 2, may receive a digital note that corresponds to a physical note of a plurality of physical notes (778). For instance, note enhancement module 89 of FIG. 3 may receive a digital note of a plurality of digital notes generated in accordance with the techniques of FIG. 25 and/or FIG. 37 (e.g., digital note editing module 89 may receive the digital note from data storage 68). In some examples, the digital note may be a bitmap image that corresponds to a particular physical note of the plurality of physical notes. In some examples, note enhancement module 89 may assume that the digital note has a primary note color (i.e., a background color) and one or more secondary colors used in writings and drawings on the note (i.e., foreground colors). Using this assumption, the device may apply a graph-based color segmentation algorithm (780). In some examples, the device may apply the graph-based color segmentation algorithm described in "*Efficient Graph-Based Image Segmentation*," Felzenszwalb and Huttenlocher, International Journal of Computer Vision, Volume 59, Number 2, September 2004 available at http://www.cs.cornell.edu/~dph/papers/seg-ijcv.pdf, the entirety of which is hereby incorporated by reference. In some examples, the color segmentation algorithm may generate multiple contiguous segments based on color and proximity of pixels. It is possible to get multiple segments on the same foreground or background color because of color changes induced by shadow, lighting changes, etc. In some examples, note enhancement module 89 may fuse these segments together based on a size threshold.

Figure 32A:
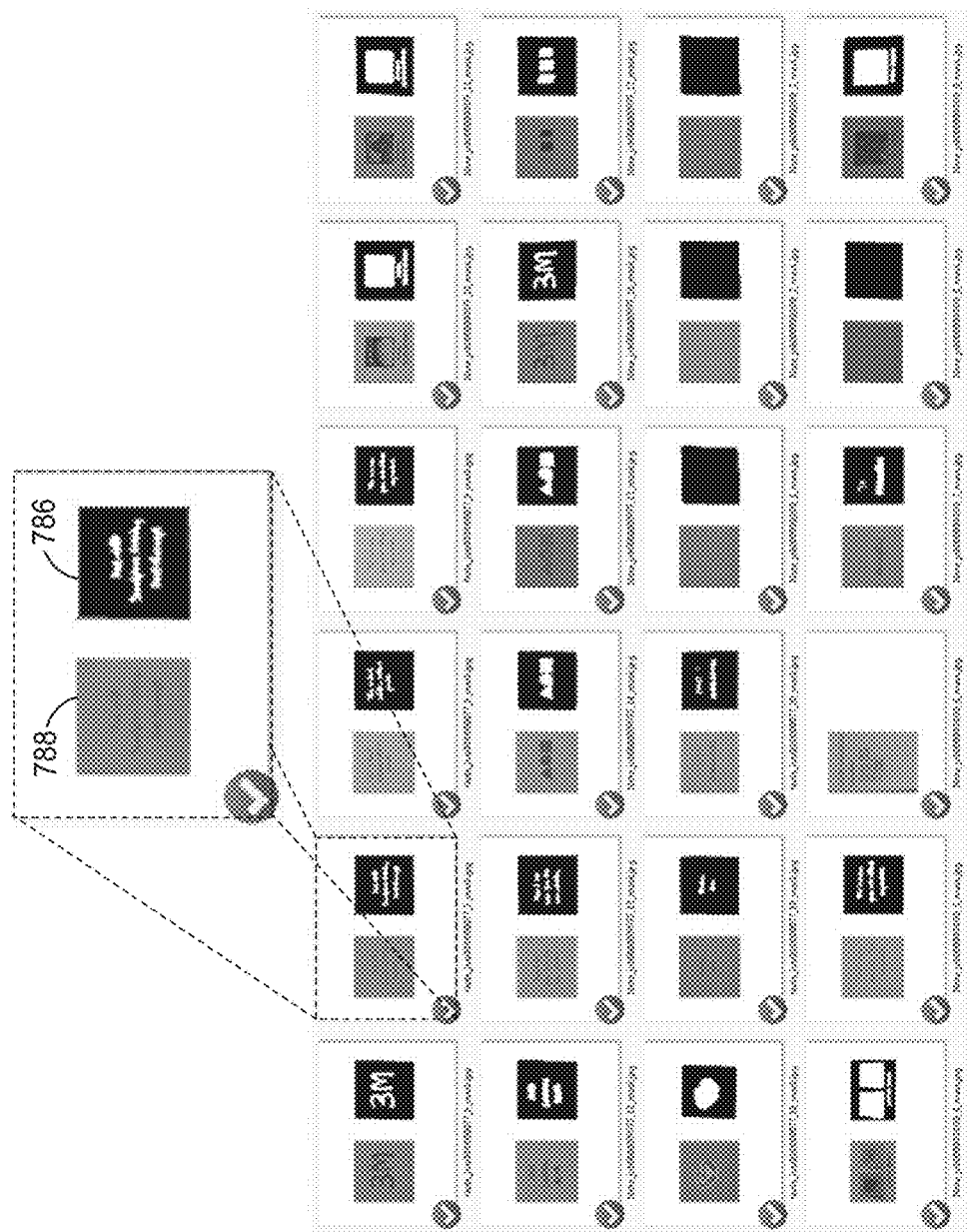
FIGS. 32A-32B are conceptual diagrams illustrating example masks which may be generated by a device that identifies foreground regions of digital notes that correspond to physical notes, in accordance with one or more techniques of this disclosure.
Figure 32B:
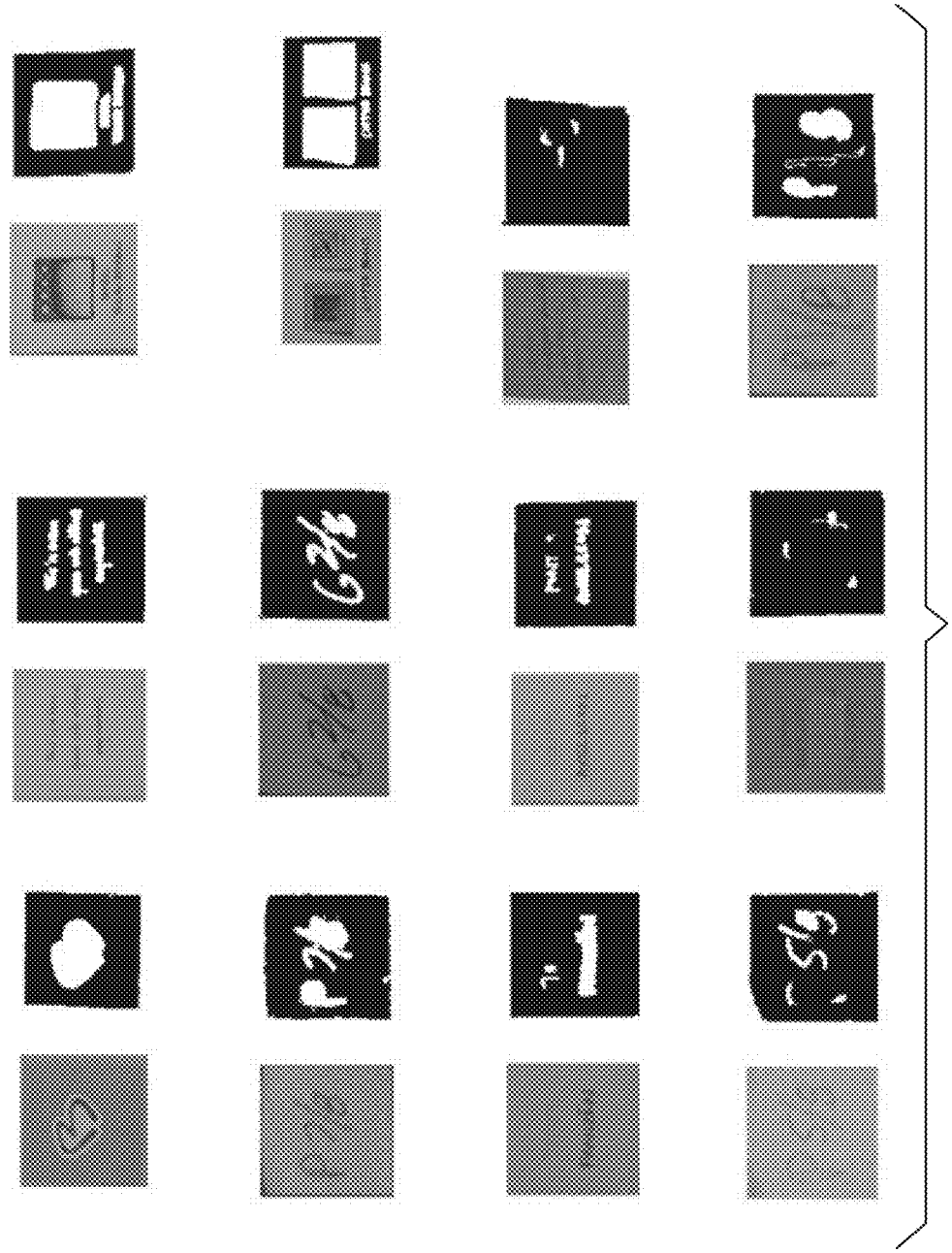

The device may identify the foreground regions of the digital note (782). For instance, note enhancement module 89 may perform a logical OR operation to all of the individual foreground segments to generate a foreground mask. Some example resulting masks are shown in FIGS. 32A-32B. For instance, as illustrated in FIG. 32A, note enhancement module 89 may generate foreground mask 786 based on digital note 788. Such a foreground mask can be used to separate the writing/drawing from the background color. This can enable variable enhancement options for foreground and background, e.g., for visually pleasing notes. Additionally, as discussed above, note enhancement module 89 may digitally change the background color of the note after a physical note was captured.

Figure 33:
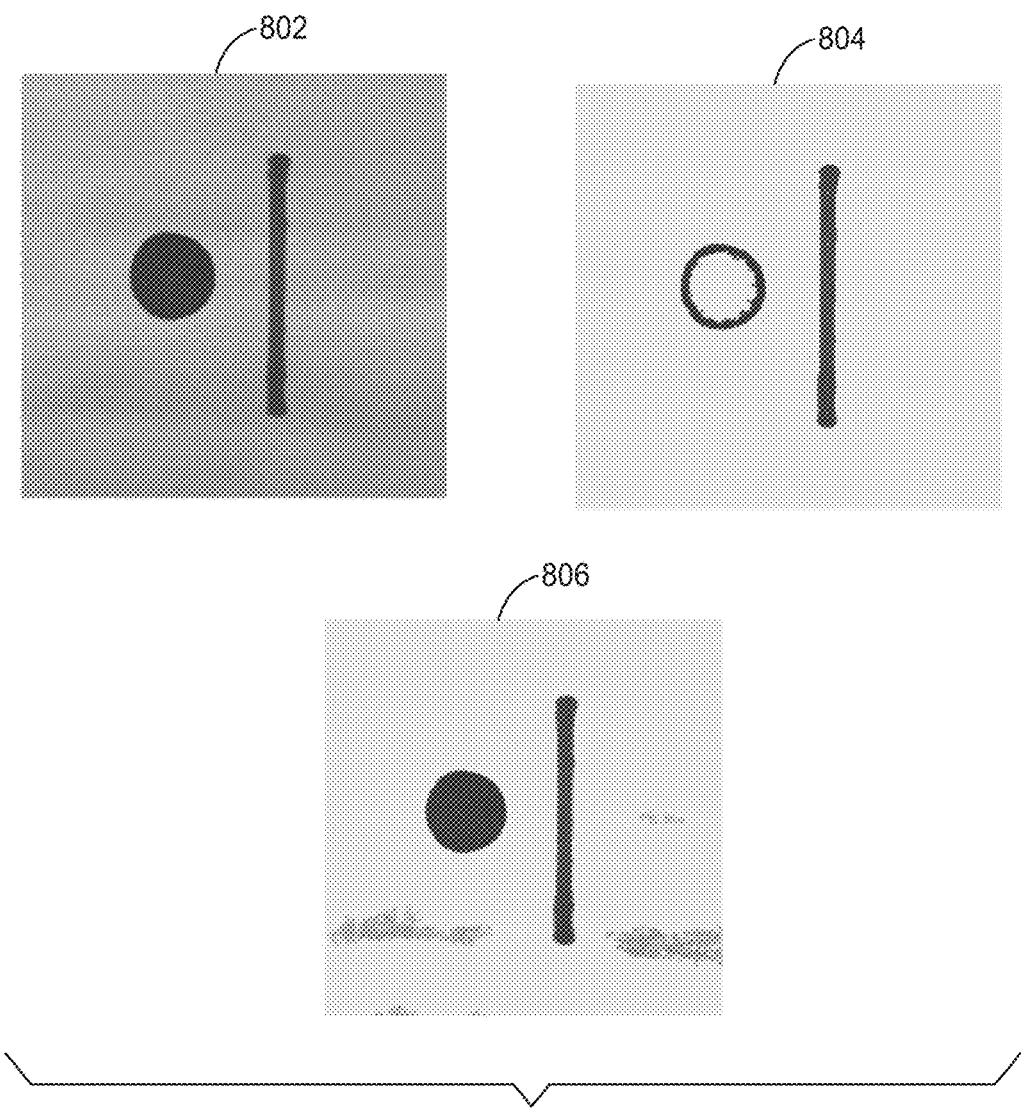
FIG. 33 is a conceptual diagram illustrating example operations of a device to identify foreground regions of digital notes that correspond to physical notes, in accordance with one or more techniques of this disclosure.

FIG. 33 is a conceptual diagram illustrating example operations of a device to identify foreground regions of digital notes that correspond to physical notes, in accordance with one or more techniques of this disclosure. For instance, a device that implements the techniques of FIG. 31 may generate a mask that indicates which pixels of a digital note are included in the foreground region and which pixels of the digital note are included in the background region.

In accordance with one or more techniques of this disclosure, a device, such as mobile device 15 of FIGS. 1 and 2, may implement a hierarchical adaptive thresholding algorithm to extract binary masks of images of notes to separate the foreground from the background while providing low false positives (artifacts). This algorithm can also be generalized to other images where there is a foreground present in noisy but uniform background.

In some examples, the device may use dynamic scale selection. For instance, as opposed to pre-computing the adaptive threshold masks in all scales, the device may compute the scales specifically for each connected component dynamically as necessary. In addition, in some examples, the device may integrate hypotheses for shadow in the background pixel relabeling steps (i.e., steps 826-830 of FIG. 34).

Various approaches may be used for enhancing images to improve their aesthetics and to remove undesirable effects such as shadows, noise, etc. . . . Among these, binarization is an approach for creating layers of foreground and background in images to obtain high levels of contrast. Usually binarization is performed to extract an object of interest and provide it more contrast with respect to its background. Such binarization can be thought of as direct foreground detection agnostic to its visual characteristics as long as the background exhibits uniformity in color. In some examples, binarization may be used to extract ventricular regions from cineangiograms (e.g., Chow, C. K., and T. Kaneko, "Automatic boundary detection of the left ventricle from cineangiograms," Computers and biomedical research 5.4 (1972): 388-410). For instance, local windows across the image may be used to compute intensity histograms and compute thresholds dynamically. Pixels beyond these computed thresholds may be binarized as foreground. Simpler alternatives may be derived which replace computing full intensity histograms with computing approximate measures such as the mean, median, or average of the maximum and minimum values in the window. Such methods have also been used for document binarization (see, e.g., Sauvola, Jaakko, and Matti Pietikäinen. "Adaptive document image binarization." Pattern Recognition 33.2 (2000): 225-236), the entirety of which is hereby incorporated by reference. Integral image based computing methods may improve efficiency of the thresholding process (see, e.g., Shafait, Faisal, Daniel Keysers, and Thomas M. Breuel. "Efficient implementation of local adaptive thresholding techniques using integral images." DRR 6815 (2008): 681510). An extensive survey comparing image thresholding techniques is provided in Sezgin M, Sankur B; "Survey over image thresholding techniques and quantitative performance evaluation". J. Electron. Imaging. 0001; 13(1):146-168, the entirety of which is hereby incorporated by reference.

In accordance with one or more techniques of this disclosure, note enhancement module 89 may use a hierarchical adaptive thresholding approach to enhance images of notes (e.g., digital notes that correspond to physical notes). In some examples, digital notes may have a uniform background color along with foreground content created often using different types of writing instruments. As such, digital notes may comply with the requirements for achieving good binarization results. However, direct application of adaptive thresholding for binarizing the digital note into foreground and background may not often produce desirable results. For example, as illustrated in FIG. 33, digital note 804 may be an example result of obtaining a binarization using adaptive thresholding of original digital note 802. In the example of FIG. 33, the device may use a window size of 21×21 pixels for adaptive thresholding an image size of 500×500 pixels (i.e., original digital note 802 is 500 pixels wide by 500 pixels tall). For other image sizes, the window size may be scaled accordingly. In some examples, the window size may be linearly scaled. In some examples, the window size may be non-linearly scaled.

This particular window size (i.e., 21×21 for an image size of 500×500 pixels) may result in very clean backgrounds with low false positives (background wrongly predicted as foreground). However, the particular window size may result in high false negatives (foreground wrongly predicted as background). In some examples, the device may decrease the number of high false negatives by increasing the window size for the adaptive thresholding process. For instance, digital note 806 may be an example result of obtaining a binarization using adaptive thresholding of original digital note 802 using a larger window size than the window size used to generate digital note 804.

As shown in digital note 806, the foreground objects are fully extracted. However, digital note 806 also includes multiple artifacts that are inaccurately extracted as foreground. In this process, a device may perform a contrast stretch operation with the determination of the foreground and background. The background may have increased brightness (V in the HSV color space) and the foreground may have decreased brightness. This operation may make the artifacts look worse. In order to remedy this, the device may perform a hierarchical search on multiple scales of adaptive thresholding. For instance, the device may perform a hierarchical search on multiple scales of adaptive thresholding in accordance with the techniques of FIG. 34.

Figure 34:
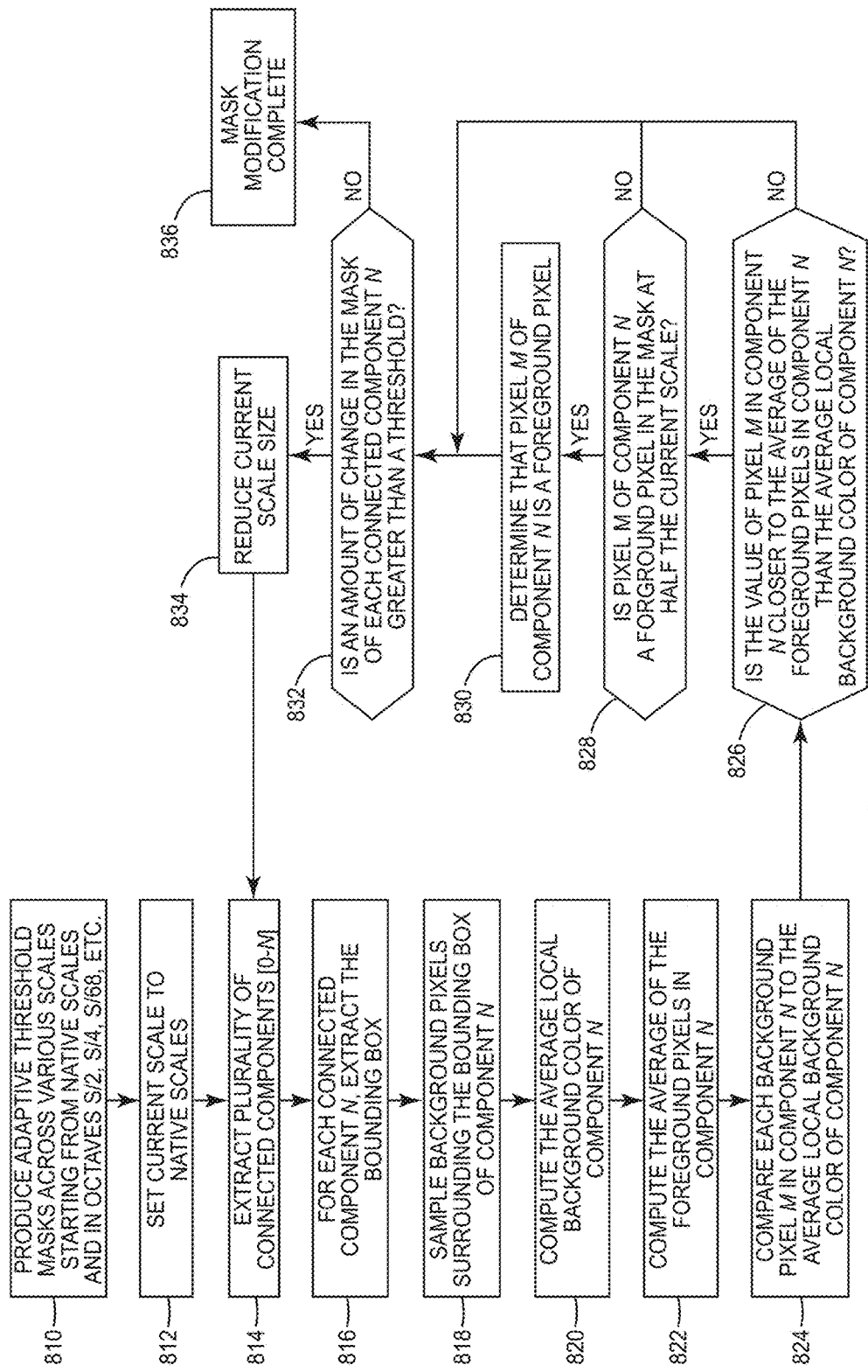
FIG. 34 is a flowchart illustrating example operations of a device to identify foreground regions of digital notes that correspond to physical notes, in accordance with one or more techniques of this disclosure.

FIG. 34 is a flowchart illustrating example operations of a device to identify foreground regions of digital notes that correspond to physical notes, in accordance with one or more techniques of this disclosure. As illustrated in FIG. 34, the device may perform a hierarchical search on multiple scales of adaptive thresholding in accordance with the following steps:

Step 1: The device may produce the adaptive threshold masks across various scales starting from native scale s and in octaves: s/2, s/4, s/8 etc. (810).

Step 2: The device may use the native scale s as the seed of the hierarchical search (812). In some examples, foreground objects missed in the native scale cannot be retrieved in lower scales. However, for solid foreground objects, the contour obtained in native scale can be used as a seed for searching in lower scales in some examples. In this step, the device may perform a connected components extraction on the mask obtained at native scale (814):

Step 3: For each connected component, the device may extract the bounding box (816).

Step 4: The device may sample background pixels surrounding the bounding box (818). In some examples, the device may use 10% of the bounding box width/height to define a local background neighborhood that defines which pixels are sampled in step 818. In some examples, the device may only use pixels identified in the original mask as background pixels (i.e., pixels in the original mask that correspond to 0) as these are the background pixels.

Step 5: The device may compute the average local background color (i.e., using the sampling from Step 4 (820). In some examples, the pixels are represented by the LAB color space and the device may only use the a and b components to compute the average local background color. In some examples, the pixels are represented by an alternate chroma color space.

Step 6: The device may compute the average of the foreground pixels in the current connected component (822)

Step 7: The device may take each background pixel in the current connected component and compare the a and b values to the background average computed in Step 5 and the foreground average computed in step 6 (824). If the value is closer to the foreground value than background value (826) and the pixel is a foreground pixel in the mask at scale s_current/2, (where s_current is the current scale) (828) then assign the current pixel to the foreground (830).

Step 8: The device may determine the amount of change in the mask of each connected component. If the amount of change is greater than a certain threshold (e.g. 70%) (832), the device may repeat Steps 3 to 7 at lower scales until the change is less than the threshold (834) (836).

Figure 35:
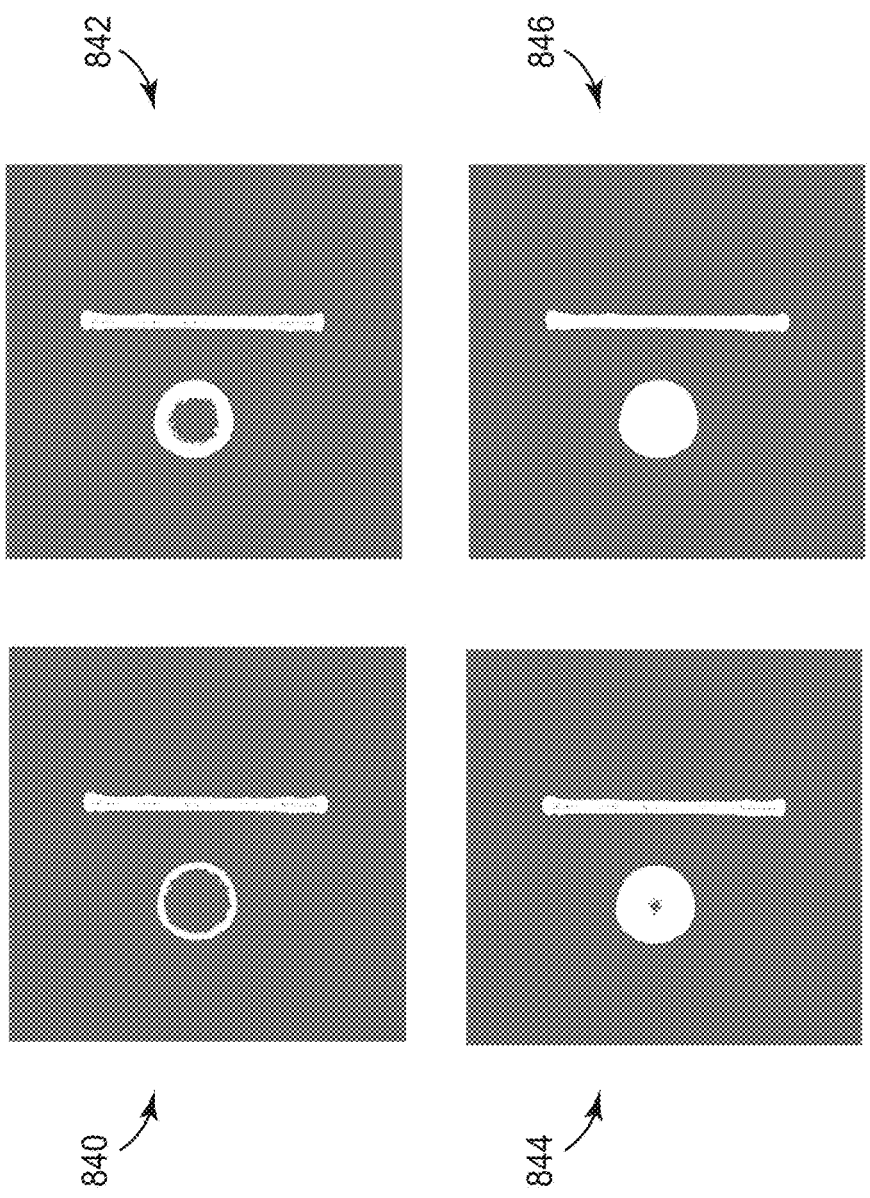
FIG. 35 is a conceptual diagram illustrating example masks which may be generated by a device that identifies foreground regions of digital notes that correspond to physical notes, in accordance with one or more techniques of this disclosure.

This process results in a hierarchically modified mask. One example of the change in the mask across different scales, for digital note 802 of FIG. 33, is illustrated in FIG. 35. As illustrated by FIG. 35, mask 840 may represent a mask for digital note 802 at a first scale (which may be the native scale), mask 842 may represent a mask for digital note 802 at a second scale, mask 844 may represent a mask for digital note 802 at a third scale, and mask 846 may represent a mask for digital note 802 at a fourth scale.

Figure 36:
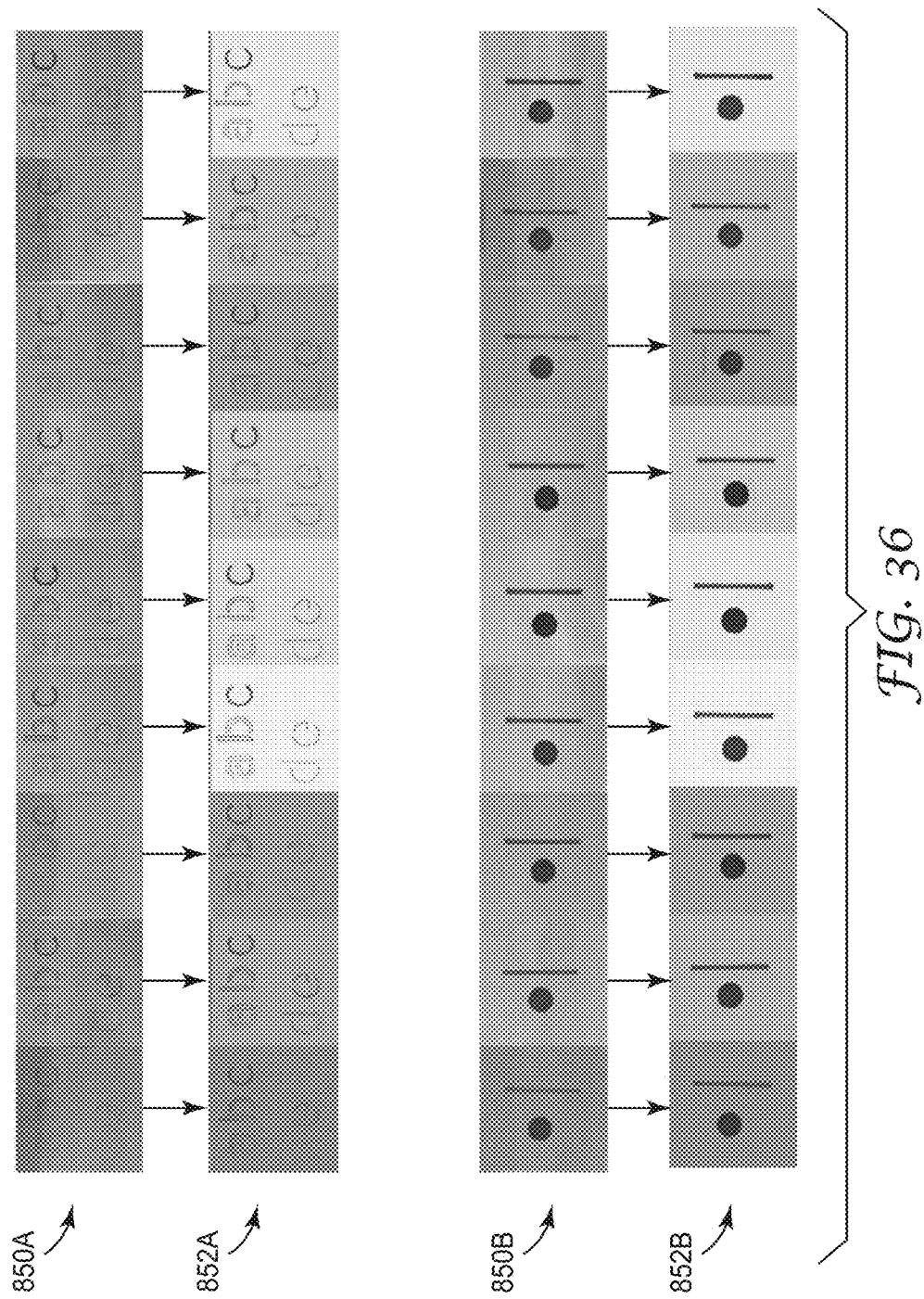
FIG. 36 illustrates a plurality of digital notes enhanced in accordance with one or more techniques of this disclosure.

FIG. 36 illustrates a plurality of digital notes processed in accordance with one or more techniques of this disclosure. As illustrated in FIG. 36, digital notes 850A and 850B (collectively, "digital notes 850") may be processed into enhanced digital notes 852A and 852B (collectively, "enhanced digital notes 852"). For instance, a device may identify foreground regions in each of digital notes 850, and set pixels not included in the foreground regions (i.e., pixels included in background regions) to a uniform background pixel color. In some examples, the device may identify the foreground regions in accordance with the techniques of FIGS. 31-35. In some examples, the device may set the pixels not included in the identified foreground regions to a uniform background color in accordance with the techniques of FIGS. 25-27. As shown in FIG. 36, when performing the processing, the device may stretch the contrast between the foreground and background pixels by making the background brighter and the foreground darker.

Figure 37:
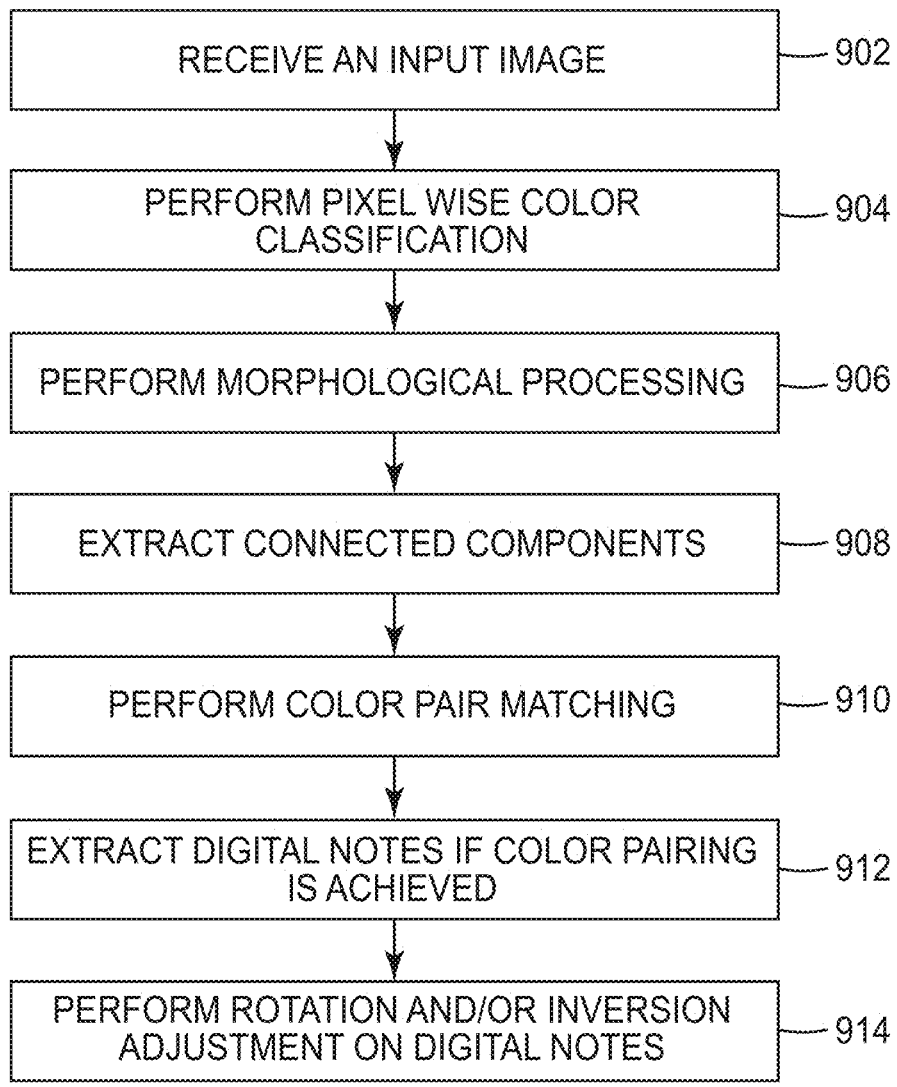
FIG. 37 is a flowchart illustrating example operations of a device to generate a plurality of digital notes that each respectively correspond to a particular physical note of a plurality of physical notes represented by an input image, in accordance with one or more techniques of this disclosure.

FIG. 37 is a flowchart illustrating example operations of a device to generate a plurality of digital notes that each respectively correspond to a particular physical note of a plurality of physical notes represented by an input image, in accordance with one or more techniques of this disclosure.

In accordance with one or more techniques of this disclosure, a device, such as mobile device 15 of FIGS. 1 and 2, may receive an input image (902). In some examples, one or more processors of the device may execute an image processing engine (e.g., image processing engine 28 of FIG. 3) to receive image data comprising a visual representation of a scene that includes a plurality of physical notes that each include respective recognizable content. For instance, processor 70 of mobile device 15 may execute image processing engine 82 to receive image data (e.g., as image data 918 of FIG. 38) comprising a visual representation of scene that includes a plurality of physical notes that each include respective recognizable content (e.g., notes 920A-920C of FIG. 38). In some examples, image data 918 may be an example of an image of images 97 of FIG. 3. In some examples, operation 902 may be an example of operation 702 of FIG. 25.

In any case, the device may perform pixel wise color classification (904). For instance, the device may execute one or more color classification algorithms (e.g., based on Linear/Non-Linear Discriminant Analysis) to detect and distinguish different colored regions in the input image.

The device may perform morphological processing (906) and extract connected components (908). For instance, the device may perform morphological processing to remove regions that do not conform to one or more constraints (e.g., shapes, ratios, sizes, etc.). As one example, the device may remove regions that are non-rectangular.

Figure 38:
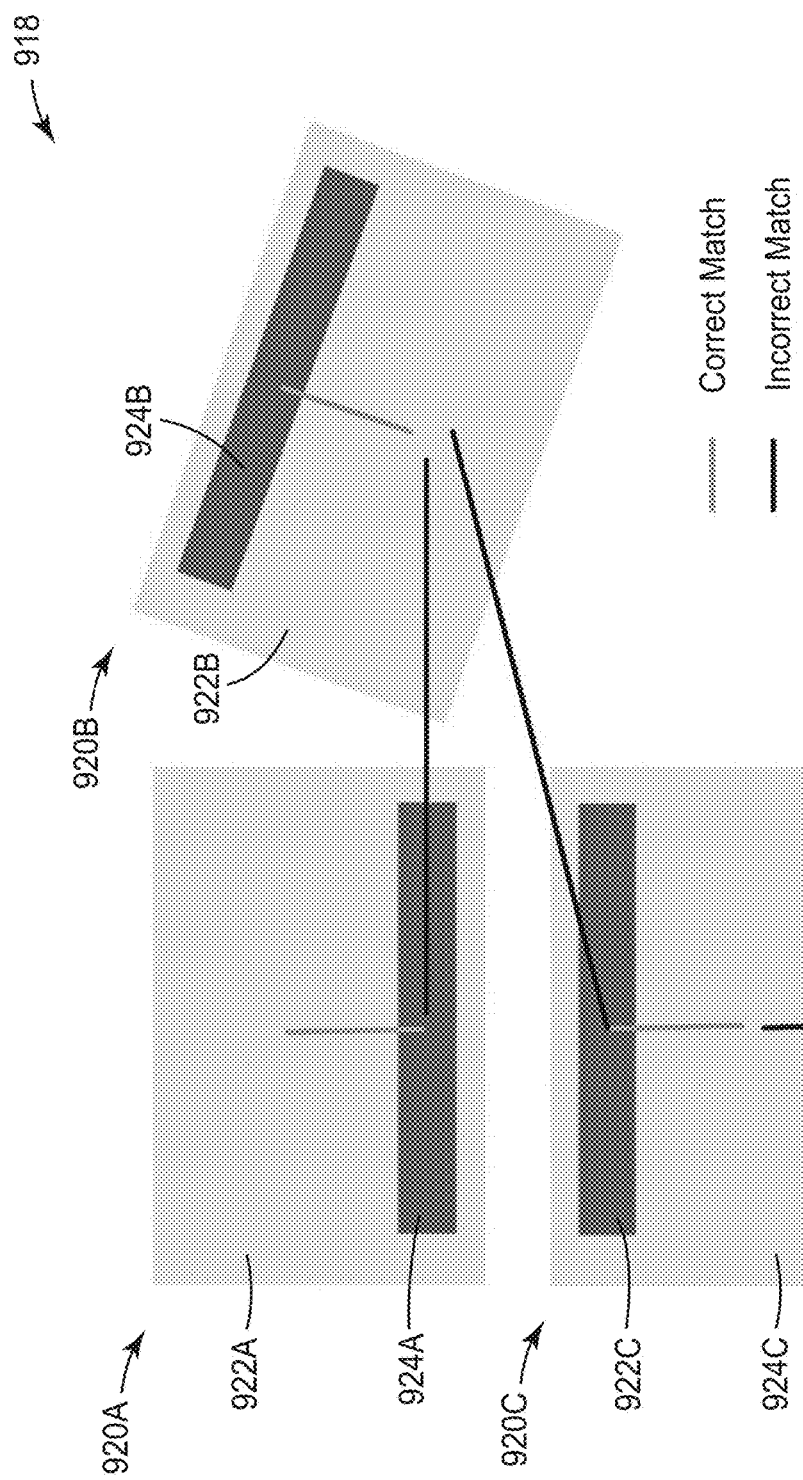
FIG. 38 is a conceptual diagram illustrating an example input image representing a plurality of physical notes which may be used by a device to generate a plurality of digital notes that each respectively correspond to a particular physical note of the plurality of physical notes, in accordance with one or more techniques of this disclosure.

In some examples, each of the physical notes represented by the input image may have a plurality of differently colored regions. For instance, as illustrated in FIG. 38, each of notes 920A-920C may include a first colored region 922A-922C (collectively, "first colored regions 922" or yellow regions), respectively, and a second colored region 924A-924C (collectively, "second colored regions 924" or blue regions), respectively. In some examples, the input image may include one or more regions that are not associated with any of the notes. For instance, as illustrated in FIG. 38, input image 918 may include region 926 which is not associated with any of notes 920. However, as illustrated in FIG. 38, region 926 may be similar to a region of second colored regions 924.

In accordance with one or more techniques of this disclosure, the device may exploit the fact that the notes include a plurality of differently colored regions to improve the accuracy at which the notes may be identified/recognized. For instance, the device may perform color pair matching (to, e.g., pair the regions) (910). As one example, the device may execute a Hungarian Algorithm to perform the color pair matching based on the assumption that each note includes a single first colored region and a single second colored region. For instance, when executing the Hungarian Algorithm, the device may verify if the distance between a first colored region (e.g., first colored regions 922 of FIG. 38) and a second colored region (e.g., second colored regions 924 of FIG. 38) is the shortest among all possible distances between that first/second colored region with other first/second colored regions. In some examples, if the distances are shortest mutually, the device may consider the regions to be a pair. Also, the device may not assign outliers, such as region 926 of FIG. 38, to any pair. This may be a natural consequence of the Hungarian Algorithm. The device may pair the first colored region closest to the outlier (i.e., first colored region 922C) with the outlier (e.g., outlier 926) because there exists another second colored region which is closer to the first colored region.

If the device achieves color pairing, the device may extract digital notes from the input image (912). For instance, the device may extract a digital note for each pair of regions. As illustrated in FIG. 38, the device may extract a digital note for each note of notes 920.

Figure 39:
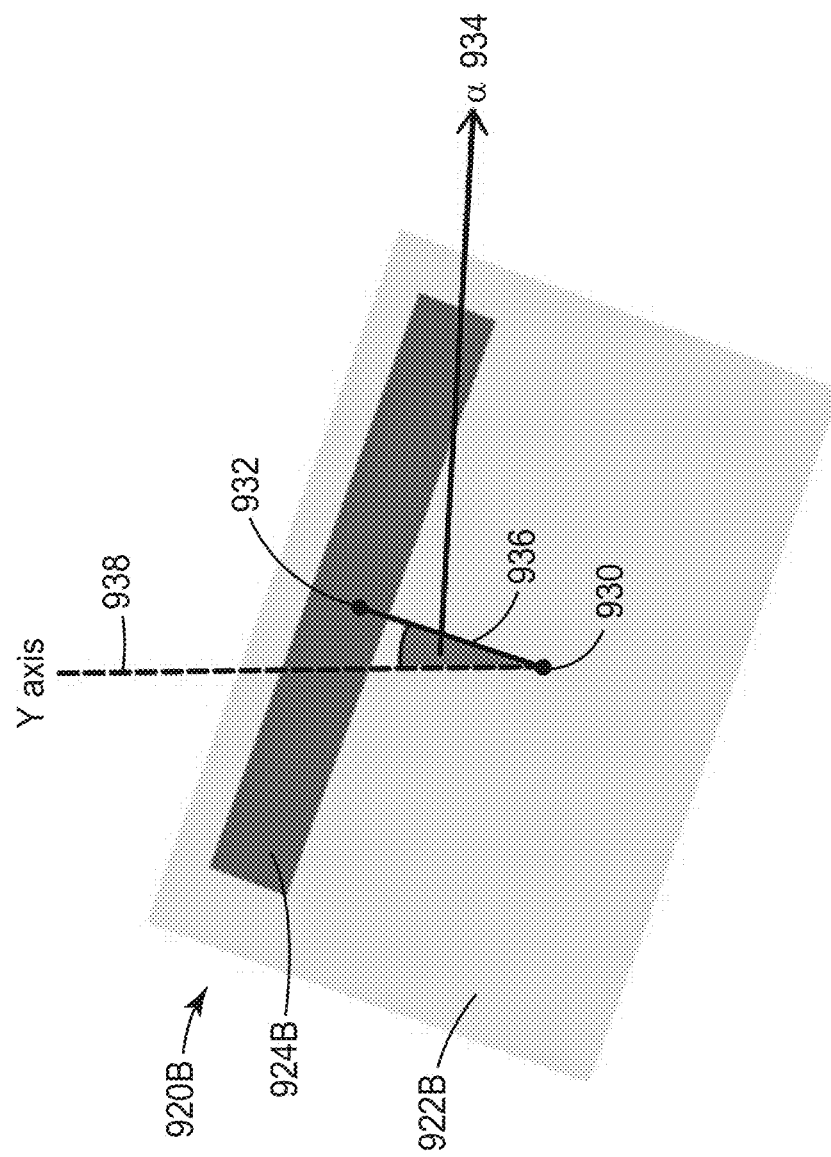
FIG. 39 is a conceptual diagram illustrating further details of a particular physical note of the plurality of physical notes represented by the input image of FIG. 38, in accordance with one or more techniques of this disclosure.

In some examples, the device may perform rotation and/or inversion adjustment on the extracted digital notes (914). In some examples, the device may determine an orientation of the note based on a line that joins features (e.g., centroids) of a pair of regions. For instance, the device may determine an angle formed by the line and a Y-axis of the digital note, and rotate the digital note based on the determined angle to compensate. As illustrated in the example of FIG. 39, the device may determine line 936 that joins centroid 930 of first colored region 922B with centroid 932 of second colored region 924B of note 920B. The device may determine angle α 934 formed by line 936 and Y-axis 938. Based on angle α 934, the device may rotate digital note 920B. For instance, if angle α 934 is 20 degrees, the device may rotate digital note 920B counter-clockwise 20 degrees.

Figure 40A:
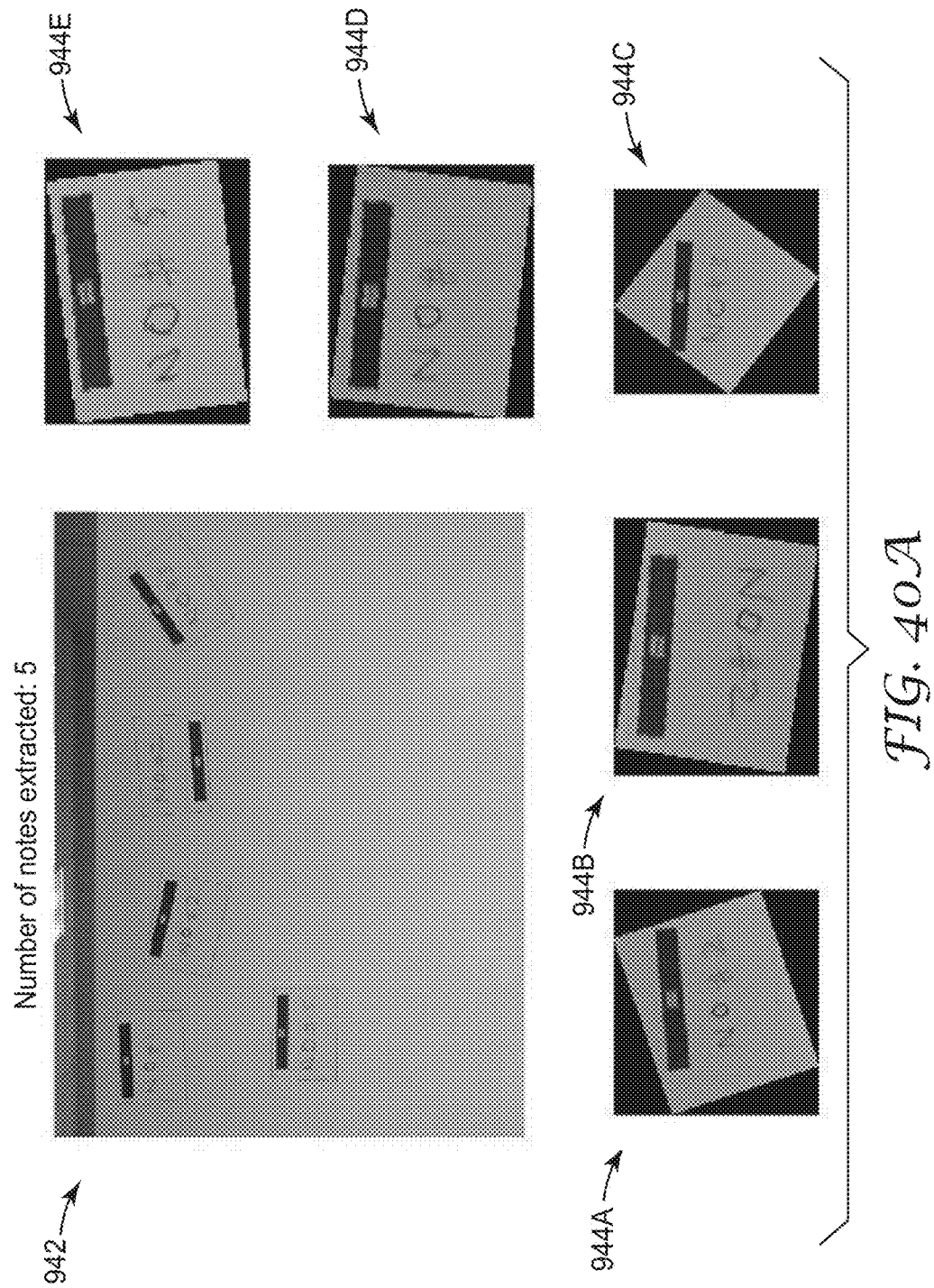
FIGS. 40A and 40B illustrate additional examples of digital notes extracted from an input image representing a plurality of physical notes, in accordance with one or more techniques of this disclosure.
Figure 40B:
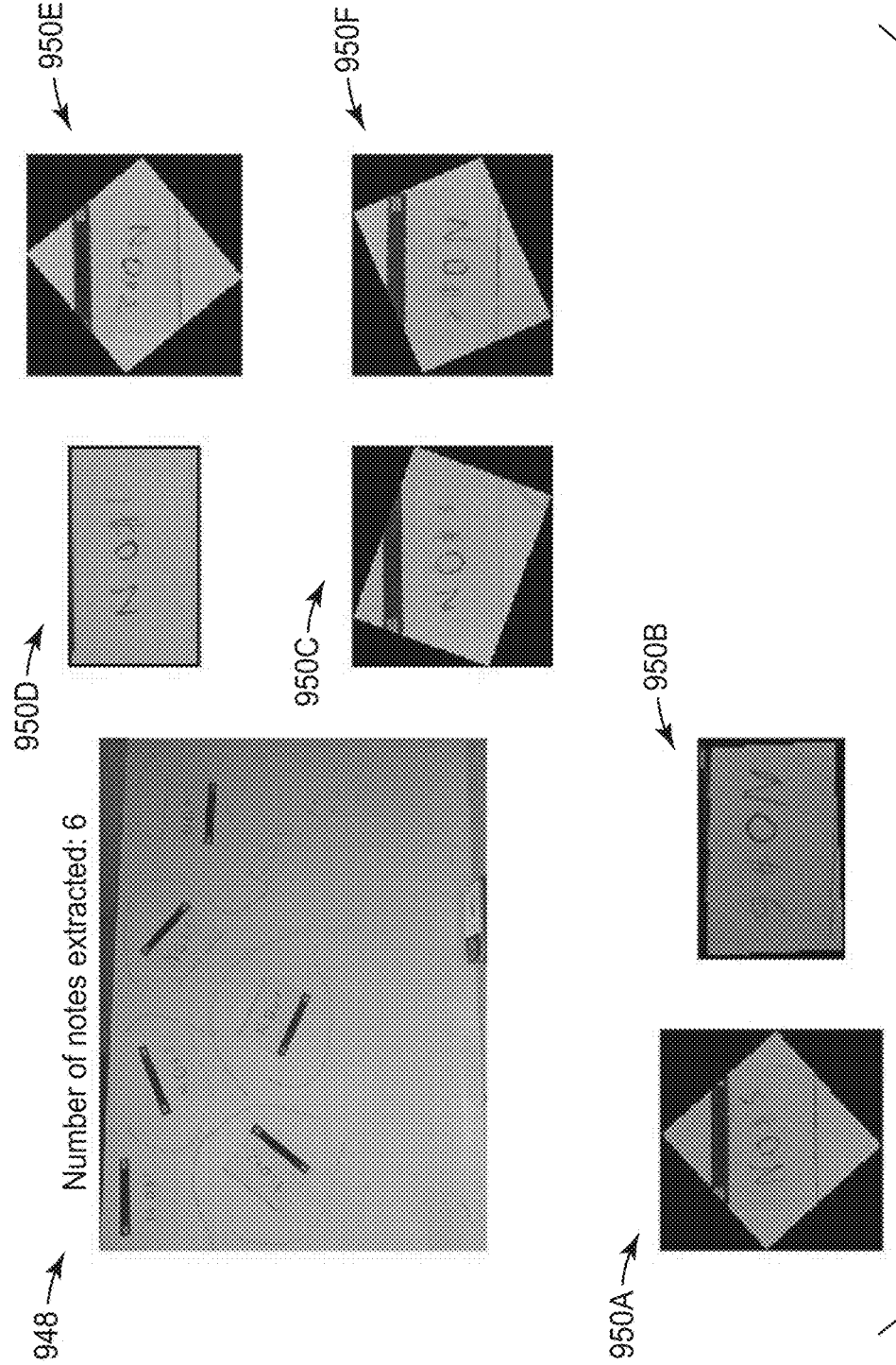

FIGS. 40A and 40B illustrate additional examples of note extraction. As illustrated by FIG. 40A, a device may extract digital notes 944A-944E (collectively, "digital notes 944") from input image 942. As illustrated by digital notes 944, the device may perform rotation and/or inversion adjustment to compensate for the orientation of the physical notes as represented in input image 942. Similarly, as illustrated by FIG. 40B, a device may extract digital notes 950A-950F (collectively, "digital notes 950") from input image 948. As illustrated by digital notes 950, the device may perform rotation and/or inversion adjustment to compensate for the orientation of the physical notes as represented in input image 942.

The following numbered examples may illustrate one or more aspects of the disclosure:

Example 1

A method comprising: receiving, by one or more processors of a device, a digital note of a plurality of digital notes generated based on image data comprising a visual representation of a scene that includes a plurality of physical notes such that each of the plurality of digital notes respectively corresponds to a particular physical note of the plurality of physical notes, wherein each of the physical notes includes respective recognizable content; receiving, by the one or more processors, user input indicating a modification to one or more visual characteristics of the digital note; editing, by the one or more processors and in response to the user input, the one or more visual characteristics of the digital note; and outputting, by the one or more processors and for display, a modified version of the digital note that includes the one or more visual characteristics.

Example 2

The method of example 1, wherein: receiving the user input comprises receiving user input that indicates additional content for the digital note, editing the one or more visual characteristics of the digital note comprises creating a layer object that includes the additional content, and outputting the modified updated version of the digital note comprises outputting the modified version of the digital note such that the layer object that includes the additional content is displayed on top of content corresponding to the respective recognizable content of the physical note to which the digital note corresponds.

Example 3

The method of any combination of examples 1-2, wherein the additional content is first additional content, the layer object is a first layer object of a plurality of layer objects, and the modified version of the digital note is a first modified version of the digital note, the method further comprising: responsive to receiving user input indicating second additional content: creating a second layer of the plurality of layer objects that includes the second additional content; and outputting, for display, a second modified version of the digital note such that the second layer object that includes the second additional content is displayed on top of the first layer object that includes the first additional content.

Example 4

The method of any combination of examples 1-3, further comprising: responsive to receiving user input to remove the second layer object from the updated version of the digital note, outputting, for display, a third modified version of the digital note such that the second additional content included in the second layer object is not displayed.

Example 5

The method of any combination of examples 1-4, wherein receiving the user input that indicates the additional content comprises receiving one or more of: a sequence of typed characters, and a stroke gesture.

Example 6

The method of any combination of examples 1-5, wherein: receiving the user input comprises receiving user input that indicates an updated background color, editing the one or more visual characteristics of the digital note comprises setting a background color of the digital note to the updated background color.

Example 7

The method of any combination of examples 1-6, further comprising: identifying, for the digital note, a foreground region that includes content corresponding to recognizable content of the physical note to which the digital note corresponds, wherein at least a portion of the content of the foreground region is associated a foreground color; and modifying the foreground color.

Example 8

The method of any combination of examples 1-7, wherein: receiving the user input comprises receiving user input that indicates an updated foreground color, and modifying the foreground color comprises setting the foreground color to the updated foreground color in response to receiving user input that indicates the updated foreground color.

Example 9

The method of any combination of examples 1-8, wherein modifying the foreground color comprises automatically modifying the foreground color as a function of the updated background color.

Example 10

The method of any combination of examples 1-9, wherein prior to modifying the foreground color, a plurality of pixels included in the foreground region have current foreground pixel colors, and wherein modifying the foreground color comprises modifying colors of the plurality of pixels included in the foreground region by at least: selecting, by the one or more processors and for each pixel of the plurality of pixels included in the foreground region, an updated foreground pixel color such that a contrast ratio between the updated foreground pixel color and the updated background color is greater than a contrast ratio between the current foreground pixel color and the updated background color, and setting each respective pixel of the plurality of pixels to the selected respective updated foreground pixel color.

Example 11

The method of any combination of examples 1-10, further comprising: identifying, subsequent to identifying the foreground region of the digital note, a background region of the digital note by at least identifying pixels of the digital note not included in the foreground region as the background region.

Example 12

The method of any combination of examples 1-10, further comprising: identifying a background region of the digital note by at least identifying pixels of the digital note not included in the foreground region as the background region, wherein identifying the foreground region is performed subsequent to identifying the background region, and wherein identifying the foreground region for the particular digital note comprises: identifying pixels of the particular digital note not included in the background region as the foreground region.

Example 13

The method of any combination of examples 1-12, wherein receiving the digital note of the plurality of digital notes comprises: receiving, by the one or more processors and from a camera of the device, the image data comprising the visual representation of the scene that includes the plurality of physical notes; and generating, by the one or more processors and based on the image data, the plurality of digital notes that each respectively correspond to the particular physical note of the plurality of physical notes.

Example 14

The method of any combination of examples 1-13, further comprising: enhancing, by the one or more processors, the digital note of the plurality of digital notes by at least: identifying, for the digital note, a foreground region that includes content corresponding to the respective recognizable content of the physical note to which the digital note corresponds; identifying a background region of the digital note; and setting pixel values from the background region of the particular digital note to a uniform background pixel value.

Example 15

The method of any combination of examples 1-14, wherein the physical note to which the digital note corresponds includes a first colored region and a second colored region, the method further comprising: identifying, for the digital note, the first colored region and a second colored region; determining an angle formed by an axis of the digital note and a line connecting a feature of the first colored region and a feature of the second colored region; and rotating the digital note based on the determined angle.

Example 16

A computing device comprising: a memory configured to store digital notes; and one or more processors configured to: receive a digital note of a plurality of digital notes generated based on image data comprising a visual representation of a scene that includes a plurality of physical notes such that each of the plurality of digital notes respectively corresponds to a particular physical note of the plurality of physical notes, wherein each of the physical notes includes respective recognizable content; receive user input indicating a modification to one or more visual characteristics of the digital note; edit, in response to the user input, the one or more visual characteristics of the digital note; and output, for display, a modified version of the digital note that includes the one or more visual characteristics.

Example 17

The computing device of example 16, wherein the one or more processors are configured to perform the method any combination of examples 1-15.

Example 18

A computing system comprising: means for receiving a digital note of a plurality of digital notes generated based on image data comprising a visual representation of a scene that includes a plurality of physical notes such that each of the plurality of digital notes respectively corresponds to a particular physical note of the plurality of physical notes, wherein each of the physical notes includes respective recognizable content; means for receiving user input indicating a modification to one or more visual characteristics of the digital note; means for editing, in response to the user input, the one or more visual characteristics of the digital note; and means for outputting, for display, a modified version of the digital note that includes the one or more visual characteristics.

Example 19

The computing system of example 18, further comprising means for performing the method any combination of examples 1-15.

Example 20

A computer-readable storage medium storing instructions that, when executed, cause one or more processors of a device to: receive a digital note of a plurality of digital notes generated based on image data comprising a visual representation of a scene that includes a plurality of physical notes such that each of the plurality of digital notes respectively corresponds to a particular physical note of the plurality of physical notes, wherein each of the physical notes includes respective recognizable content; receive user input indicating a modification to one or more visual characteristics of the digital note; edit, in response to the user input, the one or more visual characteristics of the digital note; and output, for display, a modified version of the digital note that includes the one or more visual characteristics.

Example 21

The computer-readable storage medium of example 20, further storing instructions that cause the one or more processors to perform the method any combination of examples 1-15.

Example 22

A method comprising: receiving, by a computing device, an input image of an environment having a plurality of physical notes; processing the input image with the computing device to identify the plurality of physical notes in the input image; generating, by the computing device, a plurality of digital notes corresponding to the plurality of notes identified in the input image, wherein the plurality of digital notes include information represented by the plurality of notes in the input image; displaying, on a first portion of a graphical user interface of the computing device, the input image overlaid with the plurality of digital notes in place of the identified plurality of notes; and displaying, by the computing device, a set of one or more of the plurality of digital notes on a second portion of the graphical user interface, wherein each of the digital notes in the set of digital notes displayed in the second portion corresponds to a respective one of the plurality of digital notes displayed in the first portion and overlaid on the input image.

Example 23

The method of example 21, further comprising: receiving, by the computing device, a user input selecting for deletion at least one of the plurality of digital notes displayed in the first portion of the graphical user interface; and removing, by the computing device and from the set of digital notes displayed in the second portion of the graphical user interface, digital notes that correspond to the digital notes of the first portion of the graphical user interface selected for deletion.

Example 24

The method of any combination of examples 22-23, wherein the plurality of digital notes from the first portion is greater than the plurality of digital notes in the second portion, the method further comprising: receiving, by the computing device, a user input selecting at least one of the digital notes from the first portion that is not displayed in the second portion; and adding, by the computing device, the selected digital note from the first portion to the set of digital notes displayed on the second portion.

Example 25

The method of any combination of examples 22-24, further comprising: receiving, by the computing device, a user input selecting a subset of the plurality of digital notes; and grouping, by the computing device, the selected subset of digital notes to form one or more groups.

Example 26

The method of any combination of examples 22-25, wherein the one or more groups are organized accordingly to a group hierarchy defined by the user input.

Example 27

A computer system configured to execute the method of any of examples 22-26.

Example 28

A non-transitory computer-readable medium comprising instructions for causing a programmable processor to execute the method of any of examples 22-26.

Example 29

A computing device comprising: a processor; an image collection module executable by the processor and configured to receive an input image of an environment having a plurality of physical notes; an image processing engine executable by the processor and configured to identify the plurality of physical notes in the input image and generate a plurality of digital notes corresponding to the plurality of notes identified in the input image, wherein the plurality of digital notes include information represented by the plurality of notes in the input image; and a graphical user interface configured to display the input image overlaid with the plurality of digital notes in place of the identified plurality of notes on a first portion of the graphical user interface and to display a set of one or more of the digital notes on a second portion of the graphical user interface.

Example 30

The device of example 29, wherein the image collection module includes an image capture device configured to capture the input image.

Example 31

The device of any combination of examples 29-30, wherein the image collection module includes a communication interface configured to receive the input image.

Example 32

The device of any combination of examples 29-31, wherein the communication interface includes a wireless communication device configured to receive the input image.

Example 33

The device of any combination of examples 29-32, wherein the communication interface includes a wired communication device configured to receive the input image.

Example 34

The device of any combination of examples 29-33, wherein the user interface is further configured to: receive a user input selecting for deletion at least one of the plurality of digital notes displayed in the first portion of the graphical user interface; and remove, from the set of digital notes displayed in the second portion of the graphical user interface, any of the digital notes that correspond to the digital notes of the first portion of the graphical user interface selected for deletion.

Example 35

The device of any combination of examples 29-34, wherein the plurality of digital notes from the first portion is greater than the plurality of digital notes in the second portion the image processing engine is further configured to: receive a user input selecting at least one of the plurality of digital notes from the first portion that is not in the second portion; and add the selected plurality of digital notes from the first portion to the second portion.

Example 36

The device of any combination of examples 29-35, wherein the image processing engine is further configured to: receive a user input selecting at least one of the plurality of digital notes between the first portion and the second portion; and group the selected plurality of digital notes between the first portion and the second portion to form one or more groups.

Example 37

The device of any combination of examples 29-36, wherein the one or more groups are organized accordingly to a group hierarchy defined by the user input.

Example 38

The device of any combination of examples 29-37, wherein the image processing engine is further configured to display indications of the one or more groups in conjunction with the plurality of digital notes presented on the first portion.

Example 39

The device of any combination of examples 29-38, wherein the image processing engine is further configured to display indications of the one or more groups in conjunction with the plurality of digital notes presented on the second portion.

Example 40

A method comprising: receiving, by a computing device, an input image; identifying, by the computing device, a plurality of notes in the input image; editing, by the computing device, background colors from one or more of the plurality of notes identified in the input image; generating, by the computing device, a plurality of digital notes corresponding to the plurality of notes identified in the input image, the plurality of digital notes incorporating the edited background colors; storing, by the computing device, the plurality of digital notes to a digital data storage device for retrieval by a user, wherein the plurality of digital notes include information represented by the plurality of notes in the input image.

Example 41

The method of example 40, wherein the computing device utilizes a shape detection module to identify at least one of the plurality of notes based on shapes defined by perimeters of the plurality of notes in the input image

Example 42

The method of any combination of examples 40-41, wherein identifying the plurality of notes in the input image includes identifying the plurality of notes according to color spaces associated with background colors the plurality of notes.

Example 43

The method of any combination of examples 40-42, wherein the computing device utilizes a pattern detection module to identify at least one of the plurality of notes, wherein the pattern detection module is comprised of pattern recognition algorithms including at least one of a group consisting of: a support vector machine algorithm; a cross-correlation algorithm; and a template matching algorithm.

Example 44

The method of any combination of examples 40-43, wherein generating the plurality of digital notes further comprises correcting, by the computing device, shadows, lighting, rotation, and scaling of notes in the input image.

Example 45

The method of any combination of examples 40-44, wherein the input image includes at least one of a group consisting of: a digital image; a digital video; and a continuous digital scan.

Example 46

The method of any combination of examples 40-45, wherein the plurality of notes in the input image includes at least one of a group consisting of: a 7.62×7.62 centimeter (cm) note; a 66.04×99.06 cm poster; a triangular metal sign; a sticker; and a 8.5×11 in sheet of paper.

Example 47

The method of any combination of examples 39-45, wherein generating the plurality of digital notes includes, for each of the plurality of digital notes, incorporating, in the digital note, visual information of the corresponding note in the input image.

Example 48

A computer system configured to execute the method of any combination of examples 40-47.

Example 49

A non-transitory computer-readable medium comprising instructions for causing a programmable processor to execute the method of any combination of examples 40-47.

Example 50

A computing device comprising: an image collection module configured to receive an input image; an image processing engine configured to identify a plurality of notes in the input image received by the image collection module, and generate a plurality of digital notes corresponding to the plurality of notes identified in the input image, wherein the plurality of digital notes include information represented by the plurality of notes in the input image; and a digital data storage device configured to store the plurality of digital notes generated by the image processing module for retrieval by a user.

Example 51

The device of example 50, wherein the image collection module includes an image capture device configured to capture the input image.

Example 52

The device of any combination of examples 50-51, wherein the image collection module includes a communication interface configured to receive the input image.

Example 53

The device of any combination of examples 50-52, wherein the communication interface includes a wireless communication device configured to receive the input image.

Example 54

The device of any combination of examples 50-53, wherein the communication interface includes a wired communication device configured to receive the input image.

Example 55

The device of any combination of examples 50-54, wherein the digital data storage device is configured to store the input image.

Example 56

The device of any combination of examples 50-55, wherein the image processing engine includes a shape detection module configured to identify at least one of the plurality of notes based on shapes defined by perimeters of the plurality of notes in the input image.

Example 57

The device of any combination of examples 50-56, wherein the image processing engine is further configured to identify the plurality of notes in the input image includes identifying the plurality of notes according to color spaces associated with background colors the plurality of notes.

Example 58

The device of any combination of examples 50-57, wherein the image processing engine includes a pattern detection module configured to identify at least one of the plurality of notes, wherein the pattern detection module is comprised of pattern recognition algorithms including at least one of a group consisting of: a support vector machine algorithm; a cross-correlation algorithm; and a template matching algorithm.

Example 59

The device of any combination of examples 50-58, wherein the image processing engine is further configured to correct shadows, lighting, rotation, and scaling of notes in the input image.

Example 60

The device of any combination of examples 50-59, wherein the input image includes at least one of a group consisting of: a digital image; a digital video; and a continuous digital scan.

Example 61

The device of any combination of examples 50-60, wherein the plurality of notes in the input image includes at least one of a group consisting of: a 7.62×7.62 centimeter (cm) note; a 66.04×99.06 cm poster; a triangular metal sign; a sticker; and a 8.5×11 in sheet of paper.

Example 62

The device of any combination of examples 50-61, wherein the image processing engine is further configured to, for each of the plurality of digital notes, incorporate, in the digital note, visual information of the corresponding note in the input image.

The techniques described in this disclosure may be implemented, at least in part, in hardware, software, firmware, or any combination thereof. For example, various aspects of the described techniques, including the disclosed mobile device 15, 16, cloud 12, and/or computer system 14, may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components.

Such hardware, software, and firmware may be implemented within the same device or within separate devices to support the various techniques described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a transitory or non-transitory computer-readable storage medium, containing instructions. Instructions embedded or encoded in a computer-readable medium, including a computer-readable storage medium, may cause one or more programmable processors, or other processors, such one or more processors included in a control system, to implement one or more of the techniques described herein, such as when instructions included or encoded in the computer-readable medium are executed by the one or more processors. Non-transitory computer-readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer-readable media. In some examples, an article of manufacture may comprise one or more computer-readable storage media.

Various examples of this disclosure have been described. These and other examples are within the scope of the following claims.

What is claimed is:

1. A method comprising:
    receiving, by one or more processors of a device, a digital note of a plurality of digital notes generated based on image data comprising a visual representation of a scene that includes a plurality of physical notes such that each of the plurality of digital notes respectively corresponds to a particular physical note of the plurality of physical notes, wherein each of the physical notes includes respective recognizable content;
    receiving, by the one or more processors, user input indicating a modification to one or more visual characteristics of the digital note;
    editing, by the one or more processors and in response to the user input, the one or more visual characteristics of the digital note; and
    outputting, by the one or more processors and for display, a modified version of the digital note that includes the one or more visual characteristics,
    wherein receiving the user input comprises receiving user input that indicates additional content for the digital note and a command to remove previously entered additional content for the digital note,
    wherein editing the one or more visual characteristics of the digital note comprises creating a layer object that includes the additional content and removing another layer object that includes the previously entered additional content, and
    wherein outputting the modified updated version of the digital note comprises outputting the modified version of the digital note such that the layer object that includes the additional content is to be displayed on top of content corresponding to the respective recognizable content of the physical note to which the digital note corresponds and without the another layer object in the digital note.

2. The method of claim 1, wherein the additional content is first additional content, the layer object is a first layer object of a plurality of layer objects, and the modified version of the digital note is a first modified version of the digital note, the method further comprising:
    responsive to receiving user input indicating second additional content:
        creating a second layer of the plurality of layer objects that includes the second additional content; and
        outputting, for display, a second modified version of the digital note such that the second layer object that includes the second additional content is displayed on top of the first layer object that includes the first additional content.

3. The method of claim 2, further comprising:
    responsive to receiving user input to remove the second layer object from the updated version of the digital note, outputting, for display, a third modified version of the digital note such that the second additional content included in the second layer object is not displayed.

4. The method of claim 1, wherein receiving the user input that indicates the additional content comprises receiving one or more of:
    a sequence of typed characters, and
    a stroke gesture.

5. The method of claim 1, wherein:
    receiving the user input further comprises receiving user input that indicates an updated background color,
    editing the one or more visual characteristics of the digital note further comprises setting a background color of the digital note to the updated background color.

6. The method of claim 1, wherein receiving the digital note of the plurality of digital notes comprises:
    receiving, by the one or more processors and from a camera of the device, the image data comprising the visual representation of the scene that includes the plurality of physical notes; and
    generating, by the one or more processors and based on the image data, the plurality of digital notes that each respectively correspond to the particular physical note of the plurality of physical notes.

7. A method comprising:
    receiving, by one or more processors of a device, a digital note of a plurality of digital notes generated based on image data comprising a visual representation of a scene that includes a plurality of physical notes such that each of the plurality of digital notes respectively corresponds to a particular physical note of the plurality of physical notes, wherein each of the physical notes includes respective recognizable content;

receiving, by the one or more processors, user input indicating a modification to one or more visual characteristics of the digital note;

editing, by the one or more processors and in response to the user input, the one or more visual characteristics of the digital note; and outputting, by the one or more processors and for display, a modified version of the digital note that includes the one or more visual characteristics, wherein receiving the user input comprises receiving user input that indicates an updated background color, and wherein editing the one or more visual characteristics of the digital note comprises setting a background color of the digital note to the updated background color, wherein receiving the user input comprises receiving user input that indicates additional content for the digital note and a command to remove previously entered additional content for the digital note, wherein editing the one or more visual characteristics of the digital note comprises creating a layer object that includes the additional content and removing another layer object that includes the previously entered additional content, and wherein outputting the modified updated version of the digital note comprises outputting the modified version of the digital note such that the layer object that includes the additional content is displayed on top of content corresponding to the respective recognizable content of the physical note to which the digital note corresponds and without the another layer object in the digital note.

8. The method of claim 7, further comprising:
identifying, for the digital note, a foreground region that includes content corresponding to recognizable content of the physical note to which the digital note corresponds, wherein at least a portion of the content of the foreground region is associated a foreground color; and
modifying the foreground color.

9. The method of claim 8, wherein:
receiving the user input comprises receiving user input that indicates an updated foreground color, and
modifying the foreground color comprises setting the foreground color to the updated foreground color in response to receiving user input that indicates the updated foreground color.

10. The method of claim 8, wherein modifying the foreground color comprises automatically modifying the foreground color as a function of the updated background color.

11. The method of claim 10, wherein prior to modifying the foreground color, a plurality of pixels included in the foreground region have current foreground pixel colors, and wherein modifying the foreground color comprises modifying colors of the plurality of pixels included in the foreground region by at least:
selecting, by the one or more processors and for each pixel of the plurality of pixels included in the foreground region, an updated foreground pixel color such that a contrast ratio between the updated foreground pixel color and the updated background color is greater than a contrast ratio between the current foreground pixel color and the updated background color, and
setting each respective pixel of the plurality of pixels to the selected respective updated foreground pixel color.

12. The method of claim 8, further comprising:
identifying, subsequent to identifying the foreground region of the digital note, a background region of the digital note by at least identifying pixels of the digital note not included in the foreground region as the background region.

13. The method of claim 8, further comprising:
identifying a background region of the digital note by at least identifying pixels of the digital note not included in the foreground region as the background region, wherein identifying the foreground region is performed subsequent to identifying the background region, and wherein identifying the foreground region for the particular digital note comprises:
identifying pixels of the particular digital note not included in the background region as the foreground region.

14. The method of claim 7, wherein receiving the digital note of the plurality of digital notes comprises:
receiving, by the one or more processors and from a camera of the device, the image data comprising the visual representation of the scene that includes the plurality of physical notes; and
generating, by the one or more processors and based on the image data, the plurality of digital notes that each respectively correspond to the particular physical note of the plurality of physical notes.

15. The method of claim 14, further comprising:
enhancing, by the one or more processors, the digital note of the plurality of digital notes by at least:
identifying, for the digital note, a foreground region that includes content corresponding to the respective recognizable content of the physical note to which the digital note corresponds;
identifying a background region of the digital note; and
setting pixel values from the background region of the particular digital note to a uniform background pixel value.

16. A computing device comprising:
a memory configured to store digital notes; and
one or more processors configured to:
receive a digital note of a plurality of digital notes generated based on image data comprising a visual representation of a scene that includes a plurality of physical notes such that each of the plurality of digital notes respectively corresponds to a particular physical note of the plurality of physical notes, wherein each of the physical notes includes respective recognizable content;
receive user input indicating an additional content for the digital note and a command to remove previously entered additional content for the digital note,
edit, in response to the user input, the digital note by at least creating a layer object that includes the additional content and removing another layer object that includes the previously entered additional content; and
output a modified version of the digital note by at least outputting the modified version of the digital note such that the layer object that includes the additional content and the content of the respective recognizable content of the physical note to which the digital note corresponds is displayed without the another layer object in the digital note.

17. The computing device of claim 16, wherein the one or more processors are configured to receive the digital note of the plurality of digital notes by at least:
- receiving, from a camera of the device, the image data comprising the visual representation of the scene that includes the plurality of physical notes; and
- generating, based on the image data, the plurality of digital notes that each respectively correspond to the particular physical note of the plurality of physical notes.

18. The computing device of claim 16, wherein:
the additional content is first additional content,
the layer object is a first layer object of a plurality of layer objects,
the modified version of the digital note is a first modified version of the digital note, and
responsive to receiving user input indicating second additional content, the one or more processors are configured to:
create a second layer of the plurality of layer objects that includes the second additional content; and
output, for display, a second modified version of the digital note such that the second layer object that includes the second additional content is displayed on top of the first layer object that includes the first additional content.

19. The computing device of claim 16, wherein the one or more processors are configured to receive the user input that indicates the additional content by at least receiving one or more of:
a sequence of typed characters, and
a stroke gesture.

* * * * *